(12) United States Patent
Ando et al.

(10) Patent No.: US 9,723,286 B2
(45) Date of Patent: Aug. 1, 2017

(54) IMAGE PROCESSING APPARATUS AND CONTROL METHOD THEREOF

(71) Applicant: CANON KABUSHIKI KAISHA, Tokyo (JP)

(72) Inventors: Muneki Ando, Kawasaki (JP); Ryosuke Takahashi, Sagamihara (JP); Kinshiro Fujinaka, Ebina (JP); Katsumasa Tanaka, Isehara (JP); Takashi Ohki, Atsugi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 245 days.

(21) Appl. No.: 14/206,479

(22) Filed: Mar. 12, 2014

(65) Prior Publication Data

US 2014/0286628 A1    Sep. 25, 2014

(30) Foreign Application Priority Data

Mar. 19, 2013   (JP) ................................. 2013-056307
Dec. 12, 2013   (JP) ................................. 2013-256669

(51) Int. Cl.
*H04N 9/793*   (2006.01)
*H04N 5/77*    (2006.01)
*G11B 27/32*   (2006.01)

(52) U.S. Cl.
CPC ........... *H04N 9/793* (2013.01); *G11B 27/322* (2013.01); *H04N 5/77* (2013.01)

(58) Field of Classification Search
CPC ......... G11B 27/322; H04N 5/77; H04N 9/793

USPC ................... 386/278, 282, 230; 348/333.12; 345/600, 601; 382/167
See application file for complete search history.

(56) References Cited

U.S. PATENT DOCUMENTS 7,016,075 B1 *   3/2006   Tsukada ............... H04N 1/6075
                                               358/1.9
7,362,470 B2 *   4/2008   Sawada ................ H04N 1/6072
                                               358/1.11

(Continued)

FOREIGN PATENT DOCUMENTS

JP    H05122594 A   5/1993
JP    H10233920 A   9/1998

(Continued)

*Primary Examiner* — Thai Tran
*Assistant Examiner* — Stephen Smith
(74) *Attorney, Agent, or Firm* — Fitzpatrick, Cella, Harper & Scinto

(57) ABSTRACT

An image processing apparatus includes: an adjusting unit configured to perform a color adjustment process on an input image and generate an output image: a determining unit configured to determine an approximate expression which approximates conversion characteristics of the color adjustment process; and an outputting unit configured to output color adjustment information including information representing the approximate expression determined by the determining unit, wherein when the adjusting unit performs the color adjustment process on a partial region of the input image, the outputting unit outputs, as the color adjustment information, information including the information representing the approximate expression determined by the determining unit and region information representing the partial region.

21 Claims, 39 Drawing Sheets

(56) References Cited

U.S. PATENT DOCUMENTS

| | | | |
|---|---|---|---|
| 7,876,325 B1 * | 1/2011 | Sharma | G06T 11/60 345/473 |
| 8,514,303 B2 * | 8/2013 | Wach | H04N 5/335 348/241 |
| 8,655,068 B1 * | 2/2014 | Li | H04N 1/60 382/128 |
| 8,659,795 B2 * | 2/2014 | Nakamura | H04N 1/6055 358/1.9 |
| 8,730,355 B2 * | 5/2014 | Eki | H04N 5/3456 348/241 |
| 8,855,375 B2 * | 10/2014 | Macciola | H04N 1/387 358/448 |
| 2003/0103060 A1 | 6/2003 | Anderson | G06F 3/0481 345/619 |
| 2006/0188157 A1 * | 8/2006 | Kondo | H04N 1/6058 382/167 |
| 2007/0291337 A1 * | 12/2007 | Hibi | H04N 1/00384 358/528 |
| 2008/0298676 A1 * | 12/2008 | Matsuura | H04N 1/603 382/162 |
| 2009/0174726 A1 * | 7/2009 | Ollivier | H04N 1/6011 345/600 |
| 2009/0201310 A1 * | 8/2009 | Weiss | H04N 1/628 345/594 |
| 2009/0268076 A1 * | 10/2009 | Kawamura | H04N 1/00408 348/333.12 |
| 2011/0113387 A1 * | 5/2011 | Yoshimi | G06F 3/04883 715/856 |
| 2011/0154426 A1 * | 6/2011 | Doser | H04N 1/6088 725/118 |
| 2012/0014599 A1 * | 1/2012 | Kano | G06T 5/006 382/167 |
| 2012/0249536 A1 * | 10/2012 | Sutou | H04N 13/0011 345/419 |
| 2013/0064580 A1 * | 3/2013 | Igarashi | G03G 15/0189 399/301 |
| 2013/0201401 A1 * | 8/2013 | Hirooka | H04N 5/21 348/607 |
| 2014/0204125 A1 * | 7/2014 | Smith | G06F 17/30244 345/641 |
| 2014/0233914 A1 * | 8/2014 | Williams | G11B 27/031 386/280 |
| 2015/0334267 A1 * | 11/2015 | Hirakawa | H04N 1/6086 348/242 |

FOREIGN PATENT DOCUMENTS

| | | |
|---|---|---|
| JP | 2005198046 A | 7/2005 |
| JP | 2008301381 A | 12/2008 |
| JP | 2009-140382 A | 6/2009 |

* cited by examiner

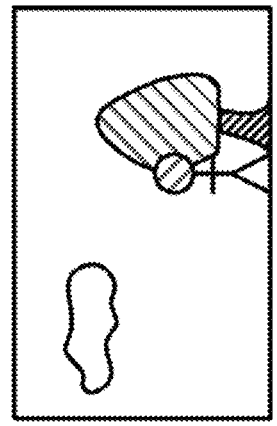
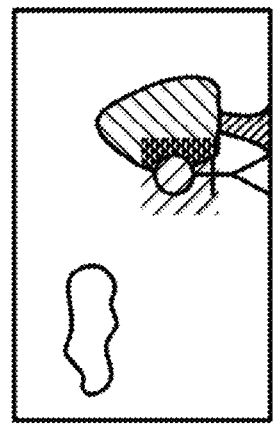
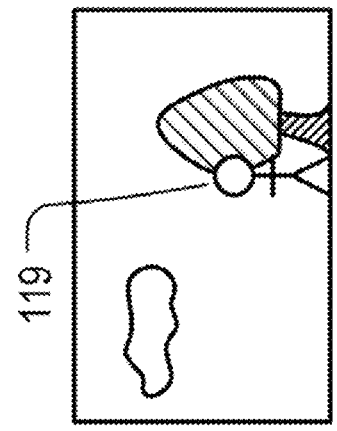

FIG. 5

| INPUT VALUE | | | OUTPUT VALUE | | |
|---|---|---|---|---|---|
| R VALUE | G VALUE | B VALUE | R VALUE | G VALUE | B VALUE |
| 0 | 0 | 0 | 0 | 0 | 0 |
| 0 | 0 | 8 | 0 | 0 | 6 |
| 0 | 0 | 16 | 0 | 0 | 14 |
| ⋮ | ⋮ | ⋮ | ⋮ | ⋮ | ⋮ |
| 0 | 0 | 256 | 0 | 1 | 250 |
| 0 | 8 | 0 | 0 | 8 | 0 |
| 0 | 8 | 8 | 0 | 8 | 7 |
| 0 | 8 | 16 | 0 | 9 | 15 |
| ⋮ | ⋮ | ⋮ | ⋮ | ⋮ | ⋮ |
| ⋮ | ⋮ | ⋮ | ⋮ | ⋮ | ⋮ |
| 256 | 256 | 256 | 256 | 256 | 256 |

FIG. 6A

| Y COORDINATE | X COORDINATE | | | | | | |
|---|---|---|---|---|---|---|---|
| | R VALUE, G VALUE, B VALUE | | | | | | |
| | ... | 99 | 100 | 101 | 102 | ... | |
| ... | ... | ... | ... | ... | ... | ... | |
| 59 | ... | 0,0,3 | 0,6,8 | 3,3,3 | 4,5,6 | ... | |
| 60 | ... | 4,6,5 | 3,7,7 | 3,6,9 | 4,5,9 | ... | |
| 61 | ... | 5,5,5 | 0,5,5 | 3,6,7 | 3,6,7 | ... | |
| 62 | ... | 0,4,8 | 0,0,0 | 2,3,4 | 0,7,6 | ... | |
| ... | ... | ... | ... | ... | ... | ... | |

FIG. 6B

| CATEGORY | | | FREQUENCY |
|---|---|---|---|
| R | G | B | His[R,G,B] |
| 0 | 0 | 0 | 3 |
| 0 | 0 | 8 | 1 |
| 0 | 0 | 16 | 0 |
| ... | ... | ... | ... |
| 0 | 0 | 248 | 0 |
| 0 | 8 | 0 | 0 |
| 0 | 8 | 8 | 0 |
| 0 | 8 | 16 | 0 |
| ... | ... | ... | ... |
| 248 | 248 | 248 | 0 |

FIG. 8

```
<ColorDecision>
  <MediaRef ref="xxx"/>
  <ColorCorrection id="0000">
    <SOPNode>
      <Slope>1.2 1.3 1.4</Slope>
      <Offset>0.3 0.0 -0.3</Offset>
      <Area>100 100 149 149</Area>
    </SOPNode>
  </ColorCorrection>
</ColorDecision>
```

FIG. 19

```
CDL FILE

"WHOLE"
Slope       0.0
Offset      0.05
Power       1.0
Saturation  0.15

<EXPANDED META-INFORMATION>
"AREA 1"
Position  1000, 900
Size      950, 1100
Slope       0.0
Offset      0.05
Power       1.0
Saturation  0.15
"AREA 2"
Position  2300, 200
Size      950, 1100
Slope       1.0
Offset      0.7
Power       2.5
Saturation  0.4
```

- IMAGE QUALITY ADJUSTMENT PARAMETER OF WHOLE IMAGE
- START POINT (HORIZONTAL POSITION, VERTICAL POSITION) OF REGION OF INTEREST
- SIZE (VERTICAL WIDTH, HORIZONTAL WIDTH) OF REGION OF INTEREST
- IMAGE QUALITY ADJUSTMENT PARAMETER OF REGION OF INTEREST

FIG. 26

"WHOLE"
Slope        a
Offset       b
Power        c
Saturation   d

<EXPANDED META-INFORMATION>
"AREA 1"
Position  x1,y1
Size      X1,Y1
Slope     a1
Offset    b1
Power     c1
Saturation  d1
"AREA 2"
Position  x2,y2
Size      X2,Y2
Slope     a2
Offset    b2
Power     c2
Saturation  d2

ORIGINAL IMAGE

OUTPUT IMAGE
OF ADJUSTMENT VALUE SETTING UNIT

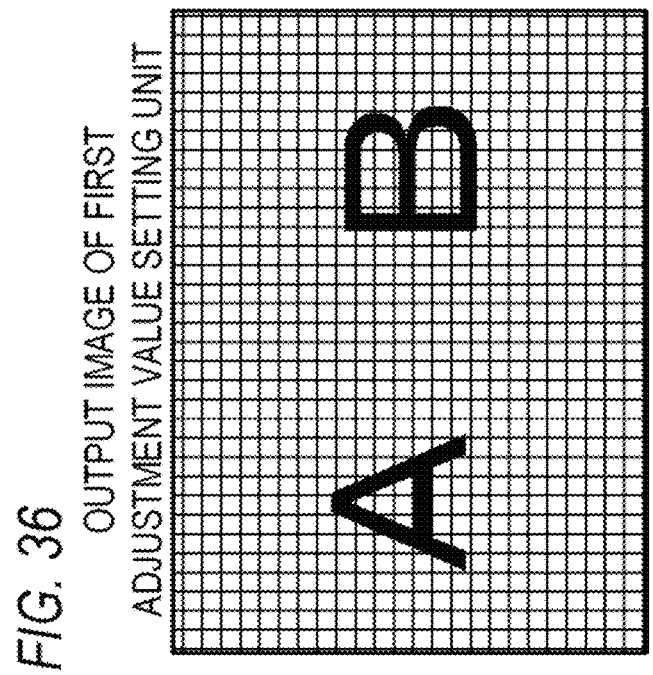
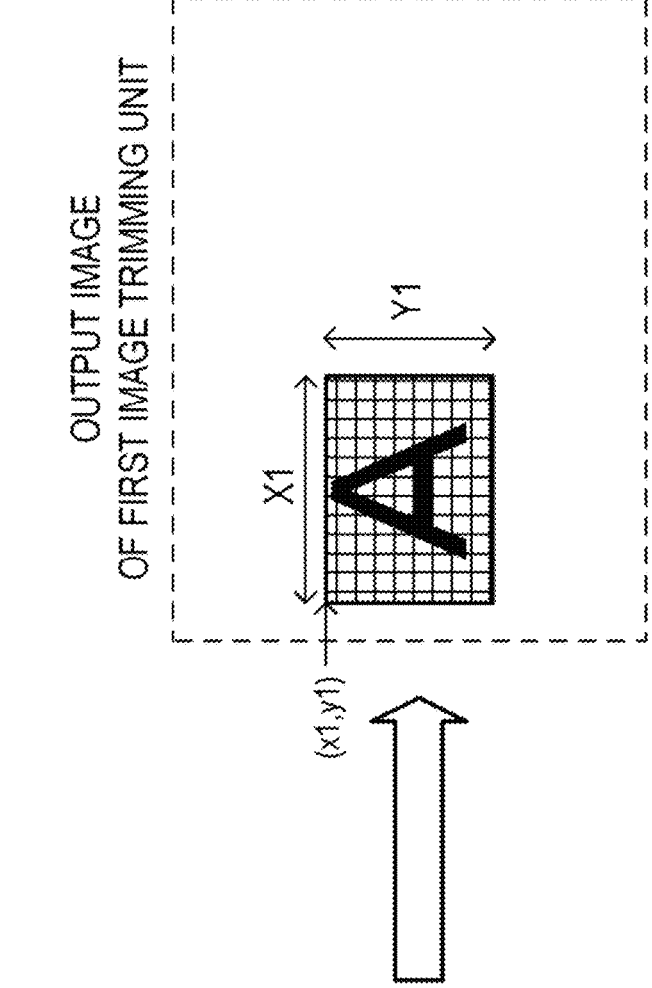
FIG. 36

IMAGE PROCESSING APPARATUS AND CONTROL METHOD THEREOF

BACKGROUND OF THE INVENTION

Field of the Invention

The present invention relates to an image processing apparatus and a control method thereof.

Description of the Related Art

In a production flow of video content, generally, an image processing apparatus (for example, a personal computer) used differs from one process to another. Therefore, an intention of image processing (such as image quality adjustment) performed in a photographing process is conveyed to an editing process using a script. For example, contents of color adjustment performed in the photographing process are converted into scripts of a standardized ASC-CDL image processing procedure and outputted to the editing process together with an original video. In the editing process, advanced editing work is performed in consideration of the intention of the color adjustment performed in the photographing process by referring to a color adjustment result reproduced based on the delivered script.

Since scripts of the ASC-CDL image processing procedure described above are used by a wide variety of photographing and editing apparatuses, the scripts are standardized using only relatively simple image processing elements (ASC Technology Committee, Digital Intermediate Subcommittee ASC Color Decision List (ASC CDL) Transfer Functions and Interchange Syntax ASC-CDL_Release 1.2 Joshua Pines and David Reisner, 2009-05-04).

In addition, a technique is proposed for calculating a coefficient of a correction regression curve for each mesh of a table storing measured values (Japanese Patent Application Laid-open No. 2005-198046).

Furthermore, a technique is proposed for performing image processing by temporarily switching a lookup table to a single approximation circuit (Japanese Patent Application Laid-open No. 2008-301381).

According to the technique disclosed in Japanese Patent Application Laid-open No. 2005-198046, a coefficient of each mesh may conceivably be transmitted from a preceding process to a following process. However, when there is a huge number of meshes, the amount of data to be transmitted is also huge. For example, performing complicated image processing such as stored color correction in a preceding process results in a huge amount of data to be transmitted.

In addition, according to the technique disclosed in Japanese Patent Application Laid-open No. 2008-301381, a single relational expression representing input/output characteristics of a lookup table may conceivably be transmitted from a preceding process to a following process. However, when the input/output characteristics of the lookup table is complex, it is difficult to determine a single relational expression accurately representing such input/output characteristics. Therefore, when complicated image processing is performed in a preceding process, it is sometimes impossible to express a degree of the image processing using a script and, as a result, an intention of the image processing performed in a preceding process cannot be accurately conveyed to a following process.

SUMMARY OF THE INVENTION

The present invention provides a technique that enables a color adjustment process performed in a preceding process to be reproduced in a following process in a simple and accurate manner.

The present invention in its first aspect provides an image processing apparatus, comprising:

an adjusting unit configured to perform a color adjustment process on an input image and generate an output image:

a determining unit configured to determine an approximate expression which approximates conversion characteristics of the color adjustment process; and an outputting unit configured to output color adjustment information including information representing the approximate expression determined by the determining unit, wherein when the adjusting unit performs the color adjustment process on a partial region of the input image, the outputting unit outputs, as the color adjustment information, information including the information representing the approximate expression determined by the determining unit and region information representing the partial region.

The present invention in its second aspect provides a control method of an image processing apparatus, comprising:

performing a color adjustment process on an input image and generating an output image:

determining an approximate expression which approximates conversion characteristics of the color adjustment process; and outputting color adjustment information including information representing the determined approximate expression, wherein in outputting the color adjustment information, when the color adjustment process is performed on a partial region of the input image, information including the information representing the determined approximate expression and region information representing the partial region is outputted as the color adjustment information.

According to the present invention, a color adjustment process performed in a preceding process can be reproduced in a following process in a simple and accurate manner.

Further features of the present invention will become apparent from the following description of exemplary embodiments with reference to the attached drawings.

BRIEF DESCRIPTION OF THE DRAWINGS

FIGS. 3A to 3C are conceptual diagrams showing an example of an editing process according to the first embodiment;

FIG. 5 is a diagram showing an example of conversion data according to the first embodiment;

FIGS. 6A and 6B are diagrams showing examples of pixel values and a histogram of a photographing side playback image according to the first embodiment;

FIG. 8 is a diagram showing an example of an adjustment script according to the first embodiment;

FIG. 19 is a diagram showing a CDL file according to the third embodiment;

FIG. 26 is a diagram showing a CDL file according to a seventh embodiment;

FIG. 36 is a diagram showing an output image of a first image trimming unit according to the eighth embodiment;

DESCRIPTION OF THE EMBODIMENTS

<First Embodiment>

An image processing apparatus and a control method thereof according to a first embodiment of the present invention will be described.

Figure 1:
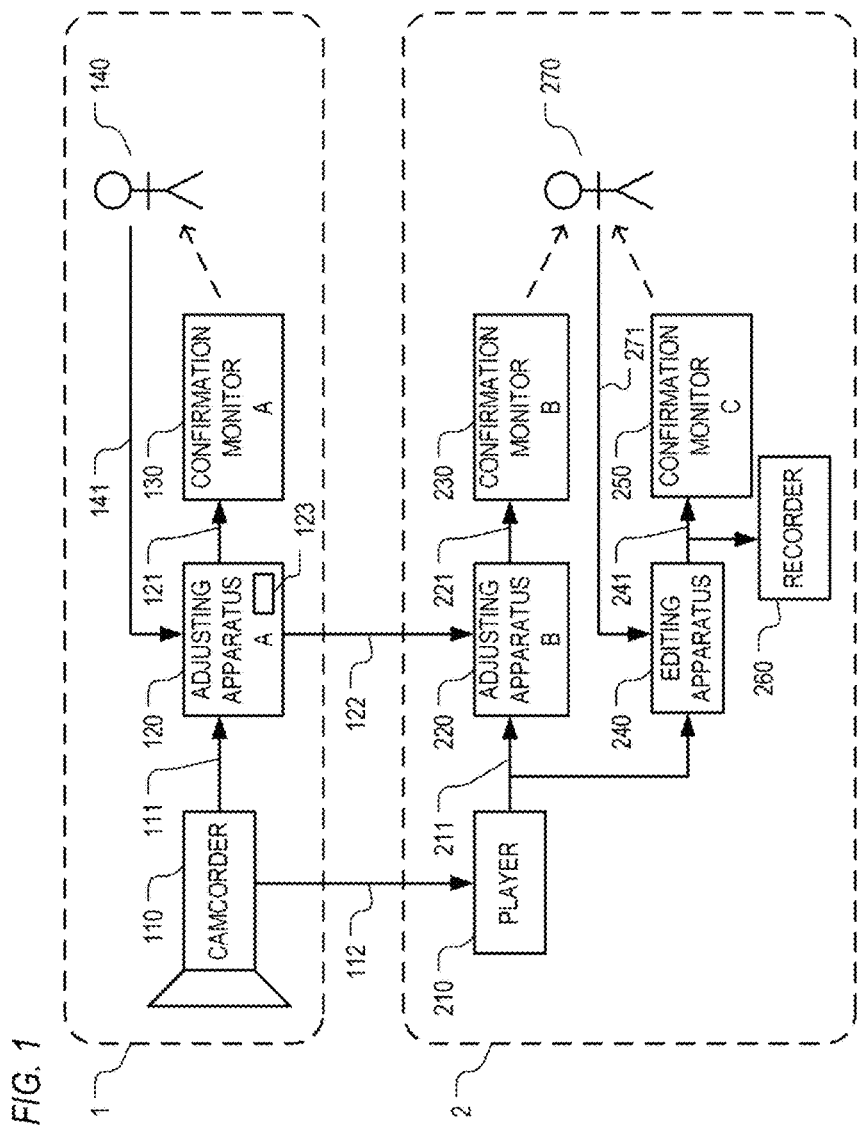
FIG. 1 is a diagram showing an example of an image production flow according to a first embodiment.

FIG. 1 is a diagram showing an example of a production flow of video content according to the present embodiment.

In FIG. 1, a photographing system 1 is used in a first process (in the present embodiment, a photographing process) in a production flow of video content. An editing system 2 is used in a second process (a process subsequent to the first process; in the present embodiment, an editing process) in the production flow of video content. The photographing process is a process for performing photography and confirmation of an image. The editing process is a process in which the image photographed in the photographing process is edited. Moreover, the first process and the second process are not limited to the photographing process and the editing process. For example, the first process may be an editing process and the second process may be a confirming process in which a final confirmation of the image is performed.

First, the photographing process will be described.

A camcorder 110 photographs an image and records the photographed image in a recording medium (not shown). When a user (for example, a photographer 140) performs a selection operation for selecting a photographed image to be confirmed, the camcorder 110 reads out the selected photographed image from the recording medium. In addition, the camcorder 110 generates a photographing side playback image 111 by subjecting the read-out photographed image to a playback process and outputs the photographing side playback image 111 to an adjusting apparatus A 120. In addition, when a user (for example, an editor 270) performs a selection operation for selecting an image that is an object of editing, the camcorder 110 reads out the selected photographed image from the recording medium and outputs the read-out photographed image as an editing side photographed image 112 to the editing system 2 (specifically, a player 210).

The adjusting apparatus A 120 is an image processing apparatus that performs a color adjustment process on an input image (the photographing side playback image 111). Moreover, in addition to a color adjustment process, other image processing such as a brightness adjustment process, an edge enhancement process, and a blurring process may be performed by the adjusting apparatus A 120.

Specifically, in response to an adjustment instruction 141 issued by the photographer 140, the adjusting apparatus A 120 generates a photographing side adjusted image 121 by performing a color adjustment process on the photographing side playback image 111. In addition, the adjusting apparatus A 120 outputs the generated photographing side adjusted image 121 to a confirmation monitor A. In addition, the adjusting apparatus A 120 obtains a coefficient of a characteristic approximate expression (an approximate expression representing a relationship between an input pixel value and an output pixel value) that approximates conversion characteristics of the color adjustment process and outputs the coefficient as color adjustment information for performing a simulated color adjustment process that simulates (simply reproduces) an equivalent color adjustment process using another apparatus. In the present embodiment, color adjustment information is outputted in XML text data (hereinafter referred to as an adjustment script 122). The adjustment script 122 outputted from the adjusting apparatus A 120 is written into a portable memory card 123 to be delivered to other apparatuses.

A confirmation monitor A 130 is a monitor for displaying the photographing side adjusted image 121 on a screen.

The photographer 140 inputs the adjustment instruction 141 to the adjusting apparatus A 120 while viewing the photographing side adjusted image 121 displayed by the confirmation monitor A 130 so that respective pixels in the photographing side adjusted image acquire desired colors. The adjustment instruction 141 includes type information representing a type of a color adjustment process, region information representing an adjustment region, and a script output flag. For example, region information may be coordinate information of a start point and an end point of an adjustment region or coordinate information of a reference point (such as a start point, an end point, or a center point) of an adjustment region. In addition, region information may be coordinate information of a reference point (such as a start point, an end point, or a center point) and size information (information such as an area) of an adjustment region. Moreover, while a rectangular region specified by the user will be described as an adjustment region, a region of an object (target object) which has an arbitrary shape and which is specified by the user may be set as an adjustment region.

Figure 2A:
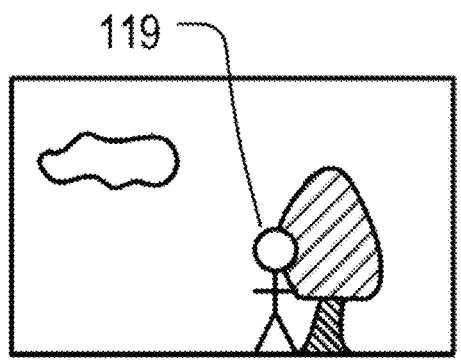
FIGS. 2A and 2B are conceptual diagrams showing an example of a photographing process according to the first embodiment.
Figure 2B:
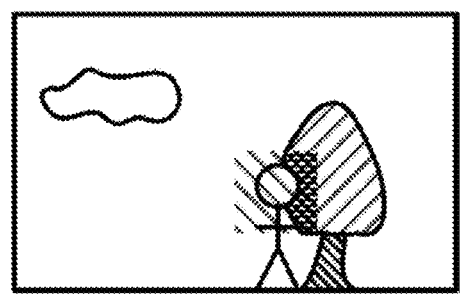

FIGS. 2A and 2B show conceptual diagrams of the photographing process.

First, as shown in FIG. 2A, the photographing side adjusted image 121 not yet subjected to a color adjustment process (in other words, the photographing side playback image 111 obtained by the camcorder 110) is displayed on the confirmation monitor A 130. With an intention to give a person's face 119 a darker complexion, the photographer 140 inputs the adjustment instruction 141 including information representing an adjustment process for making the complexion darker as the type information and information representing a region around the person as the region information to the adjusting apparatus A 120. Once the adjustment instruction 141 is inputted to the adjusting apparatus A 120, the adjusting apparatus A 120 generates the photographing side adjusted image 121 subjected to a color adjustment process in accordance with the inputted adjustment instruction 141. Subsequently, as shown in FIG. 2B, the confirmation monitor A 130 displays the photographing side adjusted image 121 subjected to the color adjustment process. The photographer 140 confirms the adjustment result and inputs the adjustment instruction 141 including a script output flag in addition to the type information and the region information to the adjusting apparatus A 120. The adjusting apparatus A 120 generates the adjustment script 122 corresponding to the input image in accordance with the adjustment instruction 141 and outputs the adjustment script 122.

Moreover, while a case where a type of a color adjustment process and an adjustment region are selected by the user will be described as an example in the present embodiment, the type of a color adjustment process and the adjustment region may be automatically selected in accordance with a type of the input image (the editing side playback image 211) or the like.

Next, the editing process will be described.

The player 210 generates an editing side playback image 211 by performing a playback process on the editing side photographed image 112 and outputs the editing side playback image 211 to an adjusting apparatus B 220 and an editing apparatus 240.

The adjusting apparatus B 220 is an image processing apparatus that performs image processing on an input image (the editing side playback image 211).

Specifically, the adjusting apparatus B 220 reads out an adjustment script 122 corresponding to the editing side playback image 211 from the memory card 123. The adjusting apparatus B generates an editing side adjusted image 221 by performing a color adjustment process (a simulated color adjustment process) based on the adjustment script 122 on the editing side playback image 211. In addition, the adjusting apparatus B 220 outputs the generated editing side adjusted image 221 to a confirmation monitor B 230.

The editing apparatus 240 is an image processing apparatus that performs image processing on an input image (the editing side playback image 211). With the editing apparatus 240, editing work more advanced (finer image processing) than the adjusting apparatus A 120 and the adjusting apparatus B 220 can be performed.

Specifically, the editing apparatus 240 generates an edited image 241 by performing an editing process (a color adjustment process) on the editing side playback image 211 according to an editing instruction 271 issued by the editor 270. In addition, the editing apparatus 240 outputs the generated edited image 241 to a confirmation monitor C 250 and a recorder 260.

The confirmation monitor B 230 is a monitor for displaying the editing side adjusted image 221 on a screen.

The confirmation monitor C 250 is a monitor for displaying the edited image 241 on a screen.

The recorder 260 records the edited image 241 on a recording medium (not shown).

Moreover, while an example in which the editing side adjusted image 221 and the edited image 241 are respectively displayed on different monitors will be described in the present embodiment, the editing side adjusted image 221 and the edited image 241 may be displayed on a same monitor.

FIGS. 3A to 3C show conceptual diagrams of the editing process.

First, as shown in FIG. 3A, the edited image 241 not yet subjected to a color adjustment process (in other words, the editing side playback image 211 obtained by the player 210; an unedited image) is displayed on the confirmation monitor C 250. In addition, as shown in FIG. 3B, the editing side adjusted image 221 subjected to a color adjustment process based on the adjustment script 122 is displayed on the confirmation monitor B 230. In this case, the adjustment script 122 is information describing a parameter for approximating (simply reproducing) conversion characteristics of the color adjustment process performed by the adjusting apparatus A 120. Therefore, a sample image with a degree of adjustment intended by the photographer 140 is displayed as the editing side adjusted image 221 on the confirmation monitor B 230.

The editor 270 compares the unedited image (FIG. 3A) displayed on the confirmation monitor C 250 and the sample image (FIG. 3B) displayed on the confirmation monitor B 230 with each other in order to grasp the intention of adjustment in the sample image. In addition, the editor 270 inputs the editing instruction 271 into the editing apparatus 240 based on the grasped intention of adjustment.

Once the editing instruction 271 is inputted to the editing apparatus 240, the editing apparatus 240 generates the edited image 241 subjected to a color adjustment process in accordance with the inputted editing instruction 271. Subsequently, as shown in FIG. 3C, the confirmation monitor C 250 displays the edited image 241 subjected to the color adjustment process. At the same time, the recorder 260 records the edited image 241 subjected to the color adjustment process on a recording medium (not shown). Moreover, recording of the edited image by the recorder 260 may be performed in accordance with a recording instruction or an editing completion instruction issued by the editor 270.

As described earlier, with the editing apparatus 240, editing work more advanced (finer image processing) than the adjusting apparatus A 120 and the adjusting apparatus B 220 can be performed. For example, with the adjusting apparatus A 120 and the adjusting apparatus B 220, a color adjustment process can only be performed in units of rectangular regions (FIG. 2B and FIG. 3B). On the other hand, with the editing apparatus 240, a color adjustment process can only be performed on regions of objects with irregular arbitrary shapes. As a result, a natural image such as that shown in FIG. 3C can be obtained.

As shown, with the production flow shown in FIG. 1, roles played by the photographing process and the editing process are maintained. Specifically, the photographer 140 can concentrate on photographic work in the photographing process and the editor 270 can concentrate on editing work in the editing process. In addition, the adjustment script 122 functions as an intention of an adjustment instruction by the photographer 140 and a final image as desired by the photographer 140 can be obtained in the editing process.

Next, details of the adjusting apparatus A 120 will be described.

Figure 4:
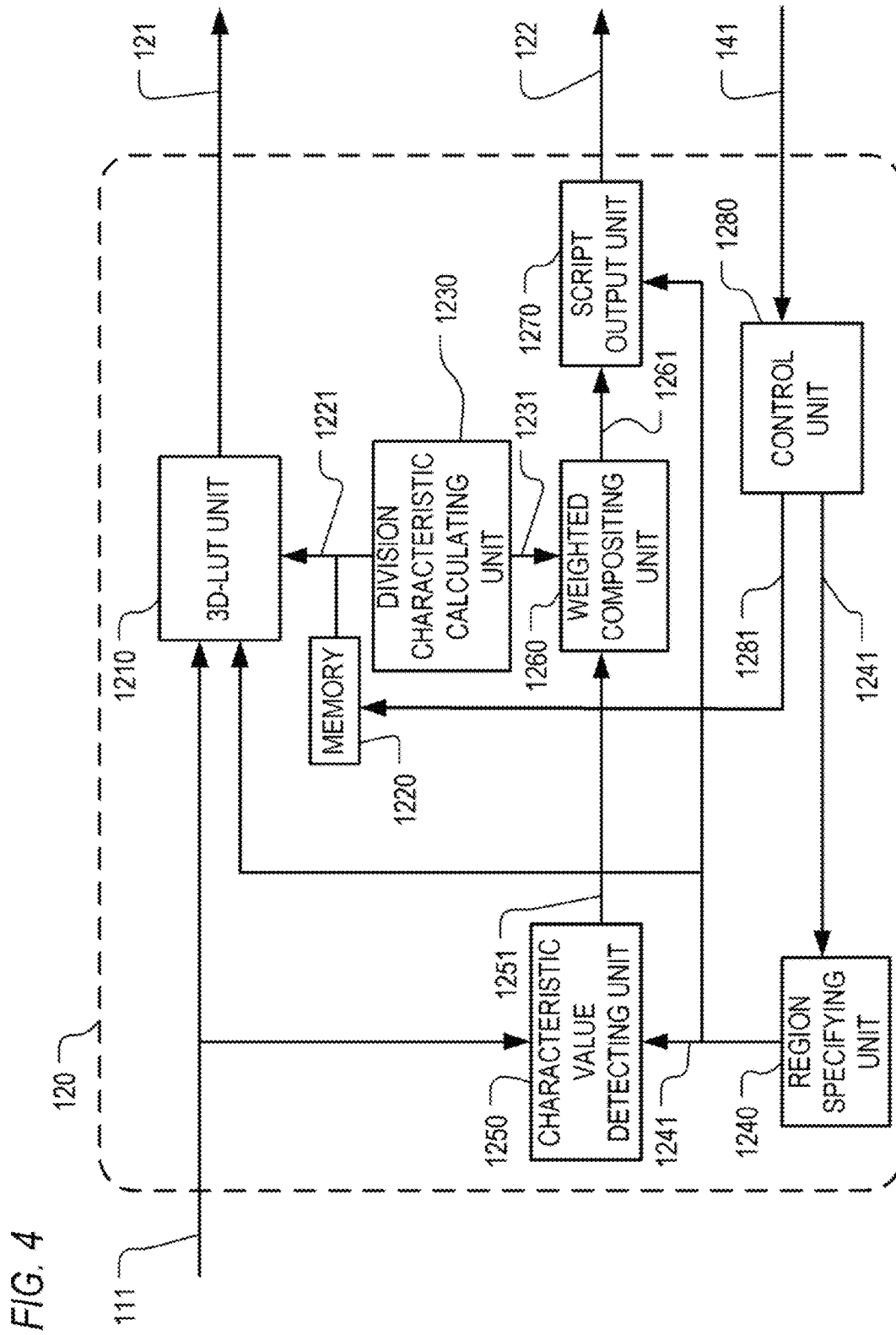
FIG. 4 is a block diagram showing an example of a configuration of an adjusting apparatus A according to the first embodiment.

FIG. 4 is a block diagram showing an example of a configuration of the adjusting apparatus A 120.

A memory 1220 stores a table in which pixel values of an input image (pixel values of the photographing side playback image 111) and pixel values of an output image (pixel values of the photographing side adjusted image 121) are associated with each other. In the present embodiment, the memory 1220 stores, in advance, a plurality of tables corresponding to a plurality of color adjustment processes of different types (contents). A plurality of color adjustment processes of different types refer to, for example, color adjustment processes preset in advance in accordance with modes such as a normal mode, a cinema mode, and a dynamic mode. The memory 1220 is, for example, a ROM or a RAM. Alternatively, a plurality of tables corresponding to a plurality of color adjustment processes of different types may be read from an external apparatus or the like to be stored in the memory 1220. Alternatively, a configuration may be adopted in which a color adjustment process table is dynamically generated in accordance with a color adjustment amount instructed by the user and the color adjustment process table is stored in the memory 1220.

A 3D-LUT unit 1210 performs a color conversion process on an input image (the photographing side playback image 111) and generates an output image (the photographing side adjusted image 121). In the present embodiment, for each pixel of the photographing side playback image 111, the 3D-LUT unit 1210 uses a table stored in the memory 1220 to determine a pixel value of the pixel after image processing (a pixel value of the photographing side adjusted image 121).

Specifically, the 3D-LUT unit 1210 acquires conversion data 1221 that is one of the plurality of tables stored in the memory 1220 from the memory 1220. The 3D-LUT unit 1210 generates the photographing side adjusted image 121 by converting RGB values of pixels in an adjustment region (a region represented by region information 1241 included in the adjustment instruction 141) of the photographing side playback image 111 using the conversion data 1221. In addition, the 3D-LUT unit 1210 outputs the generated photographing side adjusted image 121 to the confirmation monitor A 130.

The conversion data 1221 is, for example, a table such as that shown in FIG. 5. The conversion data 1221 shown in FIG. 5 is a table representing a pixel value after image processing for each pixel value before image processing. The conversion data 1221 shown in FIG. 5 is a lookup table having a pixel value of the photographing side playback image 111 as an input value and a pixel value of the photographing side adjusted image 121 as an output value. FIG. 5 shows the conversion data 1221 in a case where a pixel value is an RGB value (R value, G value, B value). When using the conversion data 1221 shown in FIG. 5, an RGB value (0, 8, 16) of the photographing side playback image 111 is converted into an RGB value (0, 9, 15) of the photographing side adjusted image 121. When the RGB value of the photographing side playback image 111 is not included in a plurality of RGB values prepared as input values of the conversion data 1221, the RGB value of the photographing side adjusted image 121 is obtained by interpolation. For example, an RGB value (0, 0, 4) of the photographing side playback image 111 is not included in the plurality of RGB values prepared as input values of the conversion data 1221 shown in FIG. 5. In this case, from an output value (0, 0, 0) corresponding to an input value (0, 0, 0) and an output value (0, 0, 6) corresponding to an input value (0, 0, 8), an output value (0, 0, 3) corresponding to an input value (0, 0, 4) is obtained by interpolation. Accordingly, the RGB value (0, 0, 4) of the photographing side playback image 111 is converted into an RGB value (0, 0, 3) of the photographing side adjusted image 121. Moreover, pixels that are objects of the conversion described above are limited to the pixels in the adjustment region. Pixels outside of the adjustment region are not subjected to the conversion described above and the RGB value of the photographing side playback image 111 is adopted without modification as the RGB value of the photographing side adjusted image 121. In other words, when the adjustment region is a partial region of the photographing side playback image 111, the 3D-LUT unit 1210 performs image processing (a color adjustment process) on the partial region.

A division characteristic calculating unit 1230 calculates, for each of a plurality of color ranges obtained by dividing a color space (ranging from RGB=0, 0, 0 to 255, 255, 255) of an image, an individual parameter (division characteristics 1231) representing conversion characteristics of each color range. In the present embodiment, a plurality of division characteristics 1231 are calculated using the conversion data 1221. Specifically, a range enclosed by eight lattice points adjacent to one another in a 3D-LUT is assumed to be a color range, and a coefficient of a linear function that interpolates output values between the lattice points is calculated as the division characteristics 1231. Since a linear function (a linear expression) includes a coefficient of a first-order term (a slope) and a coefficient of a zero-order term (an intercept), the division characteristics 1231 is expressed by a set of two coefficients. Details of a calculation method of the division characteristics 1231 used by the division characteristic calculating unit 1230 will be described later.

A region specifying unit 1240 acquires and stores region information 1241 included in the adjustment instruction 141. In addition, the region specifying unit 1240 notifies the 3D-LUT unit 1210, a characteristic value detecting unit 1250, and a script output unit 1270, of the region information 1241.

The characteristic value detecting unit 1250 detects a characteristic value regarding a color distribution of the input image (the photographing side playback image 111). In the present embodiment, a characteristic value in an adjustment region represented by the region information 1241 is acquired. In addition, in the present embodiment, a color histogram is acquired as a characteristic value regarding a color distribution. Alternatively, a characteristic value of a partial region (for example, a region of a skin color section of a face) in the adjustment region represented by the region information 1241 may be acquired. Alternatively, a characteristic value of a particular color (for example, skin color) in the adjustment region represented by the region information 1241 may be acquired.

Specifically, the characteristic value detecting unit 1250 generates a color histogram 1251 by classifying the respective pixels in the adjustment region of the photographing side playback image 111 according to RGB values and counting the number of pixels (frequency) belonging to each category (also referred to as a bin). In this case, categories favorably correspond to color ranges used when calculating the division characteristics 1231 described earlier. For example, for a category [R, G, B]=[0, 0, 0], the number of pixels satisfying 0≤R value <8, 0≤G value <8, and 0≤B value <8 among the pixels in the adjustment region is counted as a frequency. The color histogram 1251 is generated by performing this operation for 32×32×32=32768 color ranges. While ranges of R, G, and B have been divided every eight gradations in the present embodiment, the division may be performed more roughly or more finely. Alternatively, numbers of divisions (division pitches) may differ among R, G, and B.

FIG. 6A shows an example of RGB values of the respective pixels in the photographing side playback image 111. An X coordinate indicates a position of a pixel in a horizontal direction, and a Y coordinate indicates a position of a pixel in a vertical direction. When the RGB values of the respective pixels in the photographing side playback image 111 are the values shown in FIG. 6A and the adjustment region is a region enclosed by a dashed line in FIG. 6A, a frequency His [R, G, B] of each category of the histogram assumes a value shown in FIG. 6B. In FIG. 6B, a frequency His [0, 0, 0] represents a frequency of a division for which [R, G, B] is [0 to 7, 0 to 7, 0 to 7], while a frequency His [0, 0, 8] represents a frequency of a division for which [R, G, B] is [0 to 7, 0 to 7, 8 to 15]. Moreover, the region enclosed by the dashed line in FIG. 6A is a region having coordinates (X coordinate, Y coordinate)=(100, 60) as a start point and coordinates (101, 61) as an end point.

Alternatively, the characteristic value may be detected (extracted) from an image by image analysis or may be inputted from the outside. For example, the characteristic value may be inputted from the outside as metadata of the photographing side playback image 111. In addition, a final characteristic value may be obtained by correcting a characteristic value inputted from the outside.

A weighted compositing unit 1260 generates composition characteristics 1261 by compositing division characteristics 1231 of a plurality of color ranges based on the characteristic value obtained by the characteristic value detecting unit 1250. While the division characteristics 1231 are information representing an approximate expression for approximating conversion characteristics of individual color ranges, the composition characteristics 1261 are information representing an approximate expression (a composite approximate expression) that composites approximate expressions of a plurality of color ranges. In the present embodiment, a weighted average of the division characteristics 1231 for each of the color ranges is calculated as the composition characteristics 1261. When calculating a weighted average, a frequency of the color histogram 1251 of a color range (category) corresponding to the division characteristics 1231 is assumed to be a weight of the division characteristics 1231. In the present embodiment, coefficients CAr, CBr, CAg, CBg, CAb, and CBb in linear expressions 1-1 to 1-3 below which represent a relationship between an input pixel value (Ri, Gi, Bi) and an output pixel value (Ro, Go, Bo) are calculated as the composition characteristics 1261. Expression 1-1 is an approximate expression for approximating conversion characteristics of a R value, expression 1-2 is an approximate expression for approximating conversion characteristics of a G value, and expression 1-3 is an approximate expression for approximating conversion characteristics of a B value. Rmax, Gmax, and Bmax respectively denote a maximum gradation value of a R value, a maximum gradation value of a G value, and a maximum gradation value of a B value. A maximum gradation value refers to a maximum value among possible values.

$$Ro = CAr \times Ri + Rmax \times CBr \quad \text{(Expression 1-1)}$$

$$Go = CAg \times Gi + Gmax \times CBg \quad \text{(Expression 1-2)}$$

$$Bo = CAb \times Bi + Bmax \times CBb \quad \text{(Expression 1-3)}$$

Details of a calculation method of the composition characteristics 1261 used by the weighted compositing unit 1260 will be described later.

The script output unit 1270 outputs a parameter representing at least the composition characteristics 1261 determined by the weighted compositing unit 1260 and the region information 1241 as the adjustment script 122 to the outside. Specifically, the script output unit 1270 generates text data describing the composition characteristics 1261 and the region information 1241 in the XML format as the adjustment script 122 and outputs the generated adjustment script 122 to the outside. Details of the operation of the script output unit 1270 will be described later.

Moreover, when the adjustment region is an entire region of the photographing side playback image 111, the adjustment script 122 need not represent the region information 1241. In case of such a configuration, when the adjustment script 122 does not represent the region information 1241, a determination that the adjustment region is the entire region of the photographing side playback image 211 may be made in the editing process (the adjusting apparatus B 220).

A control unit 1280 changes a start address (a read-out start address) 1281 of the memory 1220 based on the adjustment instruction 141. Accordingly, the conversion data 1221 read out from the memory 1220 by the 3D-LUT unit 1210 is changed and contents of the color adjustment process by the 3D-LUT unit 1210 is changed. In addition, the control unit 1280 controls operations of the entire adjusting apparatus A 120 through a control line (not shown).

Details of the calculation method of the division characteristics 1231 used by the division characteristic calculating unit 1230 will now be described.

Figure 9:
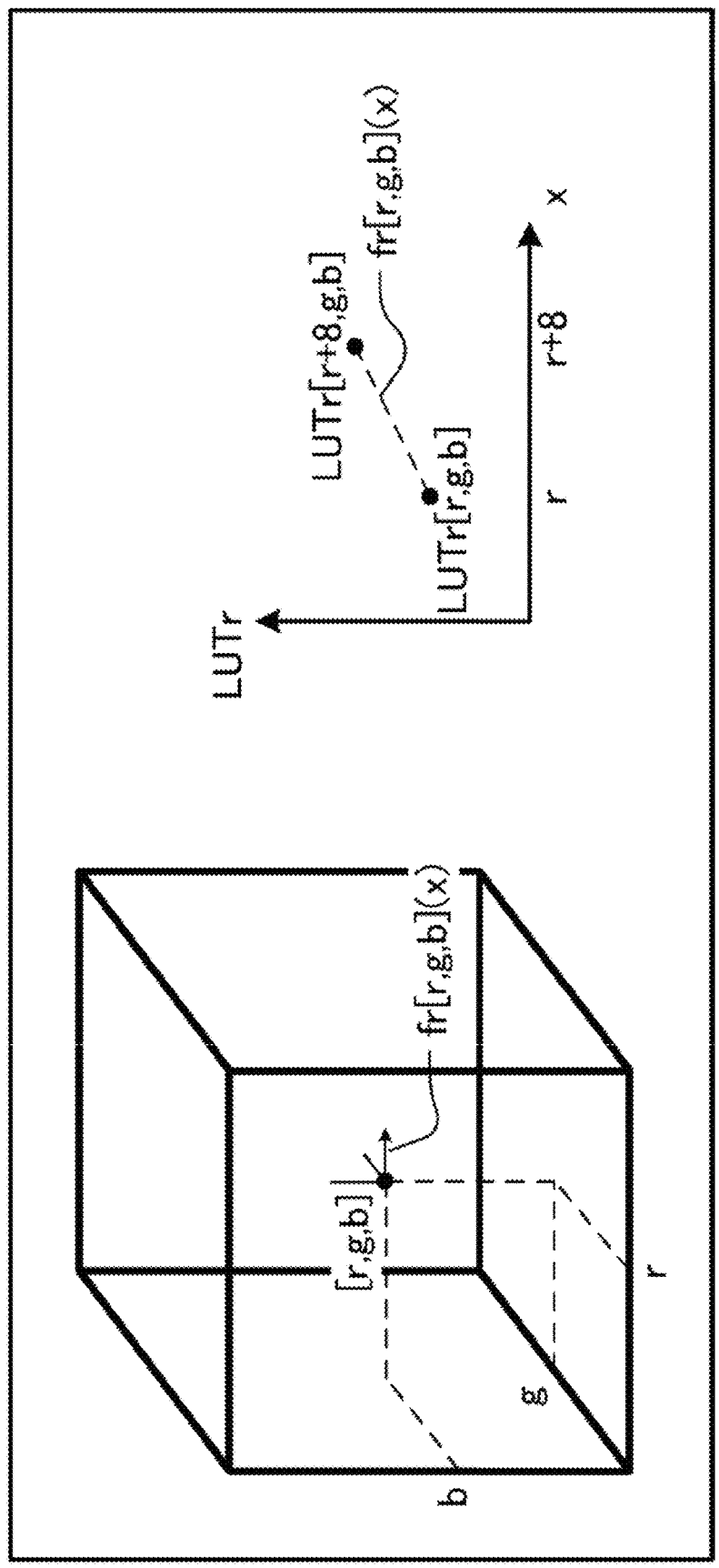
FIG. 9 is a conceptual diagram showing an example of a lattice point interpolation formula according to the first embodiment.

First, for each lattice point [r, g, b] expressed by a three-dimensional address (r, g, b), a lattice point interpolation formula between the lattice point and an adjacent lattice point is obtained. Specifically, for each of an R direction, a G direction, and a B direction, a lattice point interpolation formula between the lattice point and a lattice point adjacent in the direction is obtained. r corresponds to an R value in an input value of the conversion data 1221. In a similar manner, g corresponds to a G value in an input value of the conversion data 1221, and b corresponds to a B value in an input value of the conversion data 1221. A conceptual diagram of a lattice point interpolation formula is shown in FIG. 9. FIG. 9 is a conceptual diagram of a lattice point interpolation formula with respect to the R direction.

Hereinafter, the R value in an output value of the conversion data 1221 at the lattice point [r, g, b] will be expressed as LUTr [r, g, b]. In a similar manner, the G value in an output value will be expressed as LUTg [r, g, b], and the B value in an output value will be expressed as LUTb [r, g, b].

In the present embodiment, an interval between lattice points (an interval between input values) is 8 gradations.

In the present embodiment, respective ranges of the R value, the G value, and the B value are 0 to 255, and a lattice point interpolation formula is calculated for lattice points for which r, g, and b assume values expressed by Expression 2-1, Expression 2-2, and Expression 2-3. In Expressions 2-1 to 2-3, l, m, and n denote integers equal to and larger than 0 and equal to and smaller than 32. Moreover, for interpolation calculation, a lattice point of r=256, a lattice point of g=256, and a lattice point of b=256 are prepared in the conversion data 1221.

$$r = 8 \times l \quad \text{(Expression 2-1)}$$

$$g = 8 \times m \quad \text{(Expression 2-2)}$$

$$b = 8 \times n \quad \text{(Expression 2-3)}$$

A lattice point interpolation formula fr [r, g, b] (x1) in the R direction at the lattice point [r, g, b] is expressed in a shape of Expression 3, where x1 denotes an R value as a variable equal to or larger than r and smaller than r+8.

$$fr[r, g, b](x1) = ar[r, g, b]x1 + br[r, g, b] \quad \text{(Expression 3)}$$

A coefficient ar [r, g, b] and a coefficient br [r, g, b] in Expression 3 are respectively calculated by Expression 4-1 and Expression 4-2.

$$ar[r, g, b] = (LUTr[r+8, g, b] - LUTr[r, g, b])/8 \quad \text{(Expression 4-1)}$$

$$br[r, g, b] = LUTr[r, g, b] - ar[r, g, b] \times r \quad \text{(Expression 4-2)}$$

In a similar manner, a lattice point interpolation formula fg [r, g, b] (x2) in the G direction at the lattice point [r, g, b] is expressed in a shape of Expression 5 and a lattice point interpolation formula fb [r, g, b] (x3) in the B direction at the lattice point [r, g, b] is expressed in a shape of Expression 6, where x2 denotes a G value as a variable equal to or larger than g and smaller than g+8, and x3 denotes a B value as a variable equal to or larger than b and smaller than b+8.

$$fg[r, g, b](x2) = ag[r, g, b]x2 + bg[r, g, b] \quad \text{(Expression 5)}$$

$$fb[r, g, b](x3) = ab[r, g, b]x3 + bb[r, g, b] \quad \text{(Expression 6)}$$

A coefficient ag [r, g, b] and a coefficient bg [r, g, b] in Expression 5 are respectively calculated by Expression 7-1 and Expression 7-2. A coefficient ab [r, g, b] and a coefficient bb [r, g, b] in Expression 6 are respectively calculated by Expression 8-1 and Expression 8-2.

$$ag[r, g, b] = (LUTg[r, g+8, b] - LUTg[r, g, b])/8 \quad \text{(Expression 7-1)}$$

$$bg[r, g, b] = LUTg[r, g, b] - ag[r, g, b] \times g \quad \text{(Expression 7-2)}$$

$$ab[r, g, b] = (LUTb[r, g, b+8] - LUTb[r, g, b])/8 \quad \text{(Expression 8-1)}$$

$$bb[r, g, b] = LUTb[r, g, b] - ab[r, g, b] \times b \quad \text{(Expression 8-2)}$$

Figure 10:
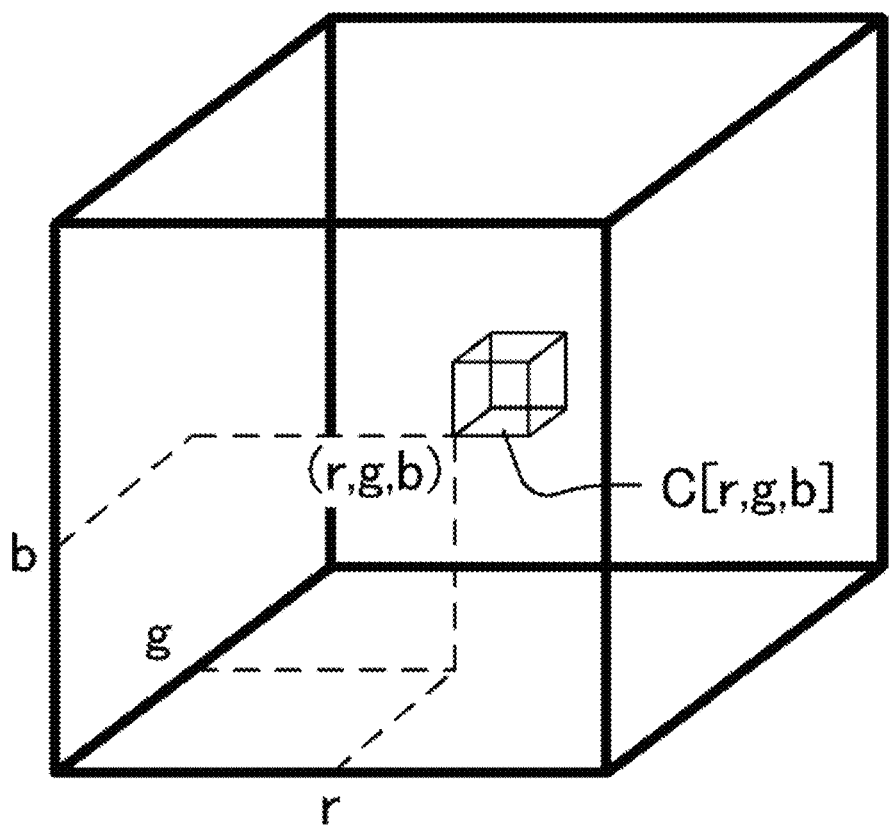
FIG. 10 is a conceptual diagram showing an example of a unit cube according to the first embodiment.
Figure 11:
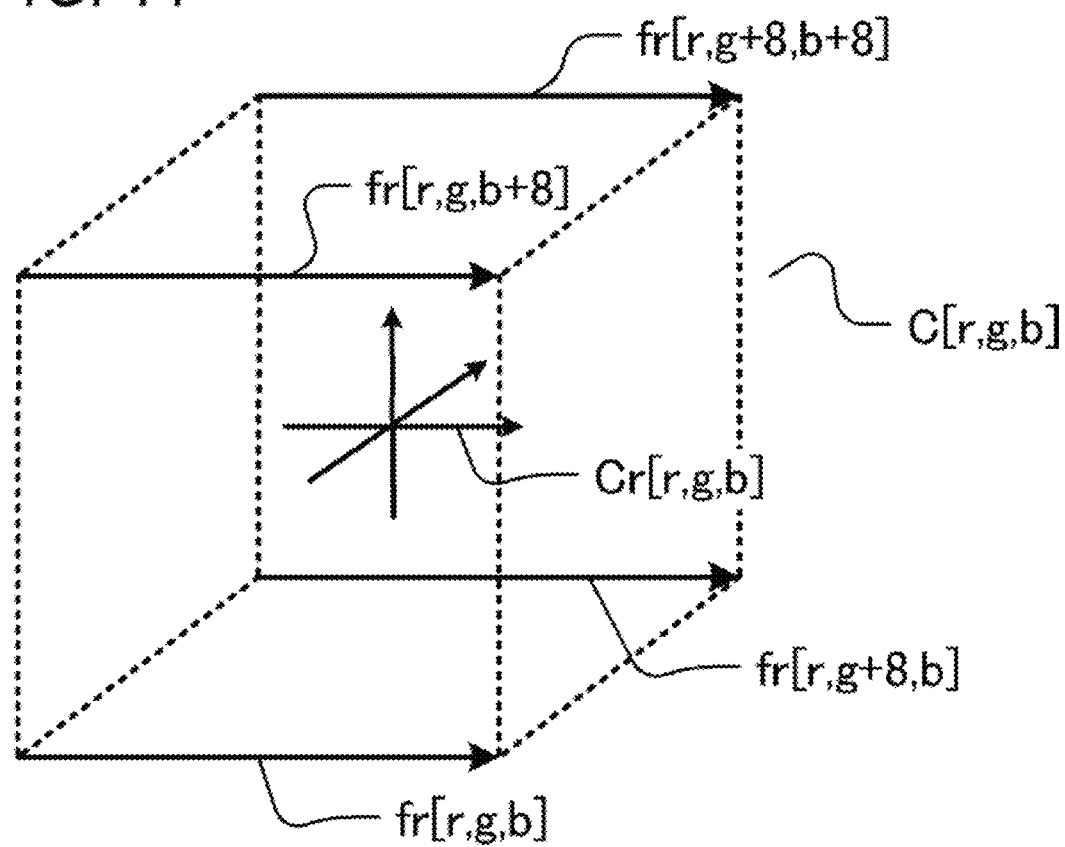
FIG. 11 is a conceptual diagram showing an example of a calculating method of division characteristics according to the first embodiment.

Next, the division characteristics 1231 is calculated for each range (color range) enclosed by eight lattice points adjacent to each other in a 3D-LUT. In the present embodiment, for each color range, coefficients of linear expressions 9, 11, and 12 below which represent a relationship between an input RGB value (Ri, Gi, Bi) and an output RGB value (Ro, Go, Bo) are calculated as the division characteristics 1231. Specifically, a set of the coefficients Ar [r, g, b], Br [r, g, b], Ag [r, g, b], Bg [r, g, b], Ab [r, g, b], and Bb [r, g, b] in Expressions 9, 11, and 12 represent the division characteristics 1231. Expression 9 is an approximate expression for approximating conversion characteristics of a R value, expression 11 is an approximate expression for approximating conversion characteristics of a G value, and expression 12 is an approximate expression for approximating conversion characteristics of a B value. Division characteristics are obtained for all color ranges (unit cubes having eight lattice points as vertexes) in the LUT. A conceptual diagram of a unit cube is shown in FIG. 10, and a conceptual diagram of a method of calculating division characteristics with respect to a unit cube is shown in FIG. 11.

A unit cube C [r, g, b] having a lattice point [r, g, b] as a start point will now be considered. In other words, the unit cube C [r, g, b] is a color range having eight lattice points [r, g, b], [r+8, g, b], [r, g+8, b], [r, g, b+8], [r+8, g+8, b], [r+8, g, b+8], [r, g+8, b+8], and [r+8, g+8, b+8] as vertexes. An approximate expression of conversion characteristics of the R value in the unit cube C [r, g, b] is represented by Expression 9.

$$Cr[r, g, b](x1) = Ar[r, g, b]x1 + Br[r, g, b] \quad \text{(Expression 9)}$$

Coefficients Ar [r, g, b] and Br [r, g, b] in Expression 9 are respectively calculated by Expression 10-1 and Expression 10-2. Coefficients ar [ ] and br [ ] are respectively calculated using Expression 4-1 and Expression 4-2 described earlier.

$$Ar[r, g, b] = (ar[r, g, b] + ar[r, g, b+8] + ar[r, g+8, b] + ar[r, g+8, b+8])/4 \quad \text{(Expression 10-1)}$$

$$Br[r, g, b] = (br[r, g, b] + br[r, g, b+8] + br[r, g+8, b] + br[r, g+8, b+8])/4 \quad \text{(Expression 10-2)}$$

In a similar manner, an approximate expression of conversion characteristics of the G value in the unit cube C [r, g, b] is represented by Expression 11. An approximate expression of conversion characteristics of the B value in the unit cube C [r, g, b] is represented by Expression 12.

$$Cg[r, g, b](x2) = Ag[r, g, b]x2 + Bg[r, g, b] \quad \text{(Expression 11)}$$

$$Cb[r, g, b](x3) = Ab[r, g, b]x3 + Bb[r, g, b] \quad \text{(Expression 12)}$$

Coefficients Ag [r, g, b] and Bg[r, g, b] in Expression 11 are respectively calculated by Expression 13-1 and Expression 13-2. Coefficients Ab [r, g, b] and Bb [r, g, b] in Expression 12 are respectively calculated by Expression 14-1 and Expression 14-2.

$$Ag[r, g, b] = (ag[r, g, b] + ag[r, g, b+8] + ag[r+8, g, b] + ag[r+8, g, b+8])/4 \quad \text{(Expression 13-1)}$$

$$Bg[r, g, b]=(bg[r, g, b]+bg[r, g, b+8]+bg[r+8, g, b]+bg[r+8, g, b+8])/4 \quad \text{(Expression 13-2)}$$

$$Ab[r, g, b]=(ab[r, g, b]+ab[r+8, g, b]+ab[r, g+8, b]+ab[r+8, g+8, b])/4 \quad \text{(Expression 14-1)}$$

$$Bb[r, g, b]=(bb[r, g, b]+bb[r+8, g, b]+bb[r, g+8, b]+bb[r+8, g+8, b])/4 \quad \text{(Expression 14-2)}$$

Details of a calculation method of the composition characteristics 1261 used by the weighted compositing unit 1260 will now be described.

As described earlier, the composition characteristics 1261 is a set of the coefficients CAr, CBr, CAg, CBg, CAb, and CBb.

In the present embodiment, as the coefficient CAr, a weighted average of a coefficient Ar of each color range is calculated. In a similar manner, as the coefficient CAg, a weighted average of a coefficient Ag of each color range is calculated. As the coefficient CAb, a weighted average of a coefficient Ab of each color range is calculated.

In addition, in the present embodiment, as the coefficient CBr, a value is calculated by dividing a weighted average of a coefficient Br of each color range by the maximum gradation value 255. In other words, the coefficient CBr is calculated by normalizing the weighted average of the coefficient Br of each color range so that the weighted average has a maximum value of 1. In a similar manner, in the present embodiment, as the coefficient CBg, a value is calculated by dividing a weighted average of a coefficient Bg of each color range by the maximum gradation value 255. As the coefficient CBb, a value is calculated by dividing a weighted average of a coefficient Bb of each color range by the maximum gradation value 255.

When calculating the weighted averages described above, a frequency of a color histogram corresponding to the color ranges is used as a weight.

In other words, the coefficients CAr, CBr, CAg, CBg, CAb, and CBb are calculated using Expressions 15-1 to 15-6. In Expressions 15-1 to 15-6, His [r, g, b] denotes a frequency of a color histogram corresponding to a color range C [r, g, b].

[Math 1]

$$CAr = \frac{\Sigma_{r,g,b}\{Ar[r, g, b] \cdot His[r, g, b]\}}{\Sigma_{r,g,b}\{His[r, g, b]\}} \quad \text{(Expression 15-1)}$$

$$CBr = \frac{\Sigma_{r,g,b}\{Br[r, g, b] \cdot His[r, g, b]\}}{255 \cdot \Sigma_{r,g,b}\{His[r, g, b]\}} \quad \text{(Expression 15-2)}$$

$$CAg = \frac{\Sigma_{r,g,b}\{Ag[r, g, b] \cdot His[r, g, b]\}}{\Sigma_{r,g,b}\{His[r, g, b]\}} \quad \text{(Expression 15-3)}$$

$$CBg = \frac{\Sigma_{r,g,b}\{Bg[r, g, b] \cdot His[r, g, b]\}}{255 \cdot \Sigma_{r,g,b}\{His[r, g, b]\}} \quad \text{(Expression 15-4)}$$

$$CAb = \frac{\Sigma_{r,g,b}\{Ab[r, g, b] \cdot His[r, g, b]\}}{\Sigma_{r,g,b}\{His[r, g, b]\}} \quad \text{(Expression 15-5)}$$

$$CBb = \frac{\Sigma_{r,g,b}\{Bb[r, g, b] \cdot His[r, g, b]\}}{255 \cdot \Sigma_{r,g,b}\{His[r, g, b]\}} \quad \text{(Expression 15-6)}$$

In the present embodiment, values divided by the maximum gradation value are obtained as the coefficients CBr, CBg, and CBb. Therefore, even if the maximum gradation value of the editing side playback image 211 and the maximum gradation value of the photographing side playback image 111 differ from one another, a color adjustment process similar to the color adjustment process performed by the adjusting apparatus A 120 can be performed on the editing side playback image 211. Specifically, in Expressions 1-1 to 1-3, the calculated coefficients CAr, CBr, CAg, CBg, CAb, and CBb may be used and, at the same time, the maximum gradation value of the editing side playback image 211 may be used as Rmax, Gmax, and Bmax. Accordingly, a color adjustment process similar to the color adjustment process performed by the adjusting apparatus A 120 can be performed on the editing side playback image 211.

Taking the R direction as an example, a calculating process of composition characteristics will be schematically described with reference to FIGS. 7A to 7D. Abscissa axes in FIGS. 7A to 7D represent input values shown with identical numerical value ranges and in identical scales.

Figure 7A:
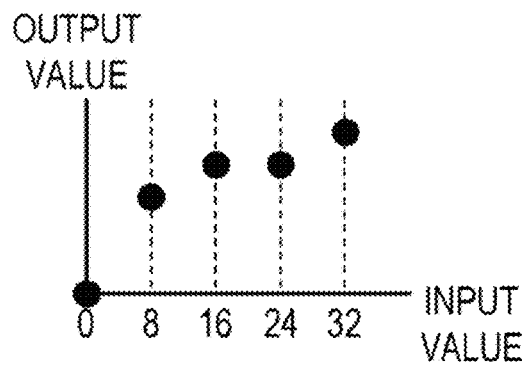
FIGS. 7A to 7D are schematic views showing an example of a calculating process of composition characteristics according to the first embodiment.
Figure 7B:
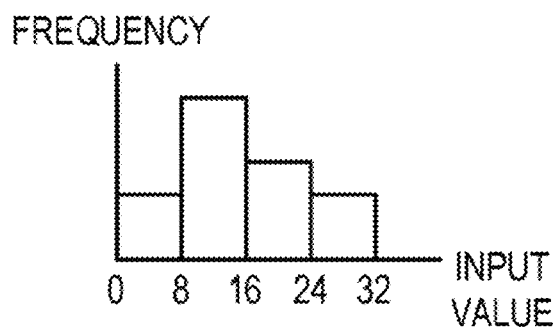

FIG. 7A is a schematic view showing an example of the conversion data 1221. In the drawing, dots represent lattice points. FIG. 7B is a schematic view showing an example of characteristic values (histogram).

Figure 7C:
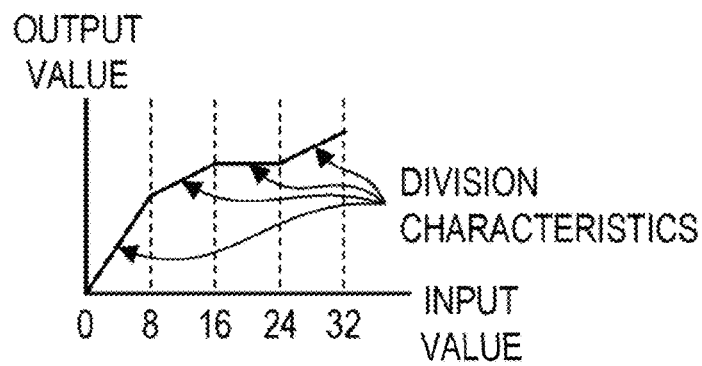

First, the division characteristics 1231 are calculated for each color range between adjacent lattice points (actually, for each unit cube). When the conversion data 1221 is the data shown in FIG. 7A, the four division characteristics shown in FIG. 7C are calculated.

Figure 7D:
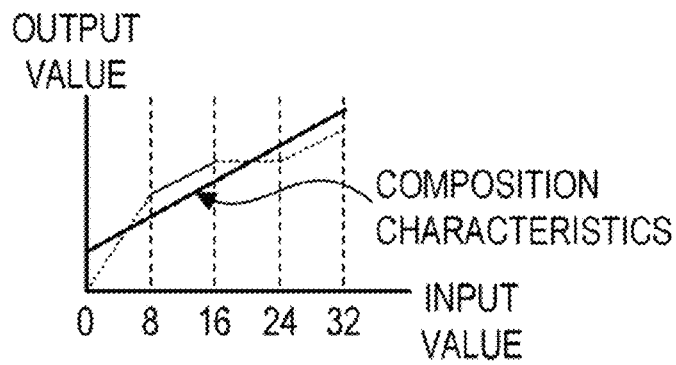

Subsequently, the composition characteristics 1261 is calculated by compositing the division characteristics 1231 of each color range. As described above, a weighted average of the division characteristics 1231 for each color range is calculated as the composition characteristics 1261. When calculating the weighted averages, a frequency of a histogram corresponding to the color ranges is used as a weight. When the division characteristics 1231 of the respective color ranges are the four division characteristics shown in FIG. 7C and the histogram is the histogram shown in FIG. 7B, the composition characteristics 1261 shown in FIG. 7D is calculated. Specifically, since a frequency of the histogram in the second-from-left color range is the highest, characteristics resembling the division characteristics of this color range is obtained as the composition characteristics 1261.

Details of the operation of the script output unit 1270 will now be described.

The adjustment script 122 is text data describing the composition characteristics 1261 and the region information 1241 in XML format. In the present embodiment, the composition characteristics 1261 is described by XML tags "Slope" and "Offset" and the region information 1241 is described by an XML tag "Area".

Specifically, the composition characteristics 1261 are described as follows. The XML tags "Slope" and "Offset" respectively correspond to a "slope" and an "intercept" which are coefficients of an approximate linear expression representing conversion characteristics. For each color of R (red), G (green), and B (blue), by adjusting "Slope", a black level can be fixed and a "slope" of input/output characteristics can be adjusted, and by adjusting "Offset", a "slope" of input/output characteristics can be fixed and brightness can be adjusted (refer to ASC Technology Committee, Digital Intermediate Subcommittee ASC Color Decision List (ASC CDL) Transfer Functions and Interchange Syntax ASC-CDL_Release 1.2 Joshua Pines and David Reisner, 2009-05-04).

<Slope>[CAr] [CAg] [CAb]</Slope>
<Offset>[CBr] [CBg] [CBb]</Offset>

For example, when the composition characteristics 1261 are expressed as $CAr=1.2, CBr=0.3,$ $CAg=1.3, CBg=0,$ and $CAb=1.4, CBb=-0.3,$ the adjustment script 122 may be described as
<Slope>1.2 1.3 1.4</Slope>
<Offset>0.3 0.0-0.3</Offset>.

In addition, assuming that a start point coordinate of an adjustment region is (x1, y1) and an end point coordinate of the adjustment region is (x2, y2), then the region information 1241 may be described as follows.
<Area>[x1] [y1] [x2] [y2]</Area>

For example, when the start point coordinate of an adjustment region is (100, 200) and the endpoint coordinate of the adjustment region is (149, 249), then
<Area>100 200 149 249</Area>.

The script output unit 1270 further adds a supplementary tag and eventually outputs an XML file such as that shown in FIG. 8 as the adjustment script 122.

Figure 12:
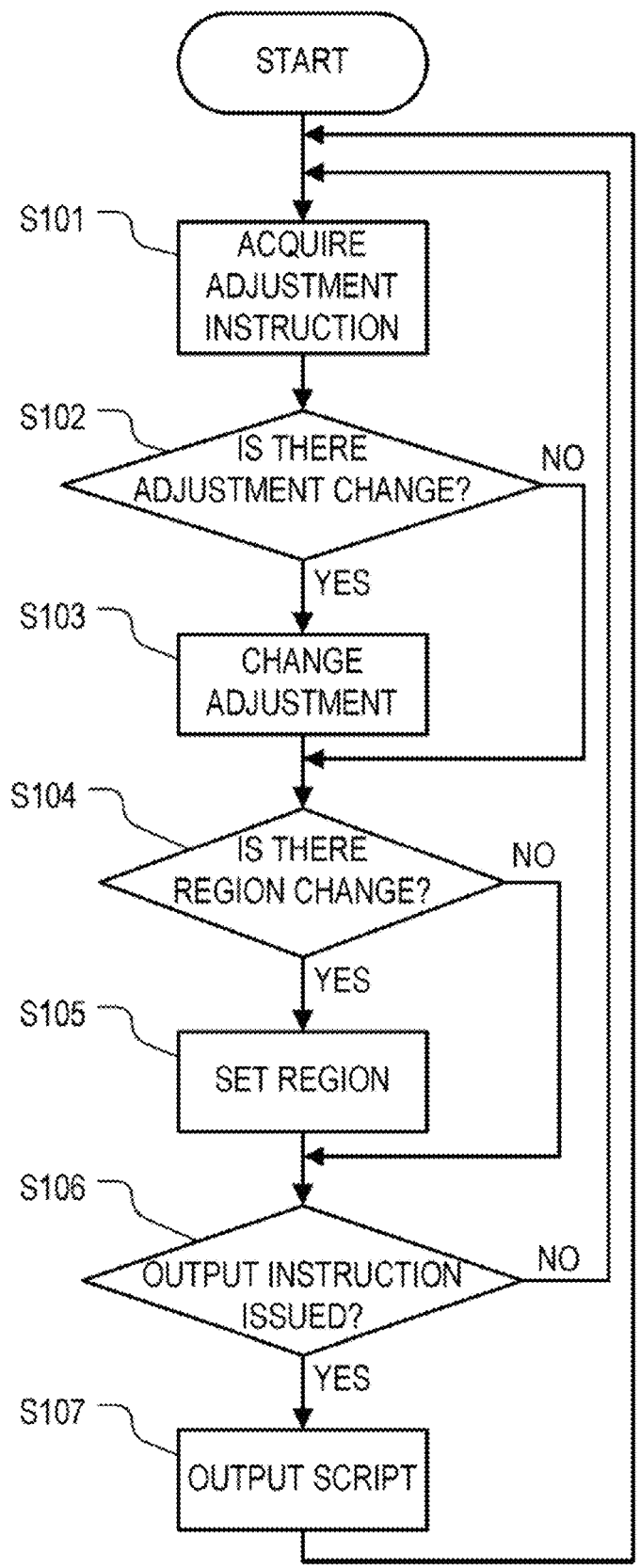
FIG. 12 is a flow chart showing an example of an operation procedure of a control unit according to the first embodiment.

Next, a specific example of a procedure of operations of the control unit 1280 will be described. A flow chart of the operation procedure is shown in FIG. 12.

First, the adjustment instruction 141 is inputted from a user interface (not shown) to the control unit 1280 (S101).

Next, the control unit 1280 determines whether or not a type of color adjustment process (content of color adjustment) has been changed based on the type information included in the adjustment instruction 141 (S102). When the color adjustment process has been changed, processing advances to S103. When the color adjustment process has not been changed, processing advances to S104.

Figure 13:
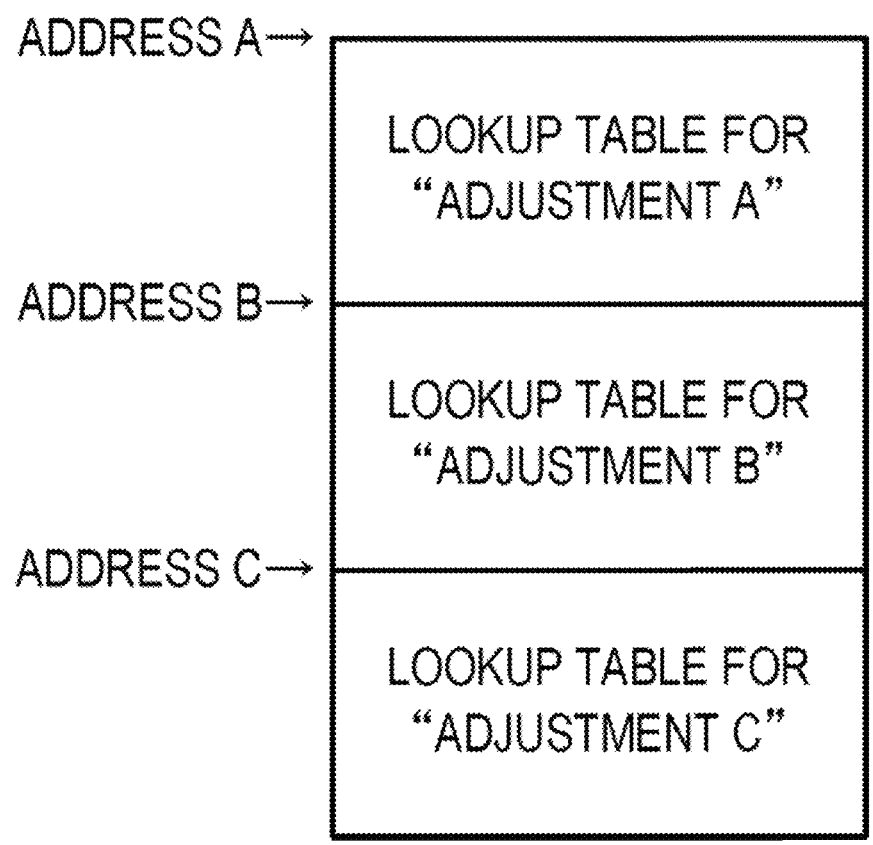
FIG. 13 is a diagram showing an example of a memory map of a memory according to the first embodiment.

In S103, the control unit 1280 changes (updates) image processing executed by the 3D-LUT unit 1210 so that image processing of a type (content) corresponding to the type information included in the adjustment instruction 141 is performed. Specifically, the control unit 1280 changes a lookup table that is read out as the conversion data 1221 from the memory 1220. Subsequently, processing advances to S104. An example of a memory map of the memory 1220 is shown in FIG. 13. The control unit 1280 changes the start address 1281 in accordance with type information. For example, when image processing corresponding to the type information is "adjustment A", an address A is set as the start address 1281. Accordingly, the lookup table that is read out as the conversion data 1221 is changed to the lookup table for "adjustment A". In a similar manner, when image processing corresponding to the type information is "adjustment B", an address B is set as the start address 1281, and when image processing corresponding to the type information is "adjustment C", an address C is set as the start address 1281.

In S104, the control unit 1280 determines whether or not the region information (adjustment region) included in the adjustment instruction 141 has been changed. When the region information has been changed, processing advances to S105. When the region information has not been changed, processing advances to S106.

In S105, the control unit 1280 sets the region information included in the adjustment instruction 141 to the region specifying unit 1240. Accordingly, the region information used by the adjusting apparatus A 120 is updated. Subsequently, processing advances to S106.

In S106, the control unit 1280 determines whether or not an output instruction has been issued or, in other words, whether or not a script output flag is included in the adjustment instruction 141. When a script output flag is included, processing advances to S107. When a script output flag is not included, processing returns to S101.

In S107, the control unit 1280 instructs the script output unit 1270 to output the adjustment script 122. Accordingly, in response to the instruction from the control unit 1280, the script output unit 1270 generates the adjustment script 122 and outputs the adjustment script 122 to the outside. The adjustment script 122 is recorded in the memory card 123.

As described above, according to the present embodiment, information representing an approximate expression that approximates conversion characteristics of a color adjustment process performed in a preceding process (photographing process) is outputted as color adjustment information (a color adjustment script) and handed over to a following process (editing process). Accordingly, an apparatus in the following process can simulate (simply reproduce) color adjustment similar to the color adjustment process performed in the preceding process. In addition, since information representing an approximate expression (for example, a coefficient of an approximate expression) of conversion characteristics is used as color adjustment information instead of using conversion characteristics themselves (for example, a three-dimensional LUT) of color adjustment as color adjustment information, the amount of data can be significantly reduced.

Furthermore, in the present embodiment, final composition characteristics are generated by dividing a color space of an image into a plurality of color spaces, individually obtaining division characteristics representing conversion characteristics of each color range, and compositing the division characteristics based on a characteristic value regarding a color distribution of the input image. Such a generation process enables an accurate characteristic approximate expression to be obtained in a simple manner. For example, when the color adjustment process in the preceding process is performed using a three-dimensional LUT or the like, there is a limit to approximating the conversion characteristics thereof using an approximate expression such as a linear expression. However, by generating an approximate expression in consideration of the color distribution of the input image as in the present embodiment, a relatively adequate approximation can be realized. Moreover, since only a color distribution of a partial region (adjustment region) subjected to a color adjustment process is taken into consideration in the present embodiment, sufficient accuracy can be expected for the purpose of conveying an intention of color adjustment to a following process. In addition, by handing over region information representing an adjustment region together with the composition characteristics to a following process, an intention including what kind of color adjustment is to be performed to which portion of an image can be accurately conveyed and, at the same time, color adjustment based on the composition characteristics can be prevented in advance from being performed on a portion not intended by the photographer.

Furthermore, in the present embodiment, a color histogram is used as a characteristic value regarding a color distribution of the input image. Since a color histogram can be created by simply counting the number of pixels in each color range, there is an advantage that processing load is low. In addition, in the present embodiment, since a category (bin) of the color histogram and a color range that constitutes a calculation unit of division characteristics are set so as to coincide with each other, there is an advantage that a frequency of the color histogram can be directly used to calculate a composite of the division characteristics. Moreover, since composition characteristics are calculated by obtaining a weighted average of division characteristics (values of coefficients) using a weight in accordance with a frequency of the color histogram, a calculation process is significantly simplified.

While composition characteristics are calculated by obtaining a weighted average in the present embodiment, composition methods are not limited thereto. In other words, the composition need only consider a characteristic value regarding the color distribution of the input image. For example, division characteristics corresponding to a color range with a highest frequency of a color histogram may be selected as composition characteristics. Alternatively, the composition characteristics may be an average (either an arithmetic mean or a weighted average may be used) of a predetermined number of division characteristics as counted from the division characteristics with the highest frequency of a color histogram.

Moreover, in the present embodiment, while a color histogram is used as a characteristic value regarding a color distribution of the input image, the characteristic value is not limited thereto. Alternatively, the characteristic value may be a brightness of an image or a representative value (such as a maximum value, a minimum value, a mode, a median, and an average) of pixel values in an adjustment region.

While an example in which the adjusting apparatus A 120 performs image processing using a table has been described in the present embodiment, image processing by the adjusting apparatus A 120 is not limited thereto. For example, the adjusting apparatus A 120 may perform image processing using a plurality of functions (a plurality of functions which correspond to a plurality of ranges of pixel values and which represent correspondence between a pixel value before image processing and a pixel value after image processing of a corresponding range) which are determined in advance.

Moreover, while an example in which division characteristics are calculated for each color range enclosed by eight lattice points adjacent to one another in a table has been described in the present embodiment, a method of determining division characteristics is not limited thereto. For example, division characteristics may be calculated for each range that is wider than a range enclosed by eight lattice points adjacent to one another in a table. Alternatively, division characteristics may be calculated for each range that is narrower than a range enclosed by eight lattice points adjacent to one another in a table. Moreover, division characteristics may be determined without using a table.

While conversion characteristics are approximated by a linear expression in the present embodiment, the order of the approximate expression may be two or more and the approximation may be performed using any kind of expression.

<Second Embodiment>

An image processing apparatus and a control method thereof according to a second embodiment of the present invention will be described. In the first embodiment, an example in which the adjusting apparatus A 120 performs image processing using a table has been described. In the present embodiment, an example in which the adjusting apparatus A 120 performs image processing using an arithmetic expression will be described.

Figure 14:
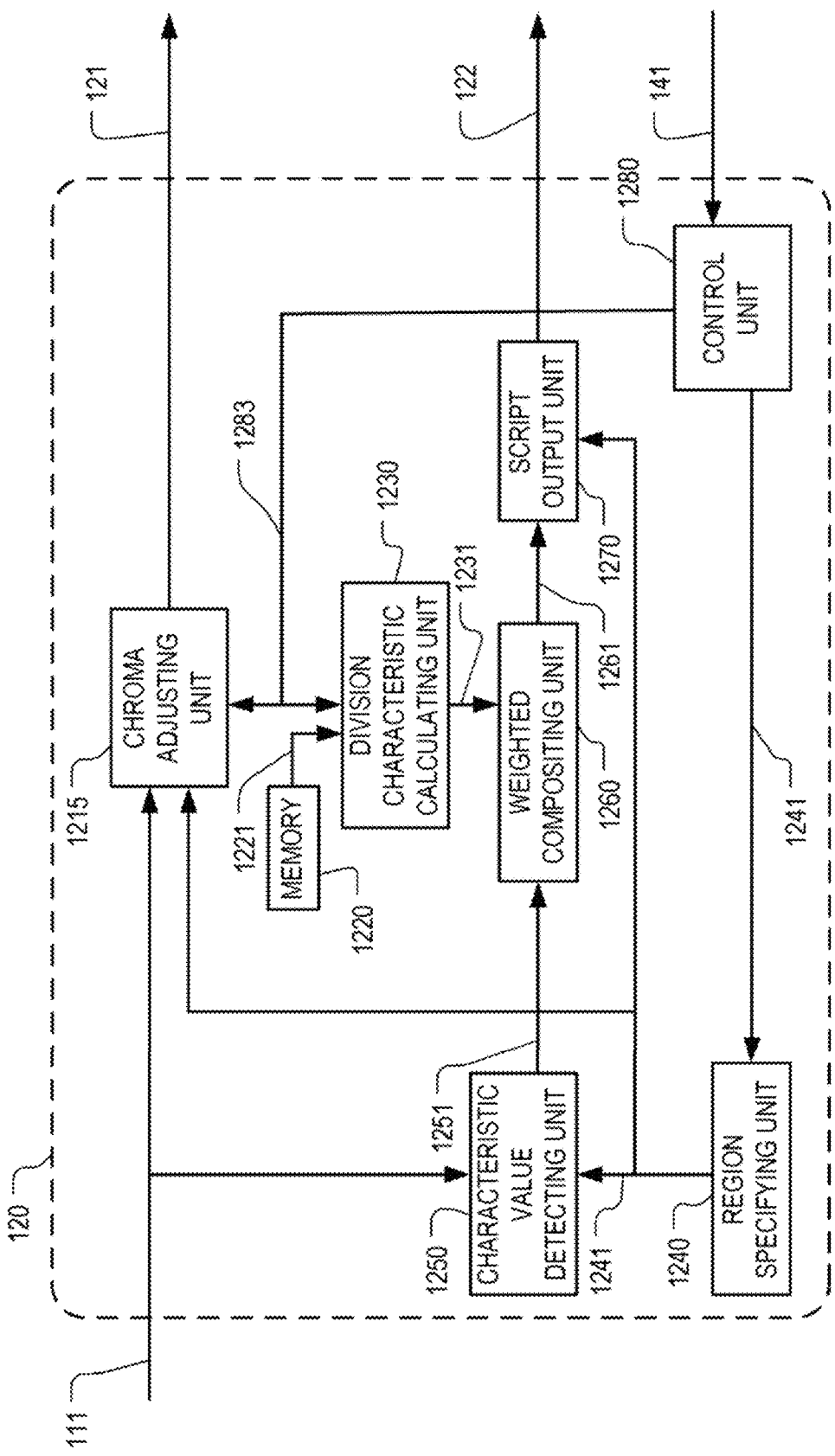
FIG. 14 is a block diagram showing an example of a configuration of an adjusting apparatus A according to a second embodiment.

FIG. 14 is a block diagram showing an example of a configuration of the adjusting apparatus A 120 according to the present embodiment. The adjusting apparatus A 120 according to the present embodiment includes a chroma adjusting unit 1215 in place of the 3D-LUT unit 1210 of the adjusting apparatus A according to the first embodiment. Hereinafter, points that differ from the first embodiment will be described in detail.

The chroma adjusting unit 1215 performs image processing on the input image (the photographing side playback image 111). In the present embodiment, a gain value 1283 representing a degree of image processing is inputted in place of the type information according to the first embodiment. In addition, unlike the 3D-LUT unit 1210, for each pixel of the photographing side playback image 111, the chroma adjusting unit 1215 calculates a pixel value after image processing of the pixel based on the set gain value 1283 and the pixel value of the pixel. Specifically, for each pixel in an adjustment region (a region represented by the region information 1241) of the photographing side playback image 111, based on the set gain value 1283 and an RGB value of the pixel, the chroma adjusting unit 1215 calculates an RGB value after image processing of the pixel. In addition, by converting an RGB value of the input image into the calculated RGB value, the chroma adjusting unit 1215 generates the photographing side adjusted image 121 and outputs the photographing side adjusted image 121 to the confirmation monitor A 130.

In the present embodiment, an RGB value (outR, outG, outB) of the photographing side adjusted image 121 is calculated from an RGB value (inR, inG, inB) of the photographing side playback image 111 using Expressions 16-1 to 16-4 below. In Expressions 16-1 to 16-4, Y denotes a brightness value and gain denotes the inputted (set) gain value 1283.

$Y=0.2126 \times inR + 0.7152 \times inG + 0.0722 \times inB$ (Expression 16-1)

$outR = Y + gain \times (inR - Y)$ (Expression 16-2)

$outG = Y + gain \times (inG - Y)$ (Expression 16-3)

$outB = Y + gain \times (inB - Y)$ (Expression 16-4)

When using Expressions 16-1 to 16-4, chroma is 0 when the gain value 1283 is 0. When the gain value 1283 is 1, the pixel value of the photographing side playback image 111 becomes the pixel value of the photographing side adjusted image 121 without modification. Moreover, pixels that are objects of the conversion described above are limited to the pixels in the adjustment region. Pixels outside of the adjustment region are not subjected to the conversion described above and the RGB value of the photographing side playback image 111 is adopted without modification as the RGB value of the photographing side adjusted image 121.

Moreover, while a case where a gain value is inputted by the user will be described as an example in the present embodiment, a gain value may be automatically determined in accordance with a type of the input image (the editing side playback image 211) or the like.

The memory 1220 stores, in advance, a table representing a pixel value after image processing (a pixel value after image processing when a predetermined gain value is set) for each pixel value before image processing as the conversion data 1221. In the present embodiment, the conversion data 1221 is assumed to be a lookup table representing a correspondence between pixel values of the photographing side playback image 111 and pixel values of the photographing side adjusted image 121 when the gain value 1283 is 2. Details of a method of creating the conversion data 1221 will be described later.

Moreover, the conversion data 1221 prepared in advance is not limited to a table corresponding to gain value 1283=2. For example, the conversion data 1221 may be a table corresponding to the gain value 1283 that is greater than 2.

The division characteristic calculating unit 1230 calculates the division characteristics 1231 for each color range using the gain value 1283 and the table (the conversion data 1221) stored in the memory 1220. In the present embodiment, intervals between lattice points of the table (the conversion data 1221) are set to eight gradations in a similar manner to the first embodiment. In addition, division characteristics of each color range enclosed by eight lattice points adjacent to one another of the table are to be calculated. Details of a calculation method of the division characteristics 1231 will be described later.

The control unit 1280 has similar functions to the control unit according to the first embodiment. However, since type information is not included in the adjustment instruction 141 in the present embodiment, the control unit 1280 does not perform processes (such as setting a start address) using type information. Instead, the control unit 1280 outputs the gain value 1283 included in the adjustment instruction 141 to the chroma adjusting unit 1215 and the division characteristic calculating unit 1230.

A method of creating the table (the conversion data 1221) stored in the memory 1220 will now be described in detail.

The table according to the present embodiment is a 3D-LUT storing a plurality of output RGB values (LUTr [r, g, b], LUTg [r, g, b], LUTb [r, g, b]) corresponding to a plurality of lattice points [r, g, b] specified by a three-dimensional address (r, g, b). r, g, and b respectively correspond to an R value, a G value, and a B value of an input image. LUTr [r, g, b] is an R value obtained by performing image processing on the input value (r, g, b). LUTg [r, g, b] is a G value obtained by performing image processing on the input value (r, g, b). LUTb [r, g, b] is a B value obtained by performing image processing on the input value (r, g, b).

As described earlier, in the present embodiment, intervals of lattice points are eight gradations. In addition, an R value, a G value, and a B value respectively have ranges of 0 to 255. However, in a similar manner to the first embodiment, for purposes of interpolation, a lattice point of r=256, a lattice point of g=256, and a lattice point of b=256 are also prepared as lattice points of the table. r, g, and b of the lattice points in the table respectively take values expressed by Expression 17-1, Expression 17-2, and Expression 17-3. In Expressions 17-1 to 17-3, o, p, and q respectively denote integers equal to and larger than 0 and equal to and smaller than 32.

$$r = 8 \times o \quad \text{(Expression 17-1)}$$

$$g = 8 \times p \quad \text{(Expression 17-2)}$$

$$b = 8 \times q \quad \text{(Expression 17-3)}$$

A similar arithmetic operation to the arithmetic operation by the chroma adjusting unit 1215 is performed for all combinations of r, g, and b expressed by Expression 17-1, Expression 17-2, and Expression 17-3, assuming that the gain value 1283=2. Accordingly, values of LUTr [r, g, b], LUTg [r, g, b], and LUTb [r, g, b] of each lattice point is obtained. In addition, for each combination of r, g, and b, the input value (r, g, b) and the output value (LUTr [r, g, b], LUTg [r, g, b], LUTb [r, g, b]) obtained by the arithmetic operation are associated with each other. Accordingly, the table (the conversion data 1221) stored in the memory 1220 is created.

Details of the calculation method of the division characteristics 1231 used by the division characteristic calculating unit 1230 will now be described.

In the present embodiment, coefficients ar, br, ag, bg, ab, and bb are calculated using a method that differs from the first embodiment to ensure that an accurate lattice point interpolation formula can be obtained regardless of a value of the inputted gain value 1283. Specifically, the coefficients ar, br, ag, bg, ab, and bb are calculated using the inputted gain value 1283 and the output value (LUTr, LUTg, LUTb) when the gain value 1283=2. More specifically, the coefficients ar, br, ag, bg, ab, and bb are calculated using Expressions 18-1 to 18-6 below.

$$ar[r, g, b] = ((\text{gain}-1) \times (LUTr[r+8, g, b] - LUTr[r, g, b] - 8) + 8)/8 \quad \text{(Expression 18-1)}$$

$$br[r, g, b] = (\text{gain}-1) \times (LUTr[r, g, b] - r) + r - ar[r, g, b] \times r \quad \text{(Expression 18-2)}$$

$$ag[r, g, b] = ((\text{gain}-1) \times (LUTg[r, g+8, b] - LUTg[r, g, b] - 8) + 8)/8 \quad \text{(Expression 18-3)}$$

$$bg[r, g, b] = (\text{gain}-1) \times (LUTg[r, g, b] - g) + g - ag[r, g, b] \times g \quad \text{(Expression 18-4)}$$

$$ab[r, g, b] = ((\text{gain}-1) \times (LUTb[r, g, b+8] - LUTb[r, g, b] - 8) + 8)/8 \quad \text{(Expression 18-5)}$$

$$bb[r, g, b] = (\text{gain}-1) \times (LUTb[r, g, b] - b) + b - ab[r, g, b] \times b \quad \text{(Expression 18-6)}$$

Since other arithmetic operations are similar to those of the first embodiment, a description thereof will be omitted.

According to the configuration described above, even if the adjusting apparatus A 120 is configured so that a pixel value after image processing is determined by an arithmetic operation using a set gain value, a similar operational effect to the first embodiment can be produced.

Moreover, while an example of a case where the image processing to be performed by the adjusting apparatus A 120 is a process for adjusting chroma has been described in the present embodiment, image processing is not limited thereto. Regardless of the type of process performed including a nonlinear process, processing similar to that described earlier can be performed as long as the image processing enables approximated characteristics to be expressed by a table.

<Third Embodiment>

Hereinafter, an image processing apparatus and a control method thereof according to a third embodiment of the present invention will be described.

In the present embodiment, an example in which a display apparatus is used in place of the adjusting apparatus A and the confirmation monitor A according to the first and second embodiments will be described. In other words, in the present embodiment, an example will be described in which the confirmation monitor A constitutes a part of the adjusting apparatus A.

In addition, the display apparatus according to the present embodiment includes a marker displaying function for displaying a marker that enables a user to determine a region of interest using an UI function built into the display apparatus when the user performs image quality adjustment while focusing on a partial region (a region of interest) of a displayed image. Furthermore, the display apparatus according to the present embodiment has a function of writing region information of a region of interest together with an image quality adjustment parameter (composition characteristics) corresponding to an image quality adjustment result into a file and recording the file (an adjustment script)

into which region information and composition characteristics have been written in an externally connected storage medium (such as a semiconductor memory, a magnetic disk, or an optical disk).

Figure 15:
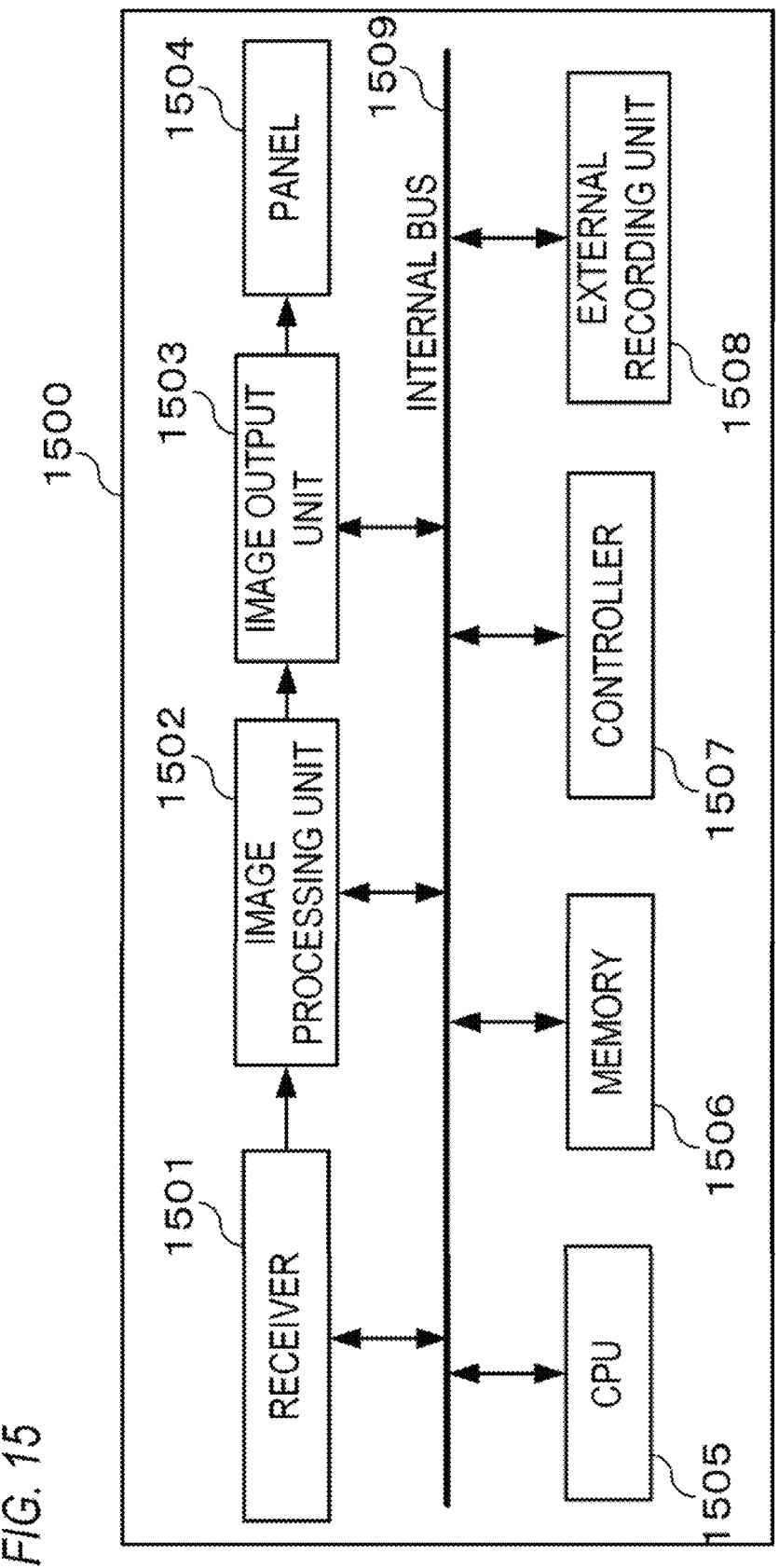
FIG. 15 is a block diagram showing a configuration of a display apparatus according to a third embodiment.

FIG. 15 is a hardware block diagram showing a configuration of a display apparatus 1500 according to the present embodiment.

A receiver 1501 receives an image signal inputted from the outside. The image signal is inputted to an image input terminal such as a DisplayPort (hereinafter, DP).

An image processing unit 1502 performs various image quality adjustment processes on the image signal outputted from the receiver 1501. Examples of image quality adjustment include a brightness adjustment process and a color temperature adjustment process. In addition, when a region of interest is specified, an image quality adjustment process is only performed on the region of interest. The image processing unit 1502 outputs the image signal subjected to the image quality adjustment process to an image output unit 1503.

The image output unit 1503 performs a super position process in which a graphic image representing region of interest candidates is superimposed on an image signal (the image signal outputted from the image processing unit 1502 or an image signal subjected to a format conversion process to be described later). In addition, the image output unit 1503 performs a format conversion process for converting a format of an image signal (the image signal outputted from the image processing unit 1502 or an image signal subjected to the super position process) into a format displayable on a panel 1504. The image output unit 1503 outputs an image signal subjected to the superposition process and the format conversion process to the panel 1504.

The panel 1504 displays the image signal outputted from the image output unit 1503 on a screen. The panel 1504 is, for example, a liquid crystal display panel, an organic EL display panel, or a plasma display panel. In the case of a liquid crystal display panel, an image is displayed on a screen by irradiating light onto a rear surface of a liquid crystal panel and adjusting transmittance of each liquid crystal element in the liquid crystal panel.

A CPU 1505 is a central processing unit (CPU) that controls the respective functional units of the display apparatus 1500. Processes such as generation of a graphic representing region of interest candidates and recording of image quality adjustment parameters are performed by the CPU 1505.

A memory 1506 stores the generated graphic that represents region of interest candidates, image quality adjustment parameters, and the like.

A controller 1507 accepts input operations performed by the user and transmits operation information representing a user operation to the CPU 1505.

An external recording unit 1508 records a file into which an image quality adjustment parameter and region of interest information have been written to an external storage apparatus. The external storage apparatus is, for example, a USB memory.

The respective functional units (hardware blocks) are connected to one another using an internal bus 1509. Data is transmitted and received among the functional units via the internal bus 1509.

Figure 16:
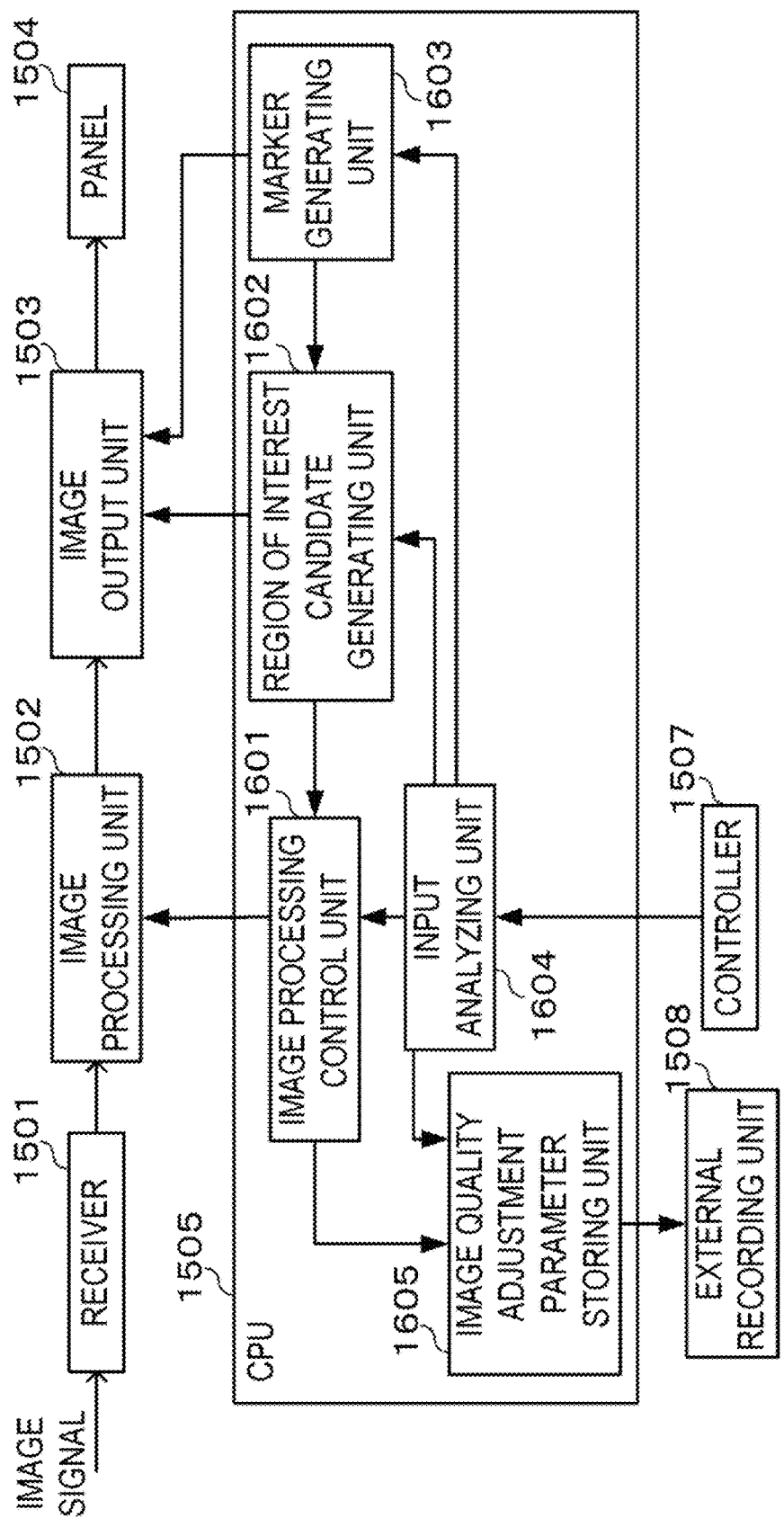
FIG. 16 is a block diagram showing a configuration of a CPU according to the third embodiment.

FIG. 16 is a functional block diagram showing a configuration of the CPU 1505.

An image processing control unit 1601 calculates an image quality adjustment parameter according to image quality adjustment operation information inputted from an input analyzing unit 1604 and outputs the image quality adjustment parameter to the image processing unit 1502. In addition, the image processing control unit 1601 outputs region of interest information inputted from a region of interest candidate generating unit 1602 to the image processing unit 1502. Furthermore, the image processing control unit 1601 outputs the image quality adjustment parameter and the region of interest information to an image quality adjustment parameter storing unit 1605.

The region of interest candidate generating unit 1602 generates a graphic representing a region of interest candidate when instruction information representing an instruction for displaying a region of interest candidate is inputted from the input analyzing unit 1604. A region of interest candidate is generated based on display settings of a safety zone marker and a grid marker acquired from a marker generating unit 1603. Specifically, a cell obtained by dividing, using a grid marker, a rectangular region enclosed by a safety zone marker is used as a region of interest candidate. In this case, a safety zone marker refers to a rectangular line that encloses an image region, and a grid marker refers to a mesh-like line that divides the image region. In addition, when instruction information representing a selection instruction of a region of interest is inputted from the input analyzing unit 1604, the region of interest candidate generating unit 1602 sets a region selected from region of interest candidates as the region of interest. Furthermore, when instruction information representing an ending instruction is inputted from the input analyzing unit 1604, the region of interest candidate generating unit 1602 outputs information representing a position of the region set as the region of interest as region of interest information to the image processing control unit 1601.

When instruction information representing an instruction for changing marker display settings is inputted from the input analyzing unit 1604, the marker generating unit 1603 changes display settings of a safety zone marker and a grid marker according to the instruction information. In addition, when instruction information representing a display instruction of a marker is inputted from the input analyzing unit 1604, the marker generating unit 1603 generates a marker line and outputs the marker line to the image output unit 1503.

The input analyzing unit 1604 accepts operation information from the controller 1507. When an image quality adjustment operation is performed, the input analyzing unit 1604 outputs image quality adjustment operation information representing contents of the image quality adjustment operation to the image processing control unit 1601. When a display instruction of a region of interest candidate, an ending instruction, or a moving/selection instruction of a region of interest is issued by the user, the input analyzing unit 1604 outputs instruction information representing the instruction issued by the user to the region of interest candidate generating unit 1602. When an image quality adjustment parameter storing instruction is issued, the input analyzing unit 1604 outputs instruction information representing the image quality adjustment parameter storing instruction to the image quality adjustment parameter storing unit 1605. In addition, when a display setting changing instruction of a marker or a display instruction of a marker is issued, the input analyzing unit 1604 outputs instruction information representing the instruction issued by the user to the marker generating unit 1603.

When an image quality adjustment parameter storing instruction is issued, the image quality adjustment parameter storing unit 1605 writes the image quality adjustment parameter and the region of interest information outputted from the image processing control unit 1601 and outputs the file to the external recording unit 1508.

Figure 17:
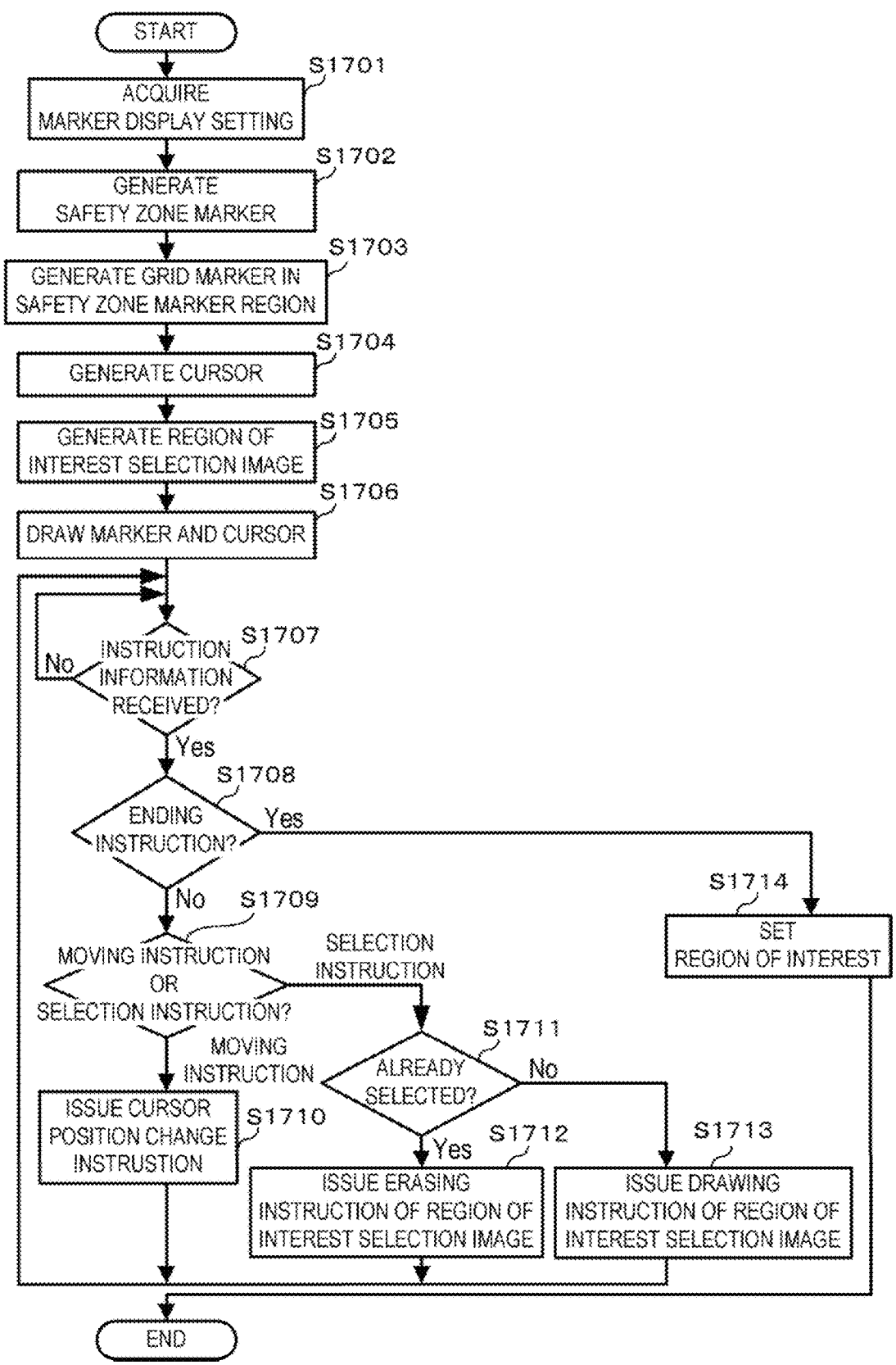
FIG. 17 is a flow chart showing an operation of a region of interest candidate generating unit according to the third embodiment.

FIG. 17 is a flow chart showing a flow of processing performed by the region of interest candidate generating unit 1602.

When instruction information representing a display instruction of a region of interest candidate is received from the input analyzing unit 1604, the region of interest candidate generating unit 1602 acquires display settings of a safety zone marker and a grid marker from the marker generating unit 1603 (S1701).

Subsequently, the region of interest candidate generating unit 1602 generates a safety zone marker according to the safety zone marker display setting (S1702).

In addition, the region of interest candidate generating unit 1602 generates a grid marker in a region enclosed by the safety zone marker according to the grid marker display setting (S1703).

Next, the region of interest candidate generating unit 1602 generates a cursor for selecting a region (cell) obtained by dividing, using the grid marker, the region enclosed by the safety zone marker (S1704).

In addition, the region of interest candidate generating unit 1602 generates a region of interest selection image that indicates a cell selected as a region of interest (S1705).

Next, the region of interest candidate generating unit 1602 outputs the generated safety zone marker, grid marker, and cursor to the image output unit 1503, and also outputs a drawing instruction that causes the image output unit 1503 to draw the safety zone marker, the grid marker, and the cursor to the image output unit 1503 (S1706).

In addition, when instruction information is received from the input analyzing unit 1604 (YES in S1707), the region of interest candidate generating unit 1602 determines whether or not the received instruction information is information representing an ending instruction (S1708). When the instruction information is not information representing an ending instruction, processing advances to S1709, and when the instruction information is information representing an ending instruction, processing advances to S1714.

In S1709, the region of interest candidate generating unit 1602 determines whether the instruction information is information representing a moving instruction of the region of interest or information representing a selection instruction of the region of interest. When the instruction information is information representing a moving instruction of the region of interest, processing advances to S1710, and when the instruction information is information representing a selection instruction of the region of interest, processing advances to S1711.

In S1710, the region of interest candidate generating unit 1602 outputs a changing instruction (a drawing instruction) for changing a drawing position of the cursor to a position of a cell in accordance with the instruction information to the image output unit 1503. Subsequently, processing returns to S1707.

In S1711, the region of interest candidate generating unit 1602 determines whether or not the cell selected due to the selection instruction (the cell indicated by the cursor) has already been selected. When the cell indicated by the cursor has already been selected, processing advances to S1712, and when the cell indicated by the cursor has not already been selected, processing advances to S1713.

In S1712, the region of interest candidate generating unit 1602 outputs an erasing instruction for erasing a region of interest selection image drawn in the cell indicated by the cursor to the image output unit 1503. Subsequently, processing returns to S1707.

In S1713, the region of interest candidate generating unit 1602 outputs a drawing instruction for drawing a region of interest selection image in the cell indicated by the cursor to the image output unit 1503. Subsequently, processing returns to S1707.

In S1714, the region of interest candidate generating unit 1602 sets the cell in which the region of interest selection image is drawn as the region of interest. Subsequently, the present flow is terminated.

Figure 18:
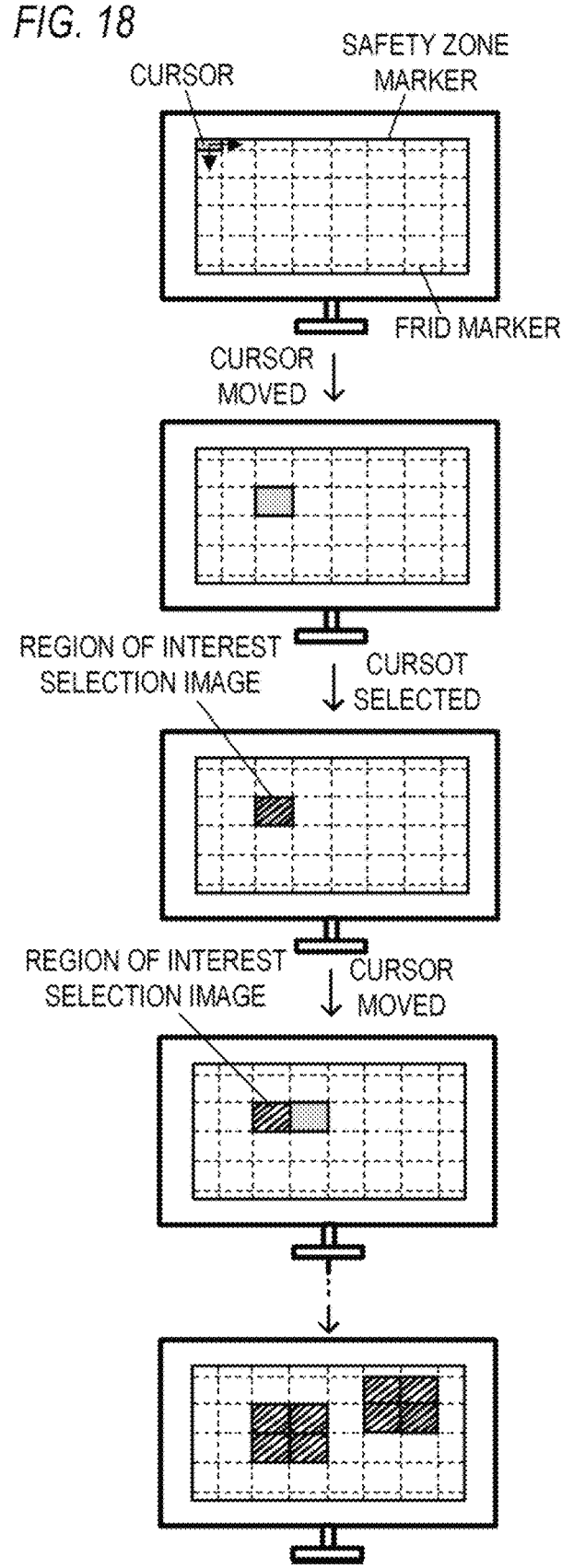
FIG. 18 is a diagram showing an operation of the region of interest candidate generating unit according to the third embodiment.

FIG. 18 is a diagram showing operations of the region of interest candidate generating unit 1602.

In FIG. 18, rectangular solid lines shown within screen regions are safety zone markers and mesh-like dashed lines are grid markers. Grid markers are only displayed in regions enclosed by a safety zone marker. Initially, a cursor for selecting a cell obtained by dividing a region enclosed by a safety zone marker by grid markers is displayed in addition to the safety zone marker and the grid markers. The cursor moves over a plurality of cells in accordance with a user operation, and when a cell indicated by the cursor is selected, a region of interest selection image is drawn in the cell. When a selection operation (selection instruction) is performed on a cell in which a region of interest selection image is already drawn, the region of interest selection image is erased. When the user performs an ending operation (ending instruction), the cell in which a region of interest selection image is drawn is set as a region of interest.

While an example of a method of realizing a marker displaying function for specifying a region of interest has been described above, the present invention is not limited thereto. For example, a region of interest may be specified by first generating a rectangular line of an arbitrary size and subsequently having the user input numerical values representing a start point coordinate (a coordinate of a top left corner), a vertical width, a horizontal width, and the like of the rectangle.

FIG. 19 shows a specific example of a file in which are recorded an image quality adjustment parameter and region of interest information and which is recorded by the image quality adjustment parameter storing unit 1605.

In FIG. 19, an image quality adjustment parameter and region of interest information are recorded for each region of interest in an expanded meta-information region of a CDL file. In addition, as region of interest information, a coordinate of a top left corner (a start point coordinate) of the region of interest, a vertical width of the region of interest, and a horizontal width of the region of interest are recorded.

As described above, according to the present embodiment, by displaying region of interest candidates, the user can readily specify a region of interest. In addition, according to the present embodiment, since an image quality adjustment parameter and region of interest information are recorded in a file, which region had been the focus of image quality adjustment can be readily determined when having another apparatus load the file and reproduce a previous adjustment condition.

<Fourth Embodiment>

Hereinafter, an image processing apparatus and a control method thereof according to a fourth embodiment of the present invention will be described.

In the third example, an example in which a region of interest candidate is displayed using a safety zone marker and a grid marker has been described. In the present embodiment, an example in which a region of interest candidate is displayed using a safety zone marker, a grid marker, and a trimming region will be described.

Note that only points that differ from the third embodiment will be described below. Since a hardware configuration of a display apparatus according to the present embodiment is the same as that of the third embodiment, a description thereof will be omitted.

Figure 20:
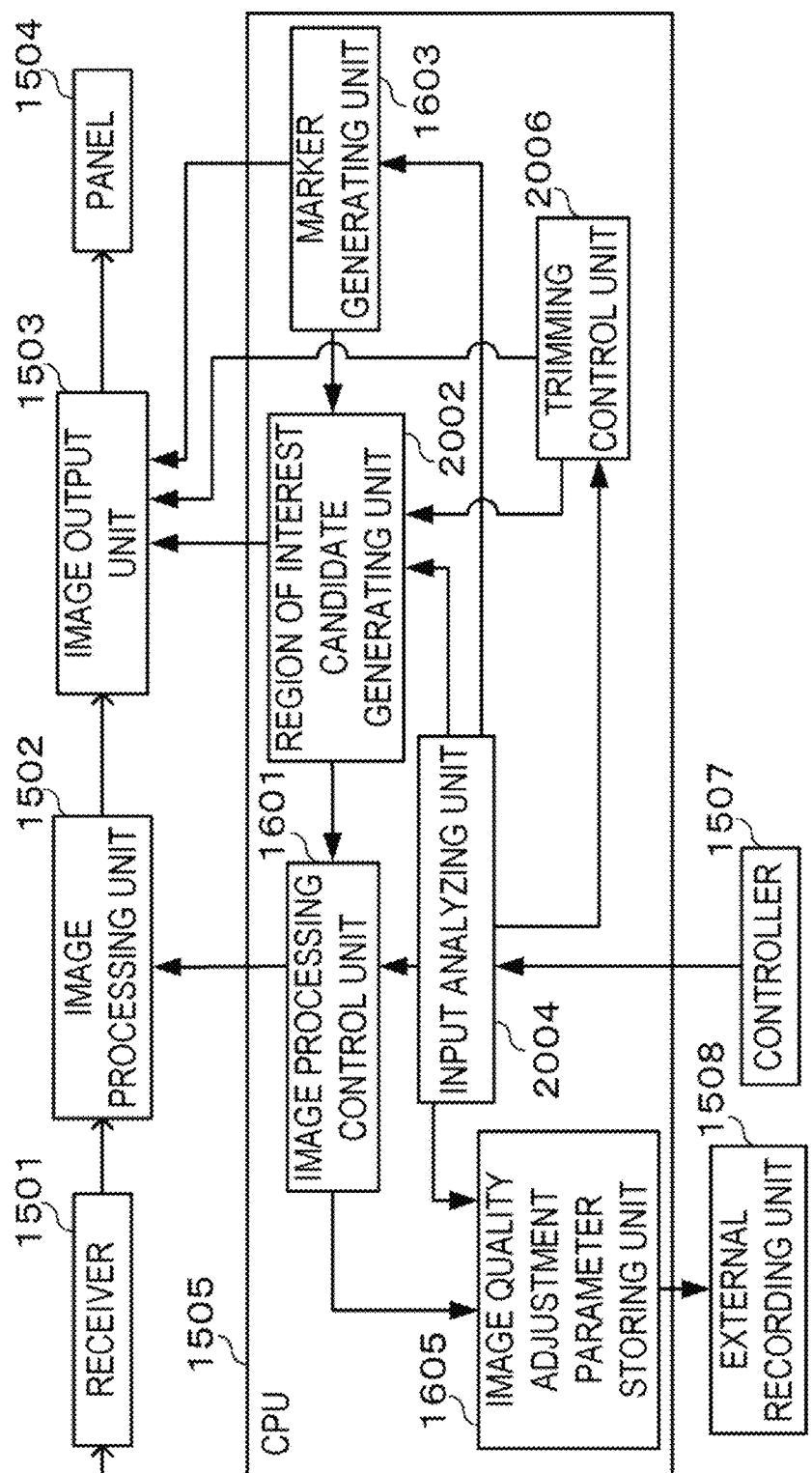
FIG. 20 is a block diagram showing a configuration of a CPU according to a fourth embodiment.

FIG. 20 illustrates function blocks of the CPU 1505 according to the present embodiment.

A region of interest candidate generating unit 2002 generates a graphic representing a region of interest candidate when instruction information representing an instruction for displaying a region of interest candidate is inputted from an input analyzing unit 2004. A region of interest candidate is generated based on region information of a trimming region acquired from a trimming control unit 2006 and display settings of a safety zone marker and a grid marker acquired from the marker generating unit 1603. Specifically, a region (cell) obtained by dividing, using a grid marker, a region in which a region enclosed by a safety zone marker and a trimming region overlap one another is used as a region of interest candidate.

The input analyzing unit 2004 receives operation information of the user from the controller 1507, and when a specification instruction of a trimming region has been issued, the input analyzing unit 2004 outputs trimming region information (a position and a size of a trimming region) representing a trimming region inputted by the user to the trimming control unit 2006.

The trimming control unit 2006 instructs a region in which an image is to be displayed to the image output unit 1503 according to the trimming region information inputted from the input analyzing unit 2004. Accordingly, among image signals received by the receiver 1501, only an image signal in the trimming region is to be displayed. In addition, the trimming control unit 2006 outputs the trimming region information to the region of interest candidate generating unit 2002 in response to a request from the region of interest candidate generating unit 2002.

Figure 21:
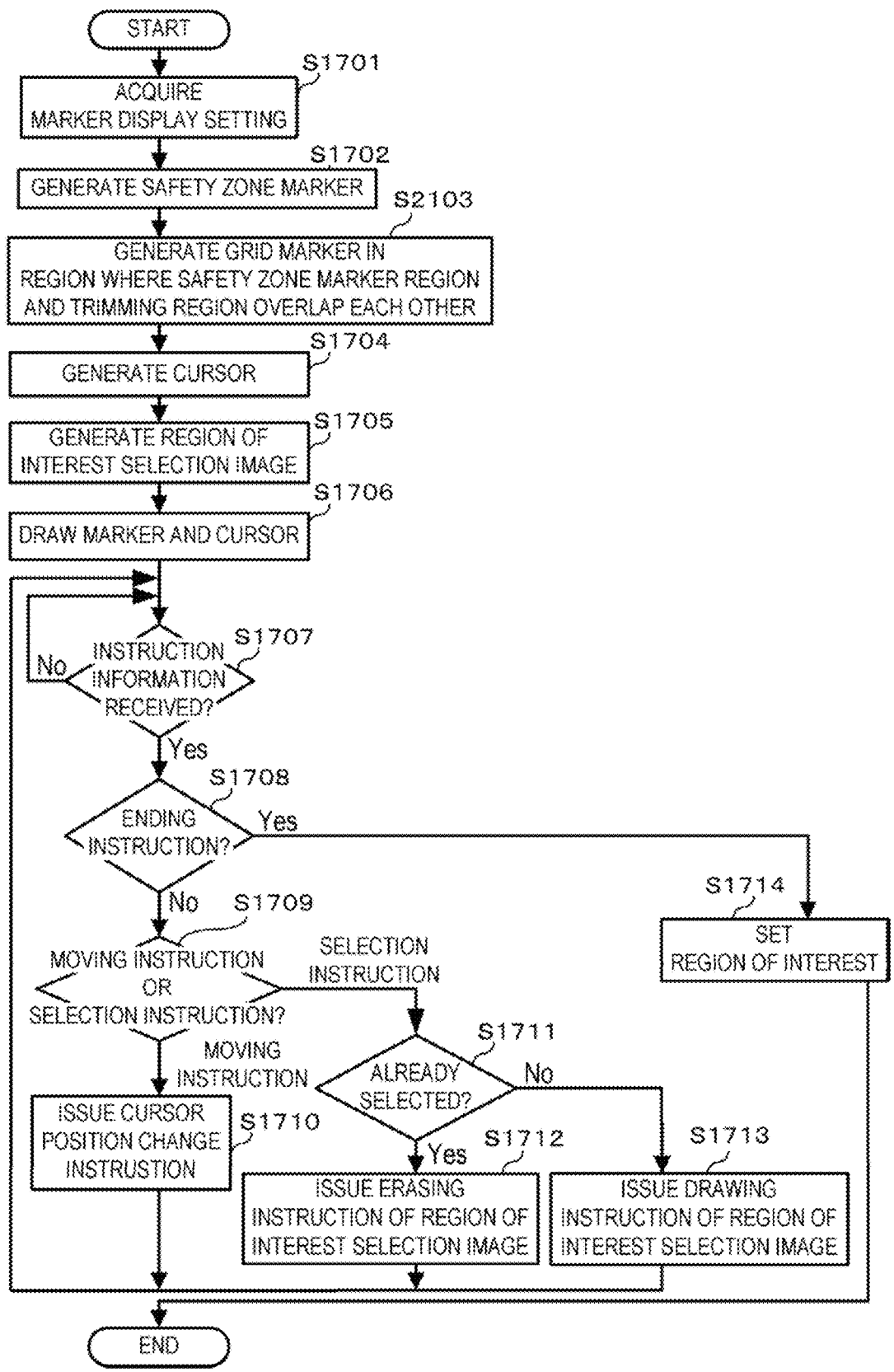
FIG. 21 is a flow chart showing an operation of a region of interest candidate generating unit according to the fourth embodiment.

FIG. 21 is a flow chart showing a flow of processing performed by the region of interest candidate generating unit 2002. As shown in FIG. 21, in the present embodiment, a process of S2103 is performed in place of the process of S1703 in the third embodiment (FIG. 17).

In S2103, the region of interest candidate generating unit 2002 acquires trimming region information from the trimming control unit 2006 and generates a grid marker only in a region in which a region enclosed by a safety zone marker and a trimming region overlap one another.

Figure 22:
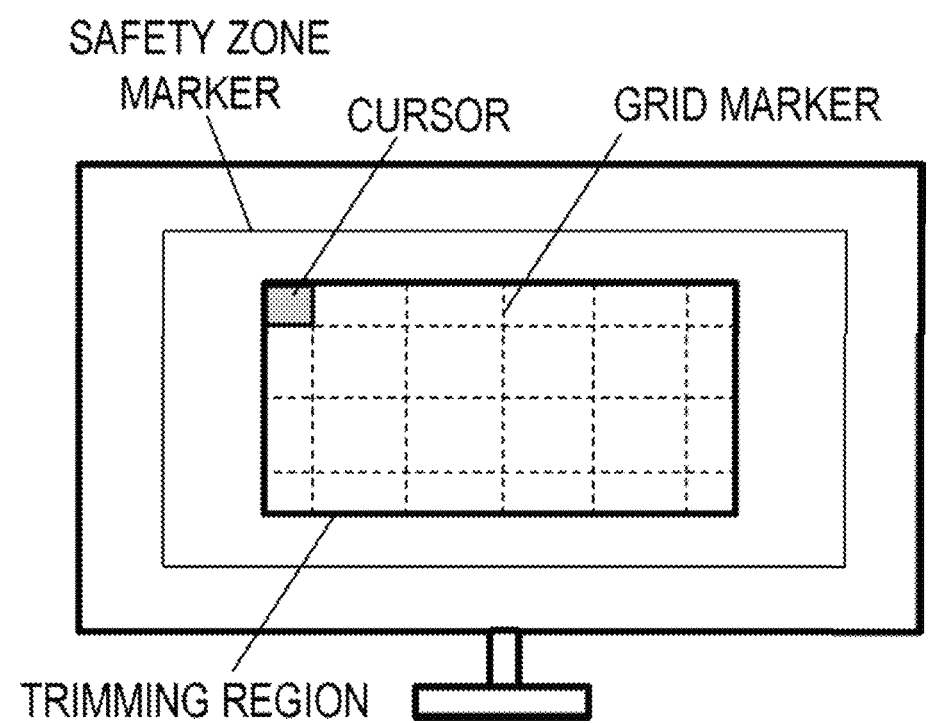
FIG. 22 is a diagram showing an operation of the region of interest candidate generating unit according to the fourth embodiment.

FIG. 22 is a diagram showing operations of the region of interest candidate generating unit 2002.

In FIG. 22, a thin rectangular solid line shown within a screen region is a safety zone marker and a bold solid line is a trimming region (an outline thereof). In addition, mesh-like dashed lines are grid markers. In the present embodiment, a region (cell) obtained by dividing, using the grid marker, a region in which a region enclosed by the safety zone marker and the trimming region overlap one another is used as a region of interest candidate. In a similar manner to the third embodiment, as the cursor moves over a plurality of cells in accordance with a user operation and a cell indicated by the cursor is selected, a region of interest selection image is drawn or erased. In addition, in accordance with an ending instruction, the cell in which the region of interest selection image is drawn is set as a region of interest.

As described above, according to the present embodiment, a region of interest candidate is displayed while also taking a trimming region into consideration. Therefore, for example, even when photography is performed using a camera with high resolution such as 8K4K, trimming is performed to a 4K2K or FHD size, and an image quality adjustment process is performed on a region of interest in the trimming region, the user can readily specify a region of interest. In addition, according to the present embodiment, since an image quality adjustment parameter and region of interest information are recorded in a file, which region had been the focus of image quality adjustment can be readily determined when having another apparatus load the file and reproduce a previous adjustment condition.

<Fifth Embodiment>

Hereinafter, an image processing apparatus and a control method thereof according to a fifth embodiment of the present invention will be described.

In the present embodiment, similarly, an example in which a display apparatus is used in place of the adjusting apparatus A and the confirmation monitor A according to the first and second embodiments will be described.

Figure 27:
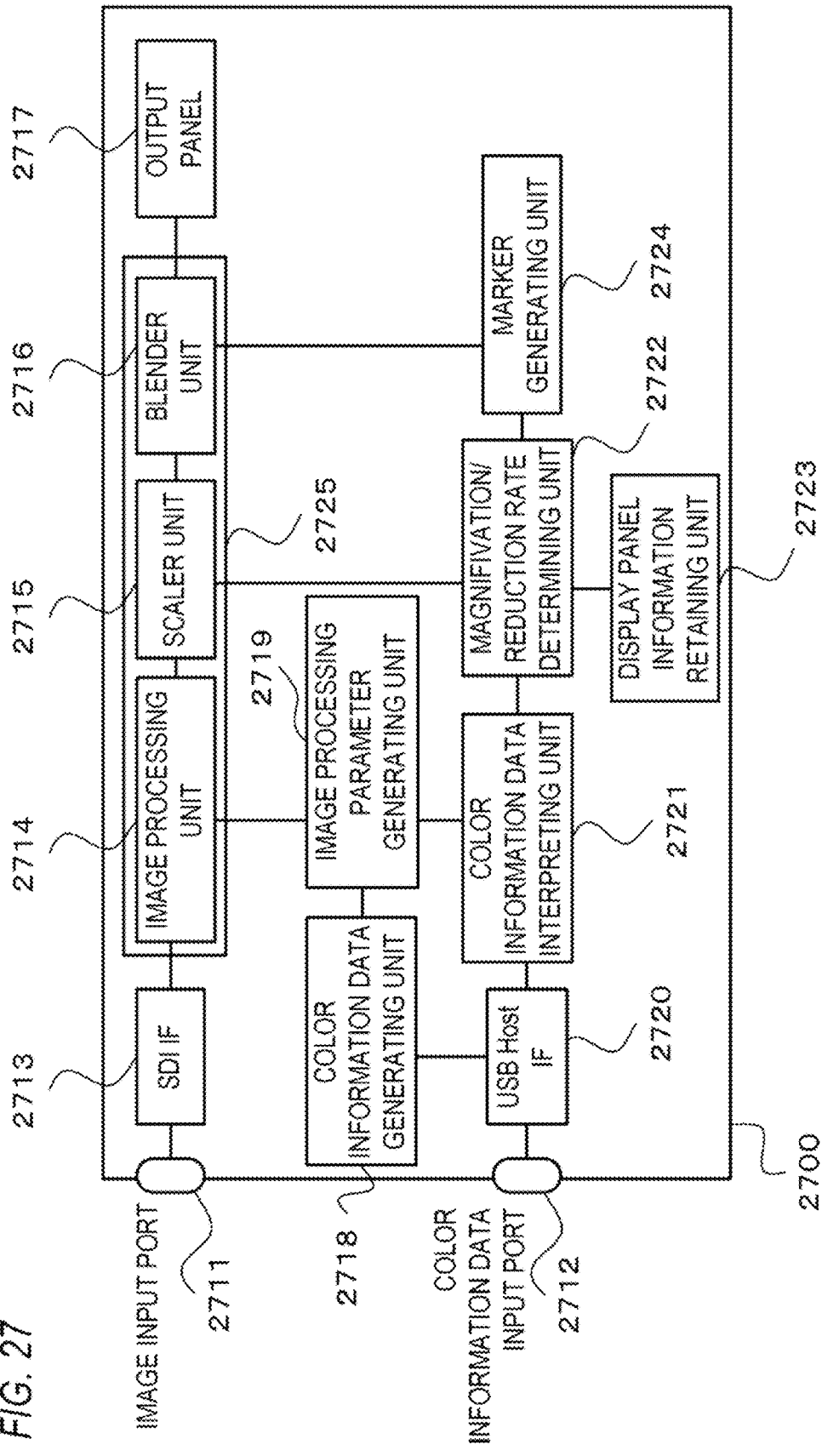
FIG. 27 is a block diagram showing a configuration of the display apparatus according to the fifth embodiment.

FIG. 27 is a block diagram showing a schematic configuration of a display apparatus 2700 according to the present embodiment. The display apparatus 2700 includes an image input port 2711, a color information data input port 2712, an SDI IF 2713, a processing unit 2725, an output panel 2717, a color information data generating unit 2718, an image processing parameter generating unit 2719, a USB Host IF 2720, a color information data interpreting unit 2721, a magnification/reduction rate determining unit 2722, a display panel information retaining unit 2723, a marker generating unit 2724, and the like. The processing unit 2725 includes an image processing unit 2714, a scaler unit 2715, a blender unit 2716, and the like.

The image input port 2711 is an image transmission port such as SDI or HDMI. In the present embodiment, SDI is used.

The color information data input port 2712 is an input/output port such as a USB. In the present embodiment, a USB is used. The color information data input port 2712 acquires, for example, information such as a CDL file (information acquisition).

The SDI IF 2713 accepts input of image data (an image signal) to the image input port 2711 and transmits the input image data to the image processing unit 2714.

The image processing unit 2714 performs image processing on the image data received from the SDI IF 2713 using an image processing parameter received from the image processing parameter generating unit 2719. In addition, the image processing unit 2714 transmits the image data subjected to image processing to the scaler unit 2715.

The scaler unit 2715 magnifies or reduces the image data received from the image processing unit 2714 using a magnification rate or a reduction rate received from the magnification/reduction rate determining unit 2722. In addition, the scaler unit 2715 transmits the enlarged or reduced image data to the blender unit 2716.

The blender unit 2716 generates composite image data by compositing the marker image data received from the marker generating unit 2724 and the image data received from the scaler unit 2715. In addition, the blender unit 2716 transmits the composite image data to the output panel 2717. The composite image data is an image obtained by superimposing a marker represented by marker image data on an image represented by image data received from the scaler unit 2715.

The output panel 2717 is a display panel that displays image data (composite image data) received from the blender unit 2716.

The color information data generating unit 2718 converts the parameter received from the image processing parameter generating unit 2719 into a CDL file. In addition, the color information data generating unit 2718 transmits the CDL file to the USB Host IF 2720.

The image processing parameter generating unit 2719 converts the color information data received from the color information data interpreting unit 2721 into a parameter that can be used by the image processing unit 2714. In addition, the image processing parameter generating unit 2719 transmits the parameter to the image processing unit 2714 and the color information data generating unit 2718. When a user operation for changing the color information data has been performed, a changing instruction for changing the color information data is transmitted to the image processing parameter generating unit 2719. Furthermore, the image processing parameter generating unit 2719 once again performs a process of generating a parameter and transmitting the parameter to the image processing unit 2714 and the color information data generating unit 2718.

The USB Host IF 2720 accepts input of a CDL file to the color information data input port 2712 and transmits the inputted CDL file to the color information data interpreting unit 2721. In addition, the USB Host IF 2720 stores the CDL file received from the color information data generating unit 2718 in an external storage medium or the like via the color information data input port 2712.

The color information data interpreting unit 2721 interprets the CDL file received from the USB Host IF 2720 and converts the CDL file into color information data such as SLOPE and OFFSET. Furthermore, the color information data interpreting unit 2721 transmits the color information data to the image processing parameter generating unit 2719. In addition when position information is included in the CDL file, the color information data interpreting unit 2721 transmits the position information to the magnification/reduction rate determining unit 2722. Position information is information representing a position of an object of interest.

The magnification/reduction rate determining unit 2722 determines a magnification rate or a reduction rate of an image based on resolution information of a display panel acquired from the display panel information retaining unit 2723. In addition, the magnification/reduction rate determining unit 2722 transmits the determined magnification rate or reduction rate to the scaler unit 2715 and transmits the position information received from the color information data interpreting unit 2721 as marker position information representing a display position of a marker to the marker generating unit 2724.

The display panel information retaining unit 2723 retains resolution information, frame rate information, and the like of the output panel 2717 and transmits information in response to a request from the magnification/reduction rate determining unit 2722.

The marker generating unit 2724 generates a marker using marker position information received from the magnification/reduction rate determining unit 2722. In addition, the marker generating unit 2724 transmits the generated marker to the blender unit 2716.

Operations of the display apparatus according to the present embodiment will be described with reference to the time chart shown in FIG. 28.

First, an operation of generating marker image data from a CDL file and generating composite image data will be described.

At time T11, the color information data interpreting unit 2721 executes interpretation of the CDL file received from the USB Host IF 2720. In addition, the color information data interpreting unit 2721 acquires color information described in the CDL file and transmits the color information to the image processing parameter generating unit 2719.

At time T12, the image processing parameter generating unit 2719 converts the acquired color information into a parameter that can be used by the image processing unit 2714. In addition, the image processing parameter generating unit 2719 transmits the parameter to the image processing unit 2714 and the color information data generating unit 2718.

At time T13, the color information data generating unit 2718 compares the received parameter with a currently retained parameter, and when the two parameters are not consistent with each other, the color information data generating unit 2718 updates the retained parameter to the received parameter.

At time T14, the image processing unit 2714 performs image processing on the image received from the SDI IF 2713 using the acquired parameter.

At time T15, the color information data interpreting unit 2721 determines whether or not position information is included in the CDL file received from the USB Host IF 2720. When position information is included, the color information data interpreting unit 2721 transmits the position information to the scaler unit 2715 via the magnification/reduction rate determining unit 2722. In addition, the color information data interpreting unit 2721 also transmits the position information to the marker generating unit 2724.

The operations at time T13, time T14, and T15 may be performed out of sequence.

Next, at time T17, the scaler unit 2715 executes magnification or reduction of the image received from the image processing unit 2714 using the magnification rate or the reduction rate acquired from the magnification/reduction rate determining unit 2722.

At time T18, the marker generating unit 2724 generates a marker using the position information acquired from the color information data interpreting unit 2721 and transmits the marker to the blender unit 2716.

The operations at time T17 and time T18 may be performed out of sequence.

Next, at time T20, the blender unit 2716 superimposes the marker acquired from the marker generating unit 2724 on the image acquired from the scaler unit 2715. In addition, the blender unit 2716 transmits the image on which the marker is superimposed (a composite image) to the output panel 2717.

At time T22, the output panel 2717 displays a result of reflecting contents of the CDL file received by the USB Host IF 2720 in the image received by the SDI IF 2713. Specifically, the composite image described above is displayed.

Next, an operation for storing the CDL file will be described.

At time T16, the color information data generating unit 2718 converts the parameter updated at time T13 into color information to be described in the CDL file.

At time T19, the color information data generating unit 2718 generates the CDL file using the color information obtained at time T16.

At time T21, the color information data generating unit 2718 transmits the CDL file to the USB Host IF 2720.

Specifically, the color information data generating unit 2718 stores the CDL file in a storage medium via the USB Host IF 2720.

The operations at time T16, time T19, and time T21 can be executed out of synchronization with the operations for generating the composite image described earlier. However, the operations are to be performed in the sequence of time T16, time T19, and time T21.

Figure 23:
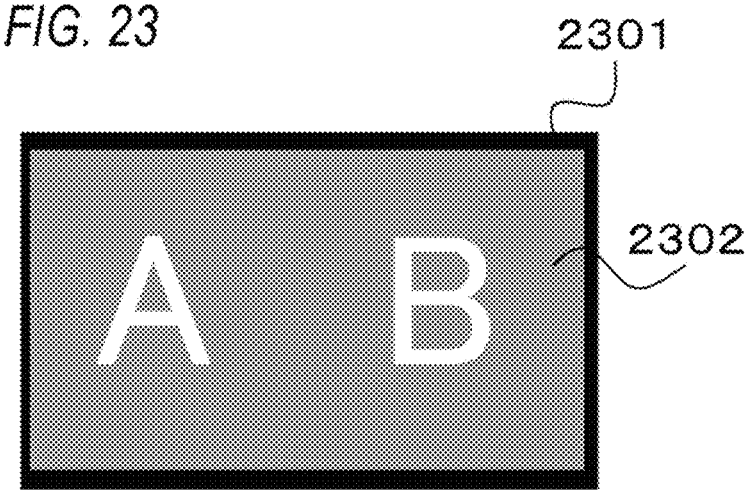
FIG. 23 is a diagram showing an image displayed on a display apparatus according to a fifth embodiment.
Figure 24:
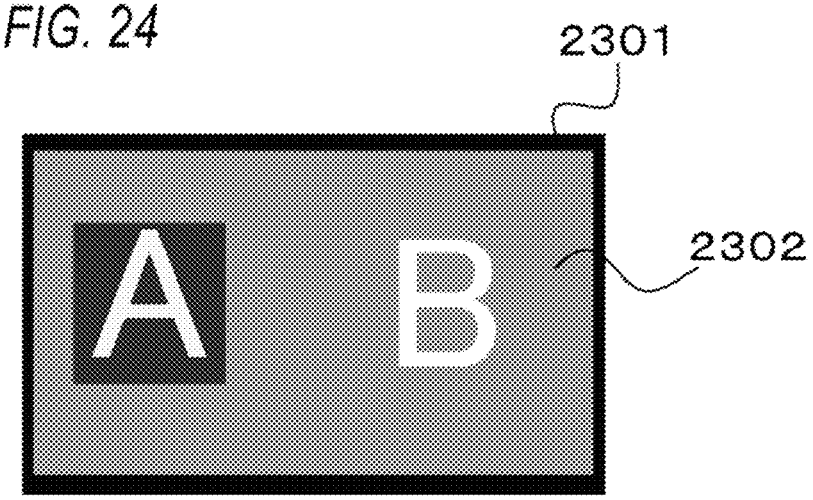
FIG. 24 is a diagram showing an image displayed on the display apparatus according to the fifth embodiment.
Figure 25:
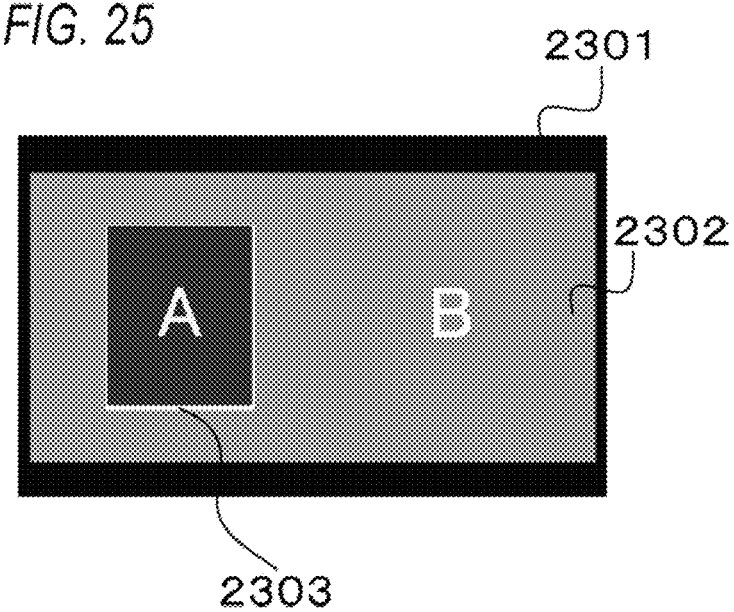
FIG. 25 is a diagram showing an image displayed on the display apparatus according to the fifth embodiment.

As described above, in the present embodiment, a CDL file is acquired from a USB-connected storage medium. In addition, a marker is generated from position information obtained by interpreting the CDL file and the marker is displayed. Accordingly, an object of interest can now be readily determined. For example, as shown in FIG. 25, since a marker 2303 is displayed superimposed when displaying an image 2302 on an image 2301 and performing color adjustment of the image 2302, the presence of an object of interest in a region represented by the marker 2303 can now be readily determined. Accordingly, color adjustment of only the object of interest instead of the entire image can be readily performed. For example, a state of the image 2302 can be readily changed from a state shown in FIG. 23 to a state shown in FIG. 24.

In addition, when performing color adjustment that differs from the color adjustment in accordance with the CDL file received by the user, since a CDL file representing the performed color adjustment can be stored in a storage medium, user convenience can be improved.

<Sixth Embodiment>

Hereinafter, an image processing apparatus and a control method thereof according to a sixth embodiment of the present invention will be described.

In the present embodiment, an example in which a size of a marker is changed in accordance with magnification or reduction of an image will be described.

Note that only points that differ from the fifth embodiment will be described below.

A schematic configuration of a display apparatus according to the present embodiment is the same as that in the fifth embodiment (FIG. 27).

Operations of the display apparatus according to the present embodiment will be described with reference to FIG. 29.

Figure 28:
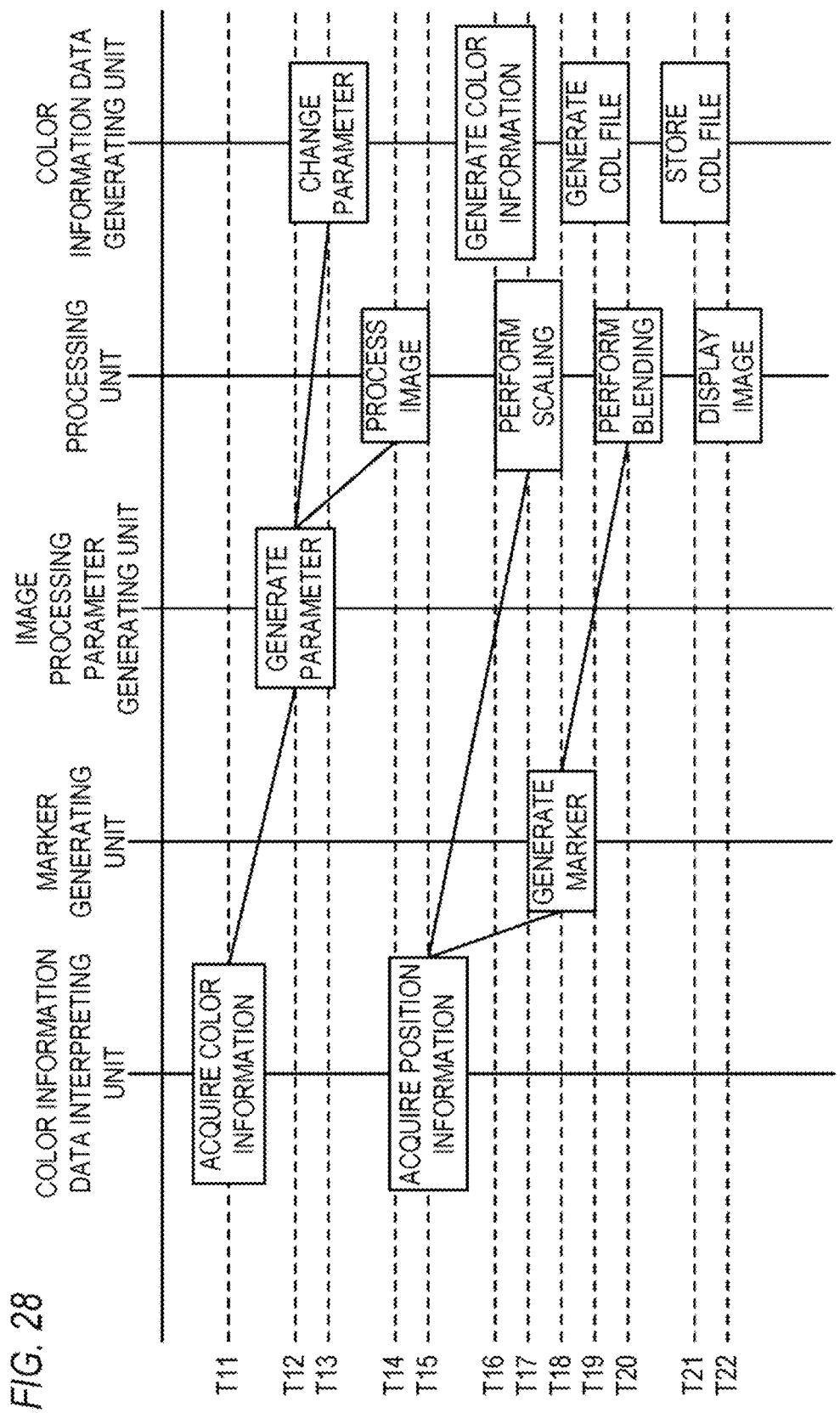
FIG. 28 is a time chart showing an operation of the display apparatus according to the fifth embodiment.

An operation at time T31 is the same as the operation at time T11 in FIG. 28, an operation at time T32 is the same as the operation at time T12 in FIG. 28, and an operation at time T33 is the same as the operation at time T13 in FIG. 28.

At time T34, the magnification/reduction rate determining unit 2722 acquires information regarding a resolution and an aspect ratio of a display panel from the display panel information retaining unit 2723.

An operation at time T35 is the same as the operation at time T14 in FIG. 28.

At time T36, the color information data interpreting unit 2721 analyzes the description in the acquired CDL file and acquires position information and an aspect ratio from the CDL file. In addition, the color information data interpreting unit 2721 transmits the acquired information to the magnification/reduction rate determining unit 2722. In this case, the aspect ratio refers to an aspect ratio of a region of an object of interest. In other words, in the present embodiment, region information representing a region of an object of interest is acquired.

At time T37, the magnification/reduction rate determining unit 2722 determines a magnification rate or a reduction rate of the image using information acquired from the display panel information retaining unit 2723. In addition, the magnification/reduction rate determining unit 2722 transmits the determined magnification rate or reduction rate to the scaler unit 2715. For example, a magnification rate or a reduction rate of the image outputted from the image processing unit 2714 is determined so that the resolution and the aspect ratio become consistent with those of the display panel.

An operation at time T39 is the same as the operation at time T17 in FIG. 28.

At time T40, the magnification/reduction rate determining unit 2722 determines a magnification rate or a reduction rate of a marker using the magnification rate or the reduction rate determined in time T37 and transmits the magnification rate or the reduction rate of the marker to the marker generating unit 2724. For example, a scaling rate (a magnification rate or a reduction rate) determined at time T37 is determined as a scaling rate of the marker. Alternatively, the scaling rate of the marker may differ from the scaling rate of the image. For example, the scaling rate of the marker may be determined in accordance with the scaling rate of the image so that the higher the scaling rate of the image, the higher the scaling rate of the marker.

At time T42, the marker generating unit 2724 generates a marker based on the region information acquired from the color information data interpreting unit 2721 and the magnification rate or the reduction rate of the marker acquired from the magnification/reduction rate determining unit 2722. In addition, the marker generating unit 2724 transmits the marker to the blender unit 2716. For example, a marker with a size resulting from scaling (magnifying or reducing) the size represented by the aspect ratio at the scaling rate is generated at a position indicated by the position information. Alternatively, the size of the marker prior to scaling may be a size prepared in advance in the display apparatus instead of a size represented by the aspect ratio.

An operation at time T43 is the same as the operation at time T20 in FIG. 28 and an operation at time T45 is the same as the operation at time T22 in FIG. 28.

In addition, an operation at time T38 is the same as the operation at time T16 in FIG. 28, an operation at time T41 is the same as the operation at time T19 in FIG. 28, and an operation at time T43 is the same as the operation at time T21 in FIG. 28. As a result, the CDL file is stored by a similar operation to the fifth embodiment.

As described above, according to the present embodiment, a size of a marker is adjusted in accordance with a scaling rate of an image. Specifically, when performing a scaling process on an input image, a marker is subjected to a scaling process corresponding to the scaling process performed on the input image. In addition, an image in which the marker subjected to the scaling process is superimposed on the input image subjected to the scaling process is displayed on the display panel. Accordingly, a marker in accordance with specifications of the display panel can be generated and displayed regardless of the specifications of the display panel. As a result, user convenience can be improved.

Furthermore, since a scaling rate is determined in consideration of information unique (a display resolution and a display aspect ratio) to a display panel, a scaling rate not dependent on the specifications of the display panel can be determined. As a result, user convenience can be improved.

<Seventh Embodiment>

Hereinafter, an image processing apparatus and a control method thereof according to a seventh embodiment of the present invention will be described.

In the present embodiment, an example in which a received CDL file includes color information and position information (region information) regarding each of a plurality of objects of interest will be described.

Note that only points that differ from the fifth and sixth embodiments will be described below.

A schematic configuration of a display apparatus according to the present embodiment is the same as that in the fifth embodiment (FIG. 27).

FIG. 26 shows a description example of a CDL file including color information and region information regarding each of a plurality of objects of interest. The CDL file shown in FIG. 26 describes, for each region of an object of interest (region of interest), region information representing the region and color information. Specifically, region information and color information of area 1 and region information and color information of area 2 are described in a region of expanded meta-information.

Figure 30:
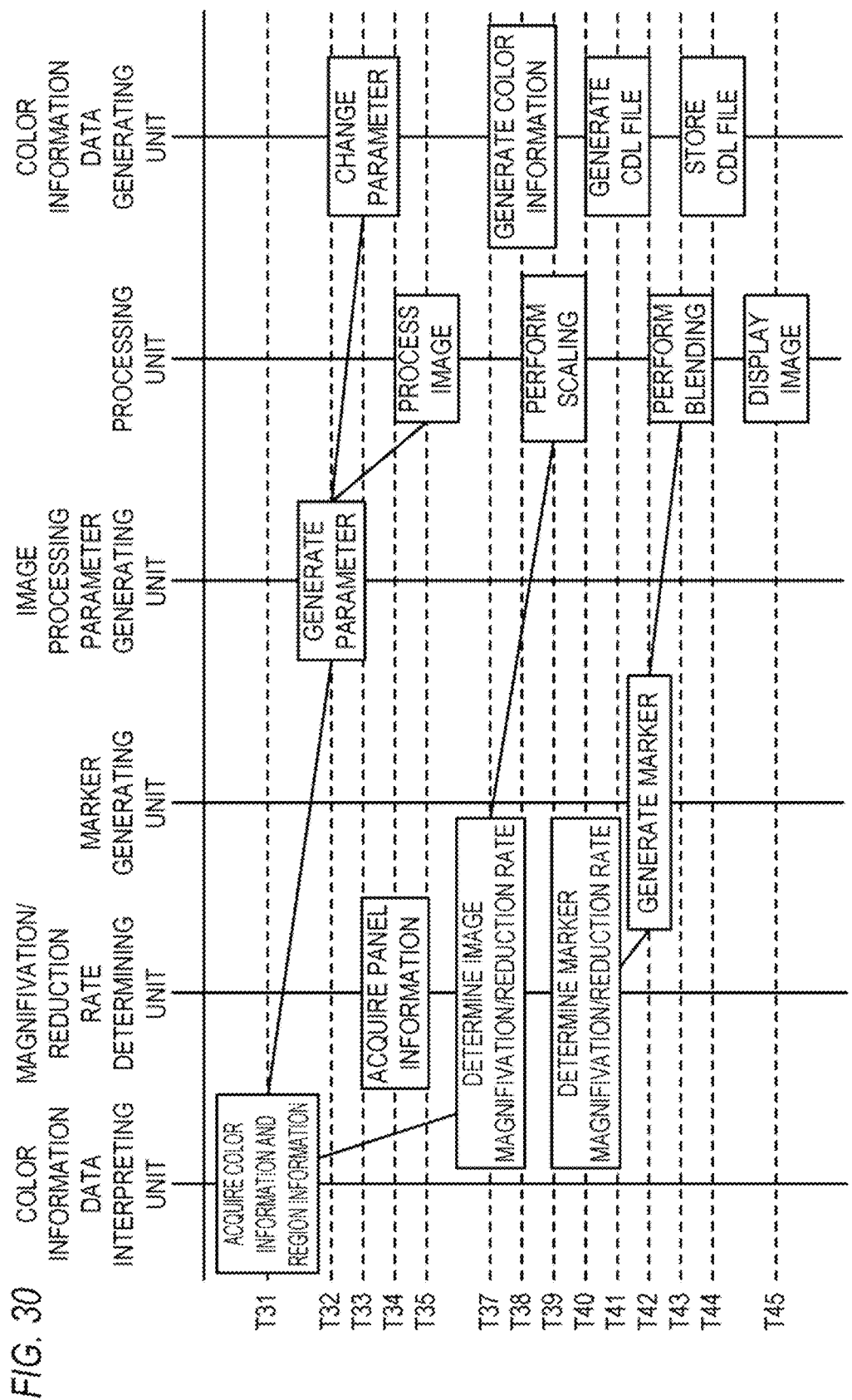
FIG. 30 is a time chart showing an operation of a display apparatus according to the seventh embodiment.

Operations of the display apparatus according to the present embodiment will be described with reference to FIG. 30.

First, an operation of generating a marker image data from a CDL file and generating composite image data will be described.

Figure 29:
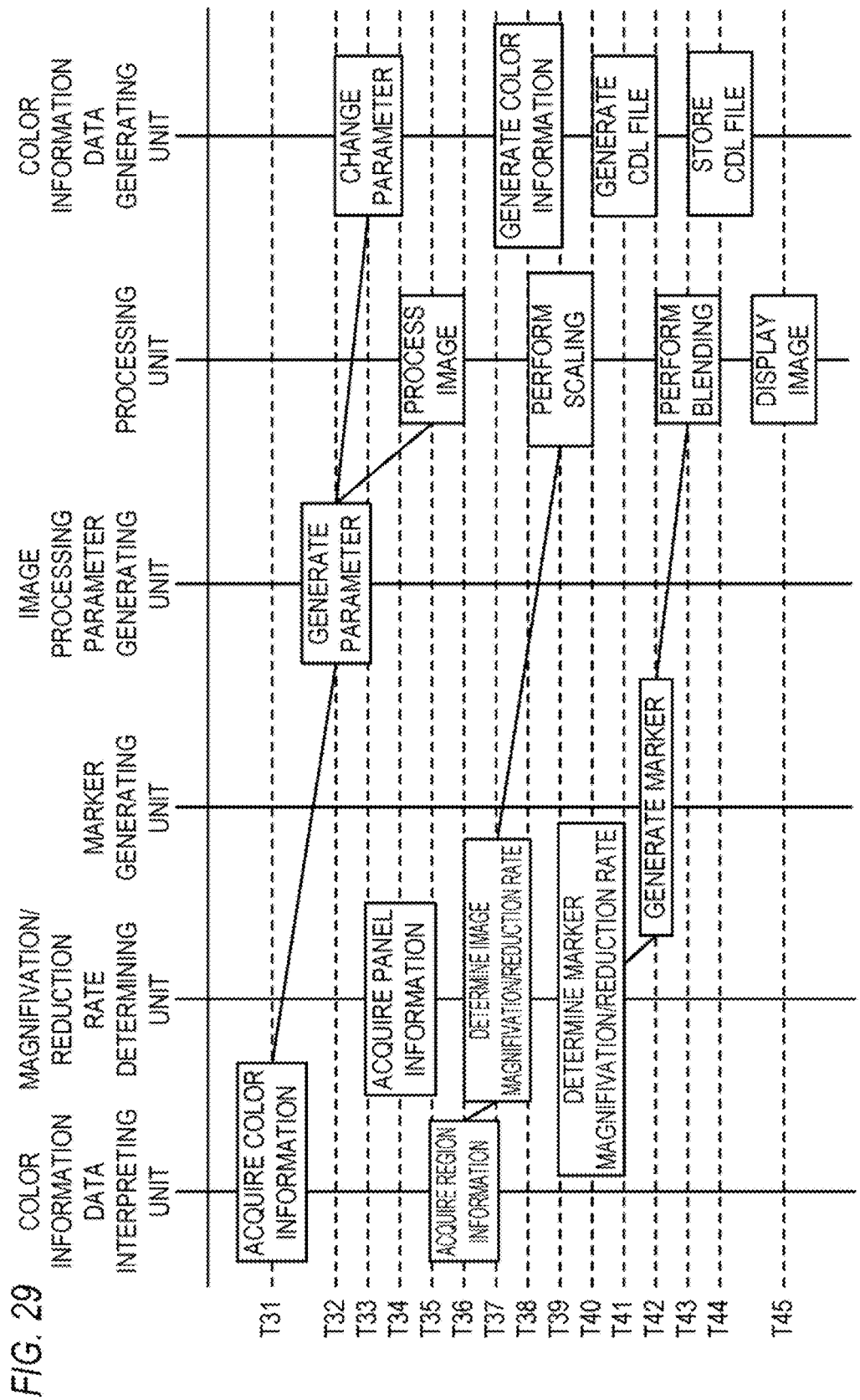
FIG. 29 is a time chart showing an operation of a display apparatus according to a sixth embodiment.

When the received CDL file includes color information and region information regarding a plurality of objects of interest, the operation performed at time T36 in FIG. 29 is to be performed at time T31. In other words, at time T31, for each region of interest, the color information data interpreting unit 2721 associates and acquires color information and region information (position information and an aspect ratio) from the CDL file acquired from the USB Host IF 2720. In addition, the color information data interpreting unit 2721 transmits the acquired information to the image processing parameter generating unit 2719.

At time T32, the image processing parameter generating unit 2719 associates and generates a region of interest to be subjected to image processing and a parameter of the image processing to be performed on the region of interest based on the information acquired from the color information data interpreting unit 2721. Specifically, for each region of interest, the region of interest is determined from region information of the region of interest. In addition, for each region of interest, a parameter of the image processing to be performed on the region of interest is generated from the color information of the region of interest. Subsequently, the image processing parameter generating unit 2719 transmits the parameter for each region of interest to the image processing unit 2714.

At time T35, the image processing unit 2714 subjects a region of interest of the image received from the SDI IF 2713 (a region of interest represented by the information from the image processing parameter generating unit 2719) to image processing using the parameter corresponding to the region of interest. Accordingly, for each region of interest, image processing using a parameter corresponding to the region of interest is performed.

At time T37, the magnification/reduction rate determining unit 2722 determines a magnification rate or a reduction rate of the image and transmits the magnification rate or the reduction rate to the scaler unit 2715. In the present embodiment, a scaling rate is determined so that a resolution of a displayed image equals a resolution at which all information of interest is displayed, a resolution at which information of interest specified by the user is displayed in enlargement, or a resolution specified by the user.

At time T39, the scaler unit 2715 executes scaling of the image received from the image processing unit 2714 using the scaling rate acquired from the magnification/reduction rate determining unit 2722.

At time T40, for each region of interest, the magnification/reduction rate determining unit 2722 determines a scaling rate of a marker to be displayed in the region of interest. In addition, the magnification/reduction rate determining unit 2722 transmits the scaling rate for each region of interest to the marker generating unit 2724.

At time T42, for each region of interest, the marker generating unit 2724 generates the marker to be displayed in the region of interest using the scaling rate and the region information of the region of interest. In this case, the scaling rate is acquired from the magnification/reduction rate determining unit 2722 and the region information is acquired from the color information data interpreting unit 2721. In addition, the marker generating unit 2724 transmits the marker for each region of interest to the blender unit 2716. In other words, a region of interest and a marker are transmitted to the blender unit 2716 in association with each other.

At time T43, the blender unit 2716 superimposes the marker acquired from the marker generating unit 2724 on the image acquired from the scaler unit 2715. The marker is superimposed on a corresponding region of interest. In addition, the blender unit 2716 transmits the image on which the marker has been superimposed (a composite image) to the output panel 2717.

At time T43, the output panel 2717 displays the composite image received from the blender unit 2716.

Next, an operation for storing the CDL file will be described.

At time T33, the color information data generating unit 2718 compares the parameter and the region information acquired from the image processing parameter generating unit 2719 with retained information. Specifically, for each region information acquired from the image processing parameter generating unit 2719, a parameter acquired from the image processing parameter generating unit 2719 is compared with a retained parameter. In addition, when the acquired parameter is not consistent with the retained parameter, the color information data generating unit 2718 updates the retained parameter to the acquired parameter. When a parameter regarding the same region information as the region information of the acquired parameter is not retained, the color information data generating unit 2718 newly stores the acquired parameter.

At time T38, the color information data generating unit 2718 converts the updated or newly stored parameter into color information to be described in the CDL file. When there are a plurality of updated or newly stored parameters, each of the plurality of updated or newly stored parameters is converted into color information.

At time T41, the color information data generating unit 2718 generates a single CDL file from all of the color information obtained at time T38 and region information corresponding to the color information.

At time T44, the color information data generating unit 2718 stores the CDL file generated at time T41 in a storage medium via the USB Host IF 2720.

As described above, according to the present embodiment, when there are a plurality of regions of interest and a plurality of region information are included in a received CDL file, all of the regions of interest can be interpreted and markers can be displayed on all of the regions of interest. As a result, user convenience can be improved.

<Eighth Embodiment>

An eighth embodiment of the present invention will be described. In the eighth embodiment, an example will be described in which a file including image adjustment values of a plurality of regions is read in from the outside and an image in which image adjustment is individually performed on the plurality of regions is displayed on a display apparatus.

Figure 31:
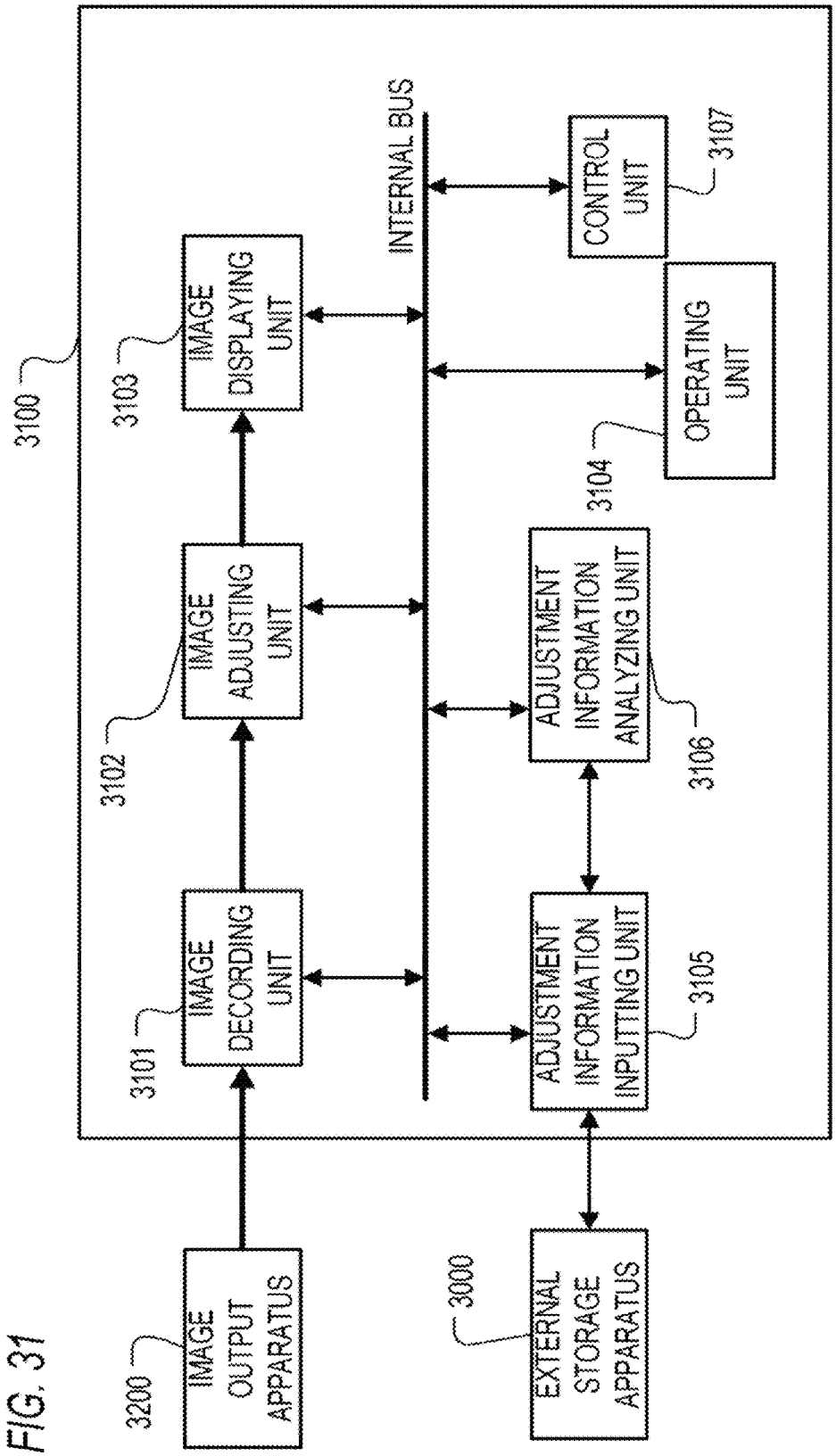
FIG. 31 is a block diagram showing a configuration of a display apparatus according to an eighth embodiment.

FIG. 31 is a block diagram showing a configuration of a display apparatus according to the present embodiment. FIG. 31 also shows connections between the display apparatus and peripheral apparatuses thereof according to the present embodiment.

First, peripheral apparatuses connected to a display apparatus 3100 will be described. An image output apparatus 3200 and an external storage apparatus 3000 are connected by cables to the display apparatus 3100.

The image output apparatus 3200 converts internally stored image data into an image signal such as SDI, DVI, or DisplayPort and outputs the image signal to the display apparatus 3100.

The external storage apparatus 3000 stores an image adjustment file storing an image adjustment value used when performing image adjustment with the display apparatus 3100. The display apparatus 3100 reads (acquires) the image adjustment file from the external storage apparatus 3000 and performs image adjustment on the displayed image signal. Image adjustment is performed using the image adjustment file. Specific examples of the external storage apparatus 3000 include a USB memory and an HDD.

Next, a configuration of the display apparatus 3100 will be described.

An image decoding unit 3101 decodes an image signal inputted from the image output apparatus 3200 and outputs the decoded image signal to an image adjusting unit 3102.

The image adjusting unit 3102 subjects the image signal inputted from the image decoding unit 3101 to image adjustment using the image adjustment file (specifically, image adjustment information generated from the image adjustment file) stored in the external storage apparatus 3000. In addition, the image adjusting unit 3102 outputs the image signal subjected to the image adjustment to an image displaying unit 3103.

The image displaying unit 3103 displays the image signal outputted from the image adjusting unit 3102.

When a user operation (an input switching operation, an image adjustment operation, or the like) on the display apparatus 3100 is performed, an operating unit 3104 receives operation information representing the performed user operation and transmits the received operation information to a control unit 3107.

An adjustment information inputting unit 3105 is a communication interface for connecting the display apparatus 3100 and the external storage apparatus 3000 to each other and controls communication with the external storage apparatus 3000.

An adjustment information analyzing unit 3106 analyzes the image adjustment file sent from the external storage apparatus 3000, generates image adjustment information necessary for image adjustment from the image adjustment file, and outputs the image adjustment information to the image adjusting unit 3102.

The control unit 3107 controls the functional units in the display apparatus 3100 via an internal bus.

Figure 32:
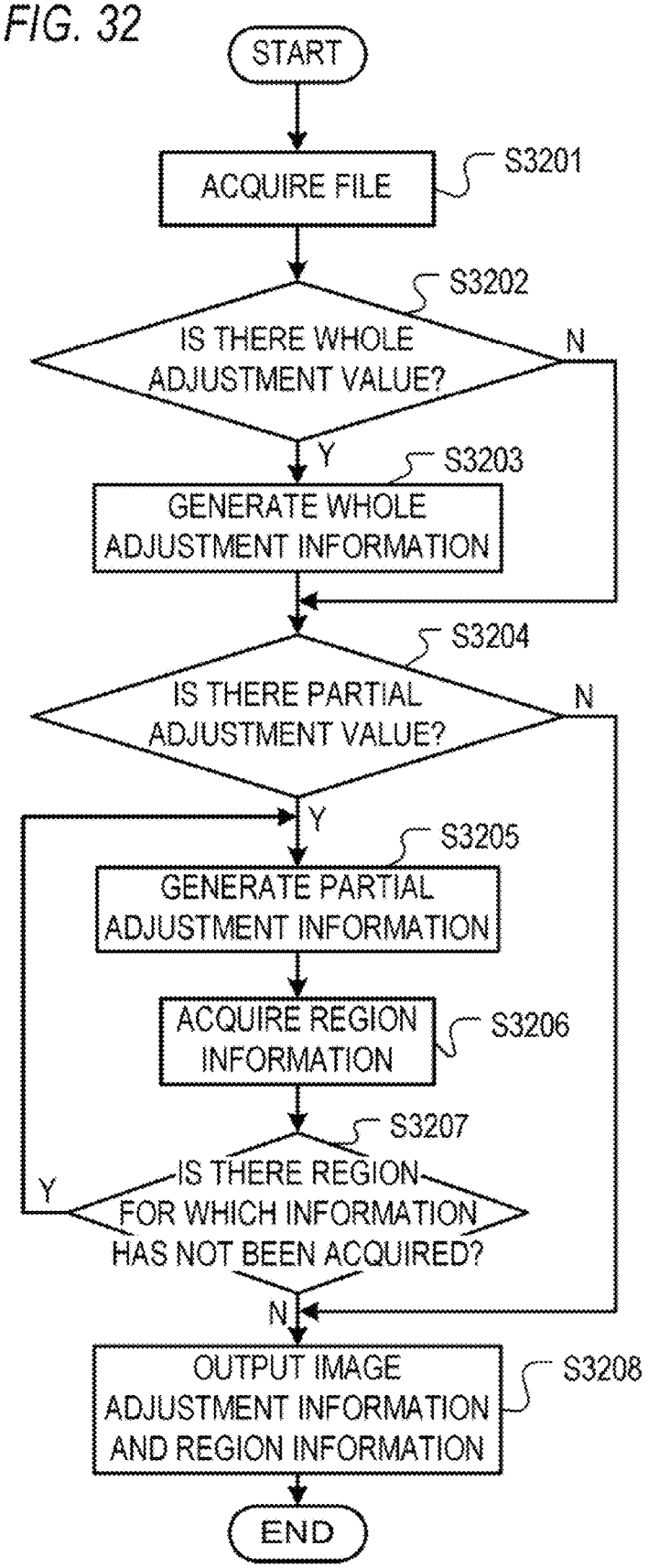
FIG. 32 is a flow chart showing an operation of an adjustment information analyzing unit according to the eighth embodiment.

Operations of the adjustment information analyzing unit 3106 will be described with reference to FIG. 32. The operations shown in FIG. 32 are started in response to a user operation for starting image adjustment using an external file.

First, the adjustment information inputting unit 3105 acquires an image adjustment file stored in the external storage apparatus 3000 and outputs the image adjustment file to the adjustment information analyzing unit 3106 (S3201: file acquisition).

Next, the adjustment information analyzing unit 3106 analyzes the acquired image adjustment file and determines whether or not an image adjustment value to be applied to a whole image (a whole adjustment value) is included in the image adjustment file (S3202). When a whole adjustment value is included, processing advances to S3203, and when a whole adjustment value is not included, processing advances to S3204. As shown in FIG. 26, when a header reading "whole" is described with respect to a whole adjustment value in the image adjustment file (a CDL file), a presence or absence of a whole adjustment value can be determined based on a presence or absence of a header reading "whole". However, a method of determining a presence or absence of a whole adjustment value is not limited to this method. For example, an image adjustment value for which a region is not specified among image adjustment values included in an image adjustment file may be determined to be a whole adjustment value.

In S3203, the adjustment information analyzing unit 3106 generates image adjustment information (whole adjustment information) to be used when the image adjusting unit 3102 performs image adjustment from the whole adjustment value (values of Slope, Offset, Power, and Saturation). Examples of conceivable methods of generating image adjustment information include calculating an LUT for adjusting an RGB value of an image signal from the values of Slope, Offset, and Power and generating an LUT for adjusting a color gamut of the image signal from the value of Saturation. Methods of converting an image adjustment value in the image adjustment file into image adjustment information to be used by the display apparatus 3100 is not particularly limited.

Next, the adjustment information analyzing unit 3106 analyzes the acquired image adjustment file and determines whether or not an image adjustment value to be applied to a partial region of the image (a partial adjustment value) is included in the image adjustment file (S3204). When a partial adjustment value is included, processing advances to S3205, and when a partial adjustment value is not included, processing advances to S3208. As shown in FIG. 26, when a partial adjustment value is described in expanded meta-information of the image adjustment file (a CDL file), a presence or absence of a partial adjustment value can be determined based on a presence or absence of a description in expanded meta-information. However, a method of determining a presence or absence of a partial adjustment value is not limited to this method. For example, an image adjustment value for which a region is specified among image adjustment values included in an image adjustment file may be determined to be a partial adjustment value.

In S3205, the adjustment information analyzing unit 3106 acquires a partial adjustment value from the acquired image adjustment file and generates image adjustment information (partial adjustment information) to be used when the image adjusting unit 3102 performs image adjustment from the acquired partial adjustment value. When there are a plurality of partial adjustment values corresponding to a plurality of regions, a partial adjustment value of any of the plurality of regions is acquired. When the CDL file shown in FIG. 26 is acquired, the partial adjustment value of "area 1" or "area 2" is acquired. For example, Slope=a1, Offset=b1, Power=c1, and Saturation=d1 are acquired as the partial adjustment value of "area 1".

Next, the adjustment information analyzing unit 3106 acquires region information of a region corresponding to the partial adjustment value acquired in S3205 from the acquired image adjustment file (S3206). For example, Position(x1, y1), Size(X1, Y1) is acquired as region information of "area 1" in FIG. 26.

In addition, the adjustment information analyzing unit 3106 determines whether or not there is a region for which a partial adjustment value and region information have not been acquired (S3207). When a partial adjustment value and region information have been acquired for all regions, processing advances to S3208. When there is a region for which a partial adjustment value and region information have not been acquired, processing returns to S3205. Processing of S3205 to S3207 is repeated until a partial adjustment value and region information are acquired for all regions.

In S3208, the adjustment information analyzing unit 3106 outputs the generated image adjustment information (whole adjustment information, partial adjustment information) and the acquired region information to the image adjusting unit 3102. The partial adjustment information generated from a partial adjustment value of a region is outputted in association with the region information of the region.

A method of image adjustment using partial adjustment information will be described with reference to FIGS. 33 to 38.

Moreover, while an example in which an image of a region indicated by region information is trimmed and the trimmed region is subjected to image adjustment using partial adjustment information will be described below, a method of image adjustment is not limited thereto. For example, a pixel value in a region indicated by region information may be adjusted using partial adjustment information without performing trimming.

Moreover, while a configuration in which partial adjustment information and region information of a maximum of two regions are acquired and image adjustment for each region can be executed in parallel to each other will be described below, a configuration of the present invention is not limited thereto. Partial adjustment information and region information of three or more regions may be acquired. In addition, image adjustment of a plurality of regions may be sequentially performed.

Figure 33:
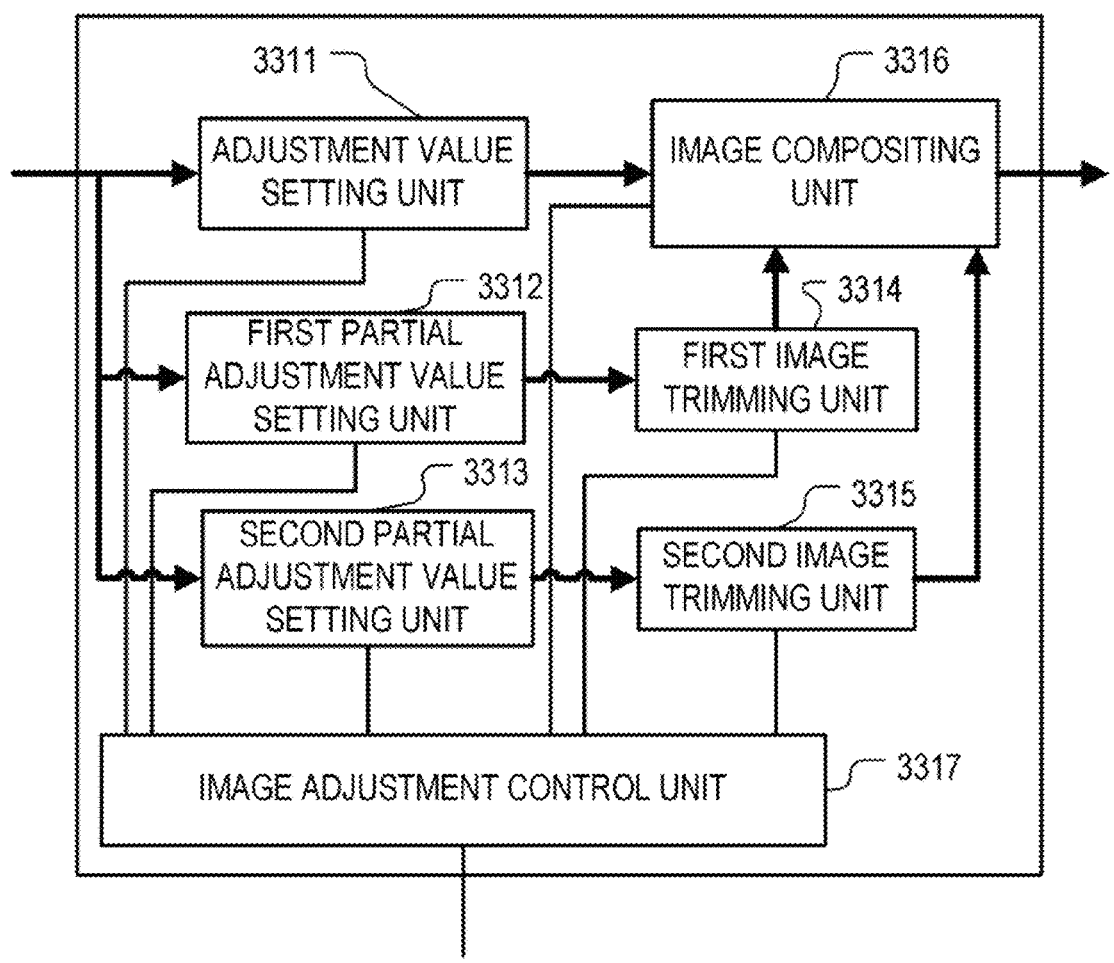
FIG. 33 is a block diagram showing a configuration of an image adjusting unit according to the eighth embodiment.

FIG. 33 is a block diagram showing a configuration of the image adjusting unit 3102. The image adjusting unit 3102 includes an adjustment value setting unit 3311, a first partial adjustment value setting unit 3312, a second partial adjustment value setting unit 3313, a first image trimming unit 3314, a second image trimming unit 3315, an image compositing unit 3316, an image adjustment control unit 3317, and the like.

An image signal outputted from the image decoding unit 3101 is inputted to the adjustment value setting unit 3311, the first partial adjustment value setting unit 3312, and the second partial adjustment value setting unit 3313.

Figure 34:
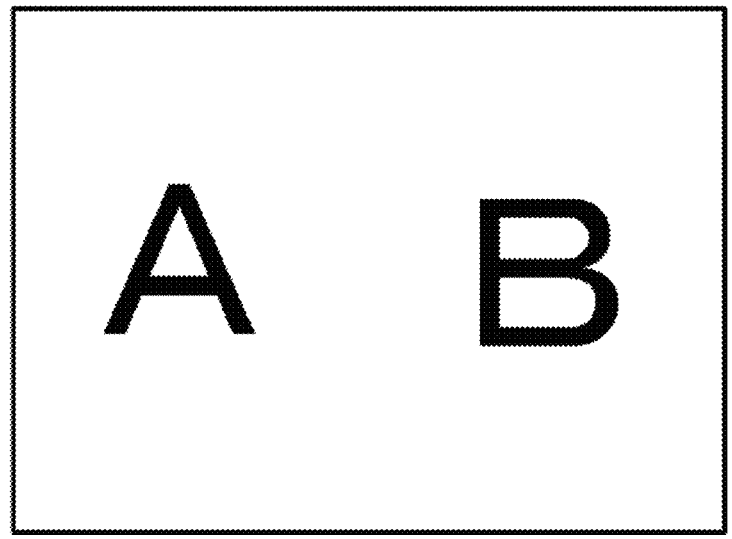
FIG. 34 is a diagram showing an image that is an object of image adjustment according to the eighth embodiment.

Hereinafter, an example of processing performed when an image signal shown in FIG. 34 is inputted will be described.

The image adjustment control unit 3317 sets whole adjustment information inputted from the adjustment information analyzing unit 3106 to the adjustment value setting unit 3311. The image adjustment control unit 3317 sets partial adjustment information of a first region ("area 1" in FIG. 26) inputted from the adjustment information analyzing unit 3106 to the first partial adjustment value setting unit 3312. The image adjustment control unit 3317 sets partial adjustment information of a second region ("area 2" in FIG. 26) inputted from the adjustment information analyzing unit 3106 to the second partial adjustment value setting unit 3313. The image adjustment control unit 3317 sets region information of the first region inputted from the adjustment information analyzing unit 3106 to the first image trimming unit 3314. In addition, the image adjustment control unit 3317 sets region information of the second region inputted from the adjustment information analyzing unit 3106 to the second image trimming unit 3315.

Figure 35:
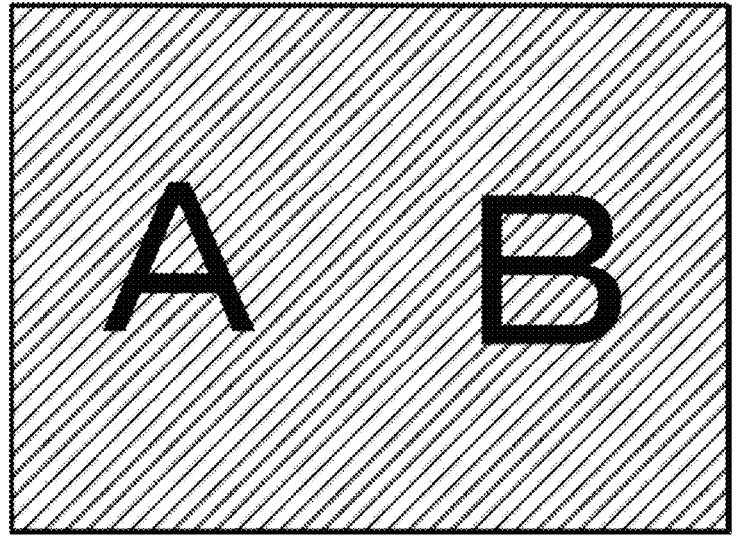
FIG. 35 is a diagram showing an output image of an adjustment value setting unit according to the eighth embodiment.

The adjustment value setting unit 3311 performs image adjustment using the whole adjustment information on the image signal inputted to the adjustment value setting unit 3311. In addition, the adjustment value setting unit 3311 outputs the image signal subjected to the image adjustment to the image compositing unit 3316. As shown in FIG. 35, an image signal representing image adjustment using whole adjustment information performed on a whole image is outputted from the adjustment value setting unit 3311.

The first partial adjustment value setting unit 3312 performs image adjustment using the partial adjustment information (partial adjustment information of "area 1") inputted to the first partial adjustment value setting unit 3312 on the image signal inputted to the first partial adjustment value setting unit 3312. In addition, the first partial adjustment value setting unit 3312 outputs the image signal subjected to the image adjustment to the first image trimming unit 3314. As shown in FIG. 36, an image signal representing image adjustment using the partial adjustment information of "area 1" performed on a whole image is outputted from the first partial adjustment value setting unit 3312.

Figure 37:
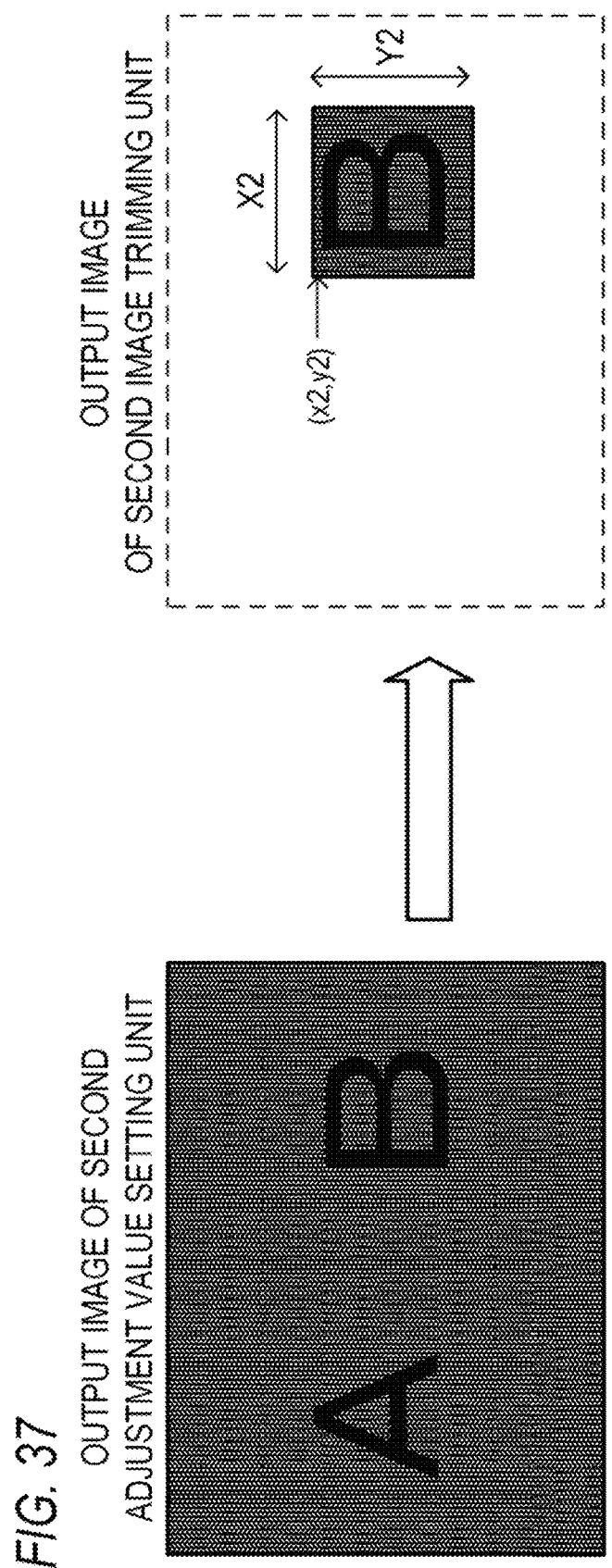
FIG. 37 is a diagram showing an output image of a second image trimming unit according to the eighth embodiment.

The second partial adjustment value setting unit 3313 performs image adjustment using the partial adjustment information (partial adjustment information of "area 2") inputted to the second partial adjustment value setting unit 3313 on the image signal inputted to the second partial adjustment value setting unit 3313. In addition, the second partial adjustment value setting unit 3313 outputs the image signal subjected to the image adjustment to the second image trimming unit 3315. As shown in FIG. 37, an image signal representing image adjustment using the partial adjustment information of "area 2" performed on a whole image is outputted from the second partial adjustment value setting unit 3313.

Protocols regarding image adjustment by the adjustment value setting unit 3311, the first partial adjustment value setting unit 3312, and the second partial adjustment value setting unit 3313 are desirably the same.

The first image trimming unit 3314 trims an image signal of the region "area 1" indicated by the region information inputted to the first image trimming unit 3314 from the image signal inputted to the first image trimming unit 3314. In addition, the first image trimming unit 3314 outputs the trimmed image signal to the image compositing unit 3316. As shown in FIG. 36, an image signal of "area "1" subjected to image adjustment using the partial adjustment information of "area 1" is outputted from the first image trimming unit 3314.

The second image trimming unit 3315 trims an image signal of the region "area 2" indicated by the region information inputted to the second image trimming unit 3315 from the image signal inputted to the second image trimming unit 3315. In addition, the second image trimming unit 3315 outputs the trimmed image signal to the image compositing unit 3316. As shown in FIG. 37, an image signal of "area "2" subjected to image adjustment using the partial adjustment information of "area 2" is outputted from the second image trimming unit 3315.

Figure 38:
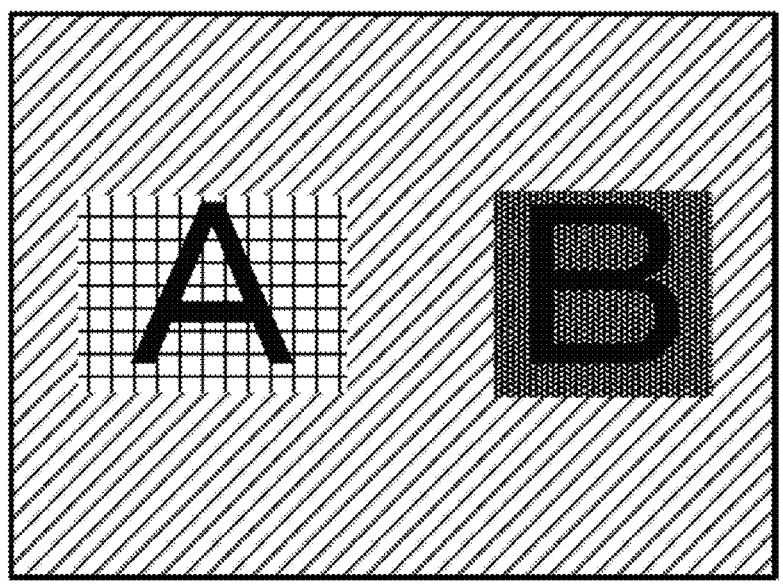
FIG. 38 is a diagram showing a composite image according to the eighth embodiment.

The image compositing unit 3316 generates a composite image signal by compositing the image signal outputted from the adjustment value setting unit 3311, the image signal outputted from the first image trimming unit 3314, and the image signal outputted from the second image trimming unit 3315. In addition, the image compositing unit 3316 outputs the composite image signal to the image displaying unit 3103. Specifically, as shown in FIG. 38, a composite image signal is outputted in which an image represented by the image signal outputted from the first image trimming unit 3314 and an image represented by the image signal outputted from the second image trimming unit 3315 are superimposed on an image represented by the image signal outputted from the adjustment value setting unit 3311.

By performing the processing described above, an image signal in which image adjustment is individually performed on a plurality of regions can be obtained.

<Ninth Embodiment>

A ninth embodiment of the present invention will be described. In the present embodiment, an example in which a plurality of image adjustment files are acquired will be described.

Since a configuration of a display apparatus according to the present embodiment is the same as that of the eighth embodiment, a description thereof will be omitted.

For example, a plurality of image adjustment files are acquired according to the procedure described below. First, image adjustment files stored in the external storage apparatus 3000 are presented on the image displaying unit 3103. Next, the user selects a plurality of image adjustment files using the operating unit 3104. Subsequently, the plurality of image adjustment files selected by the user are sent from the external storage apparatus 3000 to the display apparatus.

Moreover, a method of acquiring the image adjustment files is not limited to the method described above. For example, files having a same extension as the image adjustment file may be retrieved and files with the same extension as the image adjustment file may be sequentially acquired from files stored in the external storage apparatus 3000.

Figure 39:
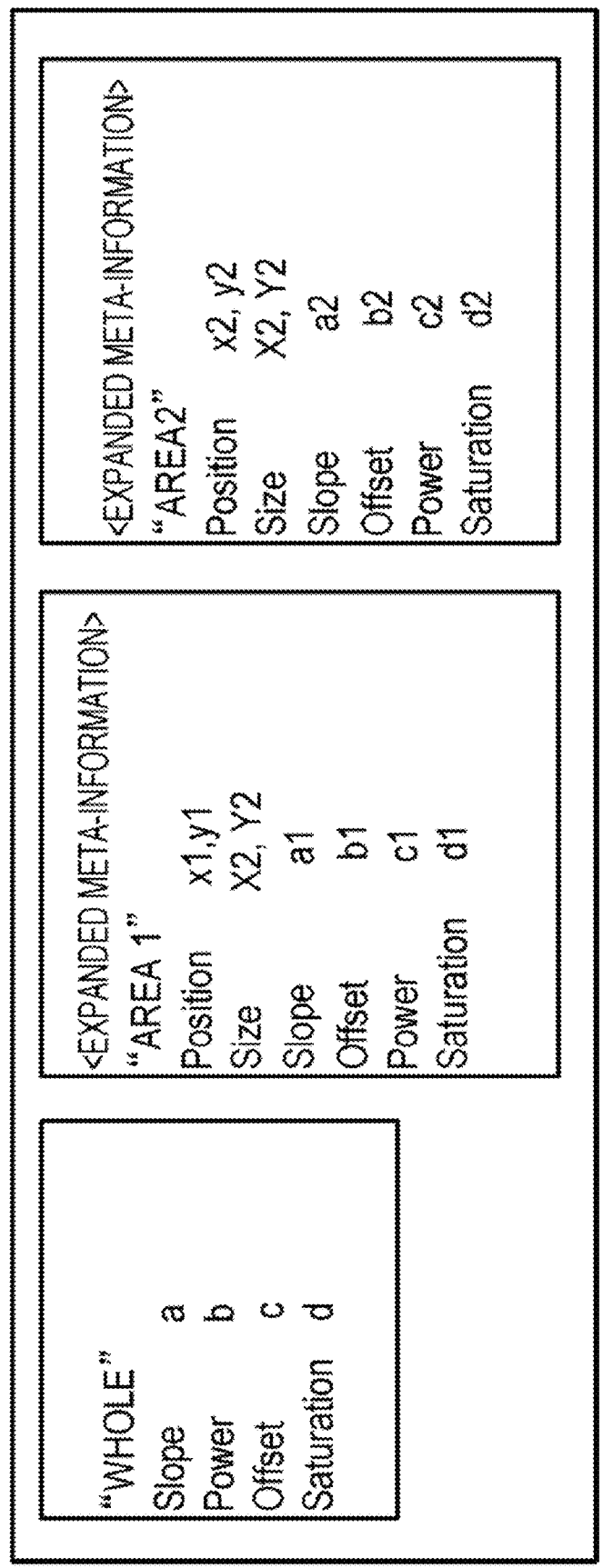
FIG. 39 is a diagram showing an image adjustment file according to a ninth embodiment.

FIG. 39 shows an example of image adjustment files acquired in the present embodiment. While image adjustment values regarding a plurality of regions have been described in a single image adjustment file in the eighth embodiment, in the present embodiment, a plurality of image adjustment files describing image adjustment values regarding a single region are acquired. In FIG. 39, a leftmost image adjustment file is an image adjustment file regarding a whole image, a center image adjustment file is an image adjustment file regarding "area 1", and a rightmost image adjustment file is an image adjustment file regarding "area 2".

Figure 40:
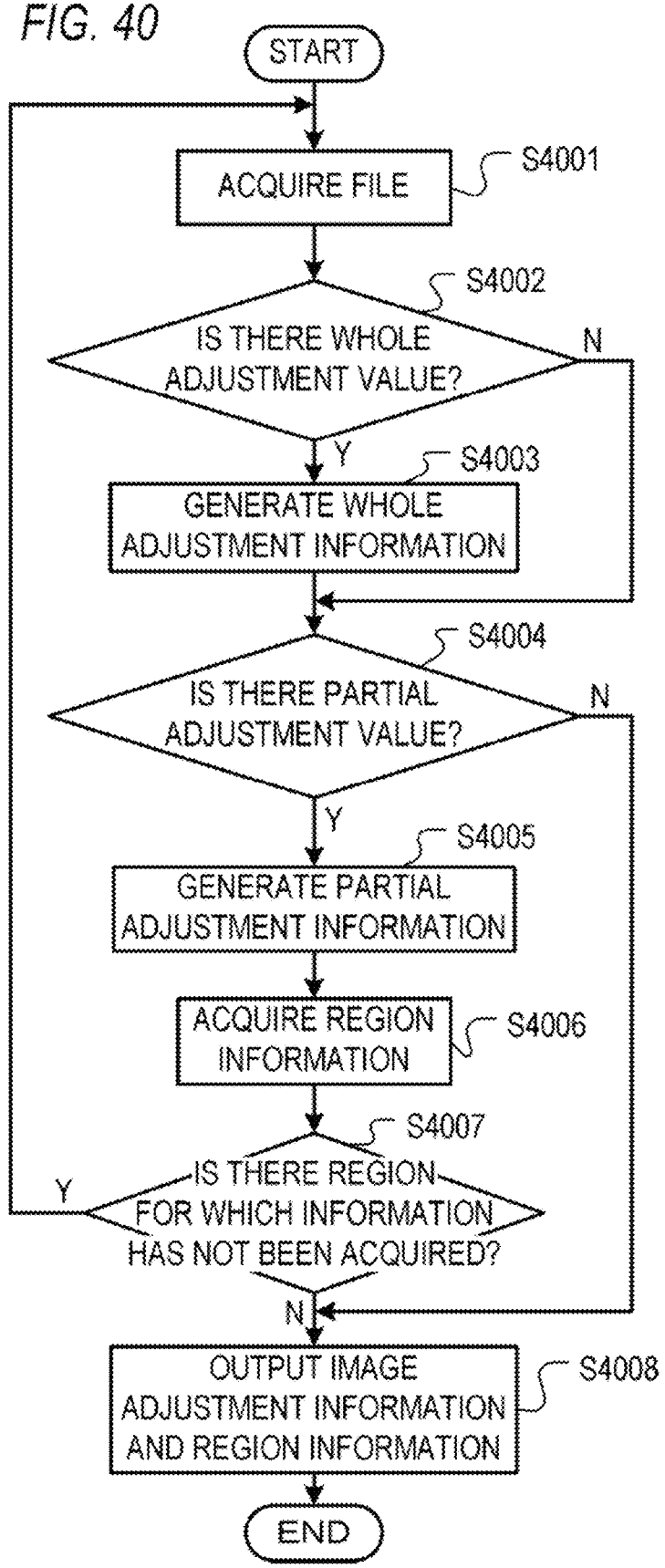
FIG. 40 is a flow chart showing an operation of an adjustment information analyzing unit according to the ninth embodiment.

FIG. 40 is a diagram showing operations of the adjustment information analyzing unit 3106 when the three image adjustment files shown in FIG. 39 are acquired.

Processing of S4001 to S4006 and S4008 is the same as the processing of S3201 to S3206 and S3208 according to the eighth embodiment.

Following S4006, the adjustment information analyzing unit 3106 determines whether or not image adjustment information of all image adjustment files has been acquired (S4007). When the image adjustment information of all image adjustment files has been acquired, processing advances to S4008. When there are image adjustment files for which image adjustment information has not been acquired, processing returns to S4001 and processing of S4001 to S4007 is repeated until the image adjustment information of all image adjustment files is acquired.

By performing the processing described above, even when acquiring a plurality of image adjustment files from the outside, an image signal in which image adjustment is individually performed on a plurality of regions (a plurality of regions represented by the plurality of image adjustment files) can be acquired.

<Tenth Embodiment>

A tenth embodiment of the present invention will be described. In the present embodiment, an example in which an image adjustment file includes image information representing an image related to the image adjustment file will be described.

Since a configuration of a display apparatus according to the present embodiment is the same as that of the ninth embodiment, a description thereof will be omitted.

Figure 41:
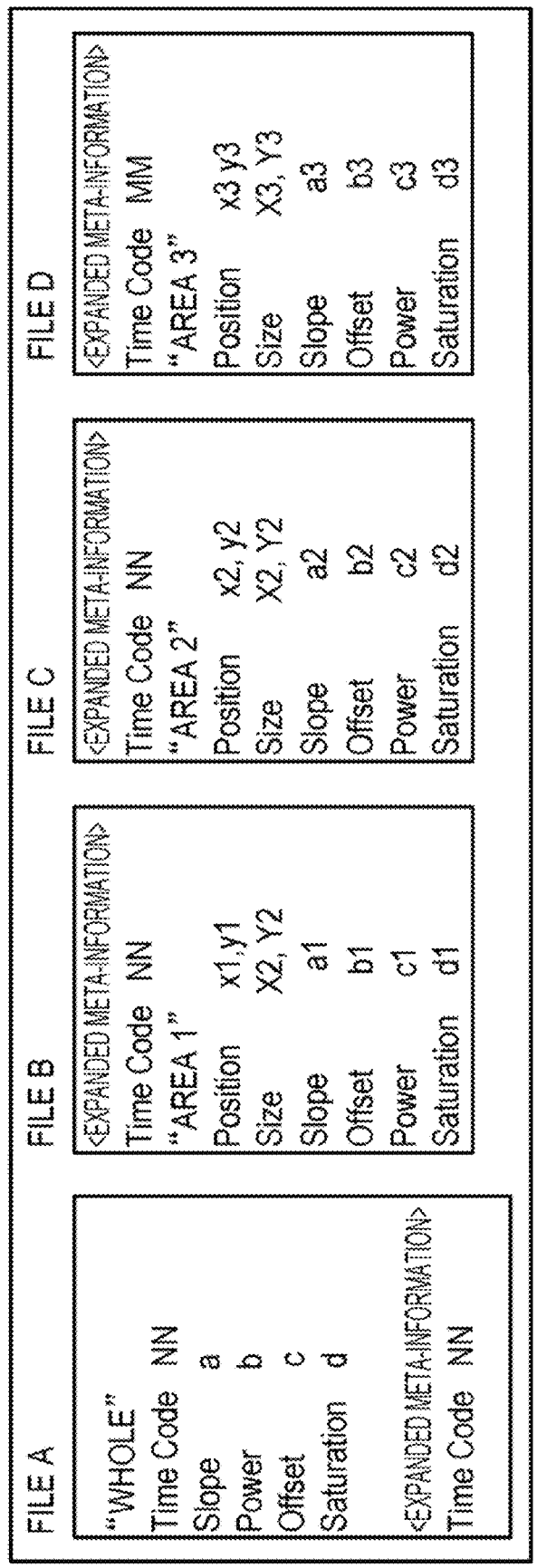
FIG. 41 is a diagram showing an image adjustment file according to a tenth embodiment.

FIG. 41 shows an example of an image adjustment file stored in the external storage apparatus 3000. As described above, in the present embodiment, an image adjustment file includes image information representing an image related to the image adjustment file. Specifically, a time code of an image is included as image information.

Figure 42:
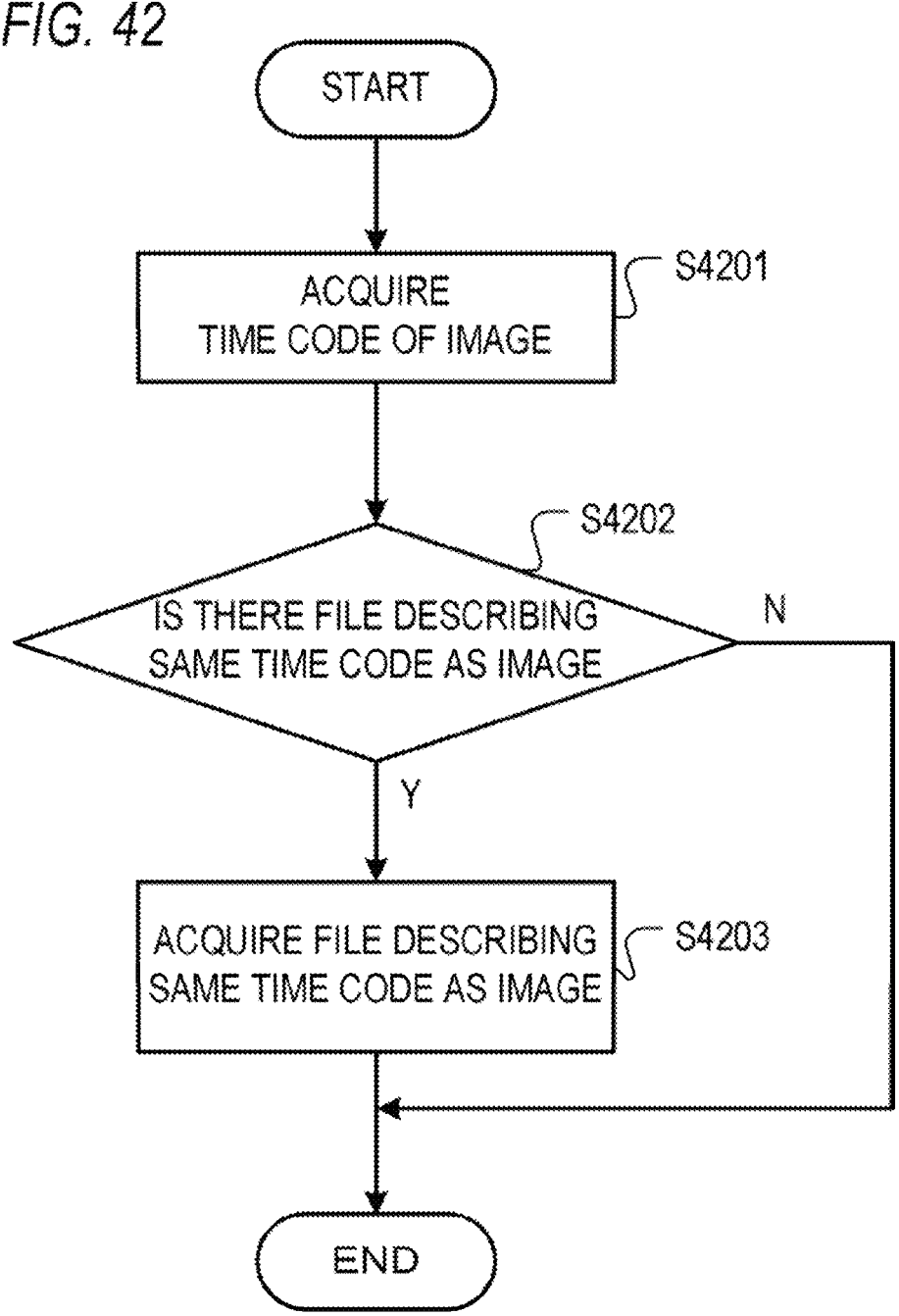
FIG. 42 is a flow chart showing a method of acquiring an image adjustment file according to the tenth embodiment.

FIG. 42 is a flow chart showing a method of determining an image adjustment file to be used for image adjustment.

First, the adjustment information analyzing unit 3106 acquires, from an image signal decoded by the image decoding unit 3101, a time code of the image signal (S4201).

Next, the adjustment information analyzing unit 3106 checks whether or not there are image adjustment files describing the time code of the image signal that is an object of an adjustment process (the time code acquired in S4201) in the image adjustment files stored in the external storage apparatus 3000 (S4202). When there are image adjustment files describing the time code of the image signal that is a processing object, processing advances to S4203. When there is no image adjustment files describing the time code of the image signal that is a processing object, an image adjustment file is not acquired and the present flow is terminated.

In S4203, the adjustment information analyzing unit 3106 acquires an image adjustment file describing the time code of the image signal that is an object of the adjustment process (the time code acquired in S4201). When the four image adjustment files shown in FIG. 41 are stored in the external storage apparatus 3000 and a time code of the image signal that is a processing object is NN, an image adjustment file A, an image adjustment file B, and an image adjustment file C are acquired.

As described above, according to the present embodiment, an image adjustment file related to an image signal that is a processing object can be readily acquired. For example, the user's effort for selecting an appropriate image adjustment file from a large number of image adjustment files can be reduced. In addition, an inappropriate image adjustment file can be prevented from being acquired and inappropriate image adjustment can be prevented from being performed.

Moreover, the method of acquiring an image adjustment file according to the present embodiment can also be applied to the eighth embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-056307, filed on Mar. 19, 2013, and Japanese Patent Application No. 2013-256669, filed on Dec. 12, 2013, which are hereby incorporated by reference herein in their entirety.

What is claimed is:

1. An image processing apparatus, comprising:
   an image input interface at which an input image is received, wherein a color adjustment process is performed by the image processing apparatus on at least a spatially partial region of the input image to generate an output image;
   an image output interface from which the output image is outputted;
   a memory interface from which color adjustment information is outputted for storage by a memory, wherein the color adjustment information includes information representing an approximate expression which approximates conversion characteristics of the color adjustment process and region information representing the spatial position of the spatially partial region of the input image,
   wherein a color space of an image is divided into a plurality of color ranges, and
   wherein the image processing apparatus
   acquires a color histogram regarding color in at least the spatially partial region of the input image,
   acquires, for each of the plurality of color ranges, information representing an approximate expression which approximates conversion characteristics of the color range as division characteristics, and
   generates, as composition characteristics, information representing an approximate expression which composites the approximate expressions of the plurality of color ranges by compositing the division characteristics of the plurality of color ranges based on the color histogram,
   wherein the composition characteristics are outputted as information representing the approximate expressions.

2. The image processing apparatus according to claim 1, wherein the composition characteristics are generated by compositing the division characteristics using weights in accordance with frequencies of the color histogram corresponding to the respective color ranges.

3. The image processing apparatus according to claim 1, wherein
   the approximate expression is a linear expression representing a relationship between an input pixel value and an output pixel value, and
   information representing the approximate expression is a coefficient of the linear expression.

4. The image processing apparatus according to claim 1, wherein
   the approximate expression is a linear expression representing a relationship between an input pixel value and an output pixel value,
   information representing the approximate expression is a coefficient of the linear expression, and
   a value of a coefficient of the composition characteristics is calculated by obtaining a weighted average of values of coefficients that are division characteristics using weights in accordance with frequencies of the color histogram corresponding to the respective color ranges.

5. The image processing apparatus according to claim 1, wherein
   the color adjustment process is a color adjustment process using a three-dimensional lookup table, and
   in acquiring the division characteristics of a color range which includes a plurality of adjacent lattice points of the lookup table, the division characteristics are acquired from information on an input pixel value and an output pixel value of the plurality of adjacent lattice points.

6. The image processing apparatus according to claim 1, wherein the spatially partial region is set according to a user instruction.

7. The image processing apparatus according to claim 1, wherein
   a plurality of candidates of a spatial region of interest in the input image are displayed on a display, and
   a user selection of any of the plurality of candidates is accepted as the spatially partial region to be subjected to the color adjustment process.

8. The image processing apparatus according to claim 7, wherein
   the plurality of candidates are a plurality of spatial regions obtained by dividing a spatial region enclosed by a safety zone marker by a grid marker, and
   an image is displayed on a display apparatus in which the safety zone marker and the grid marker on the input image are superimposed.

9. The image processing apparatus according to claim 1, wherein an image is displayed on a display apparatus in which a marker is superimposed on the spatial position represented by the region information of the input image, and
   a user selection of the spatially partial region to be subjected to the color adjustment process is accepted from regions of the image displayed on the display apparatus.

10. The image processing apparatus according to claim 9, wherein in a case where there are a plurality of spatially partial regions of the input image:
    region information of each of the plurality of spatially partial regions is acquired, and
    an image is displayed on the display apparatus in which a marker is superimposed on each of the plurality of spatially partial regions.

11. The image processing apparatus according to claim 1, wherein the color adjustment process is performed on the input image so that an output image is obtained in which a color adjustment process is individually performed on a plurality of spatially partial regions.

12. The image processing apparatus according to claim 1, wherein
    a single file is acquired, the single file including a plurality of region information representing a plurality of spatially partial regions, and
    the color adjustment process is performed on the input image so that an output image is obtained in which a color adjustment process is individually performed on the plurality of spatially partial regions represented by the plurality of region information.

13. The image processing apparatus according to claim 12, wherein
    the single file includes image information representing an image related to the file, and
    a file related to the input image is also acquired.

14. The image processing apparatus according to claim 1, wherein a plurality of files are acquired, the plurality of files including region information representing a plurality of spatially partial regions, and the color adjustment process is performed on the input image so that an output image is obtained in which a color adjustment process is individually performed on a plurality of spatially partial regions represented by a plurality of region information included in the plurality of files.

15. A control method of an image processing apparatus, comprising:

performing a color adjustment process, wherein the color adjustment process is performed at least on a spatially partial region of an input image to generate an output image;

determining an approximate expression which approximates conversion characteristics of the color adjustment process; and outputting color adjustment information including information representing the determined approximate expression and region information representing a spatial position of the spatially partial region, wherein a color space of an image is divided into a plurality of color ranges, wherein in determining the approximate expression a color histogram regarding color in at least the spatially partial region of the input image is acquired, for each of the plurality of color ranges, information representing an approximate expression which approximates conversion characteristics of the color range as division characteristics is acquired, and as composition characteristics, information representing an approximate expression which composites the approximate expressions of the plurality of color ranges is generated by compositing the division characteristics of the plurality of color ranges based on the color histogram, wherein the composition characteristics are outputted as information representing the approximate expressions.

16. An image processing apparatus, comprising:

an image input interface at which an input image is received, wherein a color adjustment process is performed by the image processing apparatus the input image to generate an output image;

an image output interface from which the output image is outputted;

a memory interface from which color adjustment information is outputted for storage by a memory, wherein the color adjustment information includes information representing an approximate expression which approximates conversion characteristics of the color adjustment process and region information representing a spatial position of a spatially partial region of the input image, wherein a color space of an image is divided into a plurality of color ranges, and the image processing apparatus:

detects a characteristic value regarding color of the input image, acquires, for each of the plurality of color ranges, information representing an approximate expression which approximates conversion characteristics of the color range as division characteristics, and generates, as composition characteristics, information representing an approximate expression which composites the approximate expressions of the plurality of color ranges by compositing the division characteristics of the plurality of color ranges based on the detected characteristic value, wherein the composition characteristics are outputted as the information representing the approximate expressions.

17. The image processing apparatus according to claim 16, wherein the characteristic value regarding the color of the input image is a color histogram.

18. The image processing apparatus according to claim 17, wherein the composition characteristics are generated by compositing the division characteristics using weights in accordance with frequencies of the color histogram corresponding to the respective color ranges.

19. The image processing apparatus according to claim 16, wherein the approximate expression is a linear expression representing a relationship between an input pixel value and an output pixel value, and information representing the approximate expression is a coefficient of the linear expression.

20. The image processing apparatus according to claim 16, wherein the color adjustment process is a color adjustment process using a three-dimensional lookup table, and in acquiring the division characteristics of a color range which includes a plurality of adjacent lattice points of the lookup table, the division characteristics are acquired from information on an input pixel value and an output pixel value of the plurality of adjacent lattice points.

21. A control method of an image processing apparatus, comprising:

performing a color adjustment process, wherein the color adjustment process is performed for an input image to generate an output image;

determining an approximate expression which approximates conversion characteristics of the color adjustment process; and outputting color adjustment information including information representing the determined approximate expression and region information representing a spatial position of a spatially partial region of the input image, wherein a color space of an image is divided into a plurality of color ranges, and the determining includes:

detecting a characteristic value regarding color of the input image, acquiring, for each of the plurality of color ranges, information representing an approximate expression which approximates conversion characteristics of the color range as division characteristics, and generating, as composition characteristics, information representing an approximate expression which composites the approximate expressions of the plurality of color ranges by compositing the division characteristics of the plurality of color ranges based on the detected characteristic value, wherein in the outputting, the composition characteristics are outputted as the information representing the approximate expressions.

* * * * *